(12) United States Patent
Nashizawa

(10) Patent No.: US 11,750,934 B2
(45) Date of Patent: Sep. 5, 2023

(54) IMAGING APPARATUS, IMAGE PROCESSING APPARATUS, CONTROL METHOD OF THESE, AND STORAGE MEDIUM

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/460,889

(22) Filed: Aug. 30, 2021

(65) Prior Publication Data

US 2022/0053118 A1    Feb. 17, 2022

Related U.S. Application Data

(63) Continuation of application No. PCT/JP2020/006657, filed on Feb. 20, 2020.

(30) Foreign Application Priority Data

Feb. 28, 2019   (JP) ................. 2019-036856

(51) Int. Cl.
  *H04N 23/741*   (2023.01)
  *H04N 5/92*    (2006.01)
  *H04N 23/88*   (2023.01)

(52) U.S. Cl.
  CPC ......... *H04N 23/741* (2023.01); *H04N 5/9201* (2013.01); *H04N 23/88* (2023.01)

(58) Field of Classification Search
  CPC .... H04N 5/2355; H04N 5/9201; H04N 9/735; H04N 5/772; H04N 9/8047; H04N 9/8205; H04N 5/23293; H04N 5/23229; H04N 5/77; H04N 23/741; H04N 23/88; H04N 23/63; H04N 23/80
  See application file for complete search history.

(56) References Cited

U.S. PATENT DOCUMENTS

| 10,567,727 | B2 | 2/2020 | Fukushima |
| 10,965,879 | B2 | 3/2021 | Kamiya |
| 2006/0239582 | A1* | 10/2006 | Hyoudou ............... H04N 5/243 348/297 |

(Continued)

FOREIGN PATENT DOCUMENTS

| CN | 1929535 A | 3/2007 |
| CN | 101365071 A | 2/2009 |

(Continued)

OTHER PUBLICATIONS

China National Intellectual Property Administration, Notification of First Office Action for Application No. 202080017030.7, dated Dec. 20, 2022.

*Primary Examiner* — Abdelaaziz Tissire
(74) *Attorney, Agent, or Firm* — Canon U.S.A., Inc. IP Division

(57) ABSTRACT

A setting regarding a dynamic range is performed before image capturing, and in a case where a setting indicating a high dynamic range (HDR) is performed, RAW image data is recorded in association with development information corresponding to an HDR, and in a case where a setting indicating a standard dynamic range (SDR) is performed, RAW image data is recorded in association with development information corresponding to an SDR.

15 Claims, 32 Drawing Sheets

(56) References Cited

U.S. PATENT DOCUMENTS

| | | | |
|---|---|---|---|
| 2009/0086074 A1* | 4/2009 | Li | H04N 5/2355 |
| | | | 348/E3.018 |
| 2009/0102945 A1* | 4/2009 | Chen | H04N 5/2351 |
| | | | 348/229.1 |
| 2014/0152694 A1* | 6/2014 | Narasimha | G09G 5/377 |
| | | | 345/629 |
| 2015/0116489 A1* | 4/2015 | Asano | H04N 5/2355 |
| | | | 348/143 |
| 2015/0245044 A1 | 8/2015 | Guo | |
| 2016/0078638 A1* | 3/2016 | Endo | H04N 9/77 |
| | | | 382/167 |
| 2017/0330499 A1 | 11/2017 | Nakagoshi | |
| 2018/0005356 A1 | 1/2018 | Van Der Vleuten et al. | |
| 2018/0146225 A1* | 5/2018 | Hannuksela | H04N 21/4402 |
| 2018/0332210 A1* | 11/2018 | Kamiya | H04N 1/603 |
| 2019/0253687 A1* | 8/2019 | Fukushima | H04N 5/76 |
| 2020/0007735 A1 | 1/2020 | Kamiya | |

FOREIGN PATENT DOCUMENTS

| | | |
|---|---|---|
| CN | 104365082 A | 2/2015 |
| JP | 2014150370 A | 8/2014 |
| JP | 2016149753 A | 8/2016 |
| JP | 2018007194 A | 1/2018 |
| JP | 2018007246 A | 1/2018 |
| WO | 2018021261 A1 | 2/2018 |
| WO | 2018062062 A1 | 4/2018 |
| WO | 2018169003 A1 | 9/2018 |

\* cited by examiner

FIG.4A1
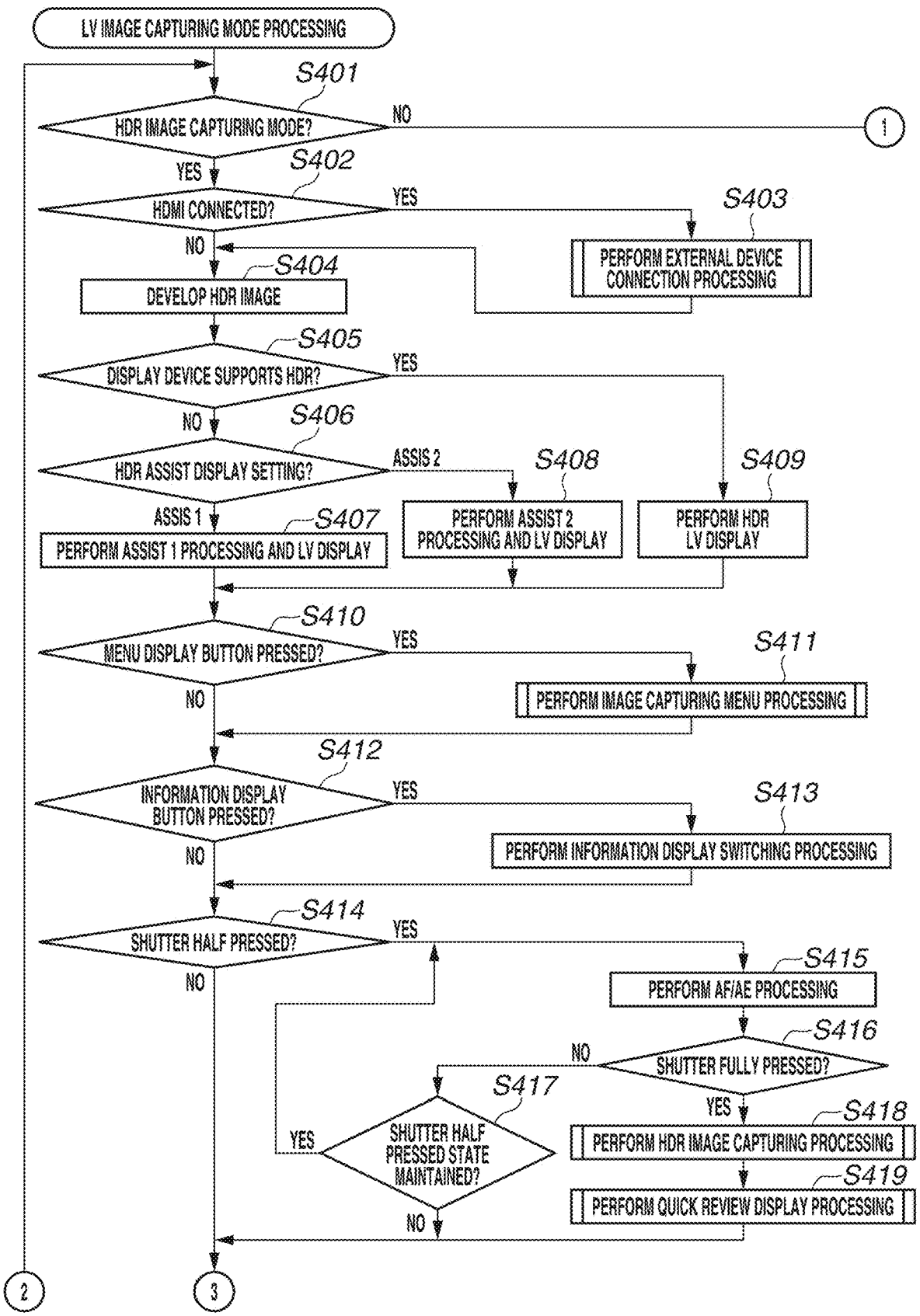

FIG.4A2
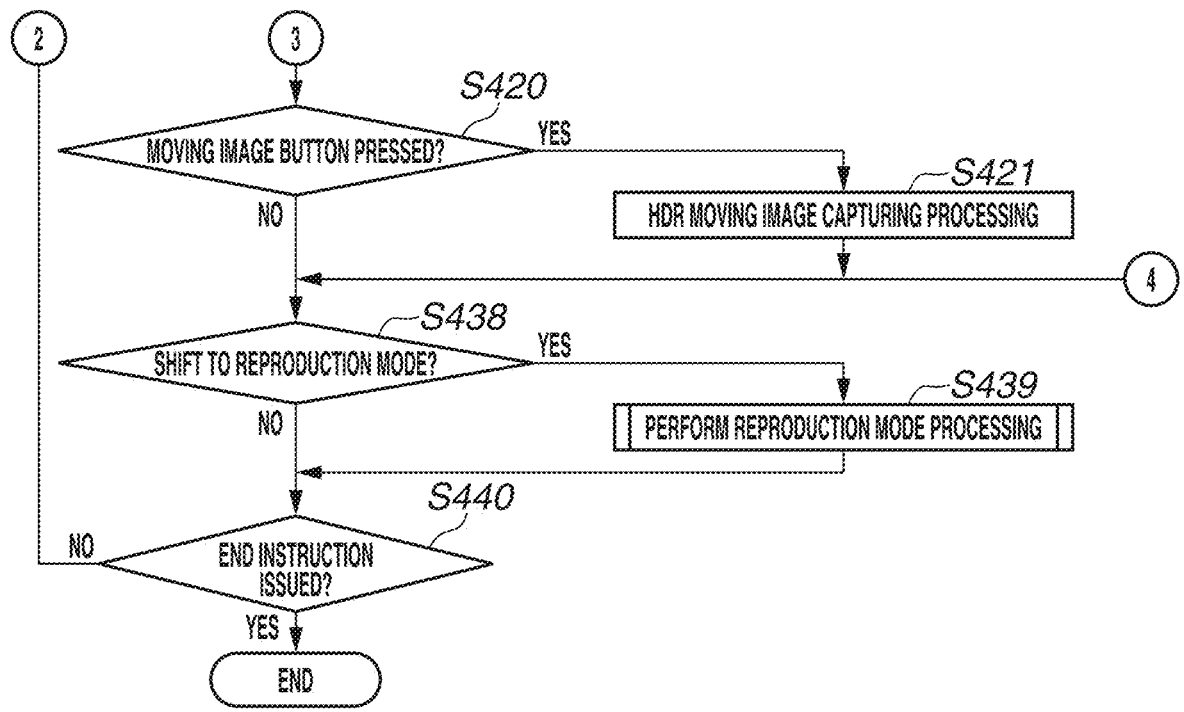

FIG.4A3
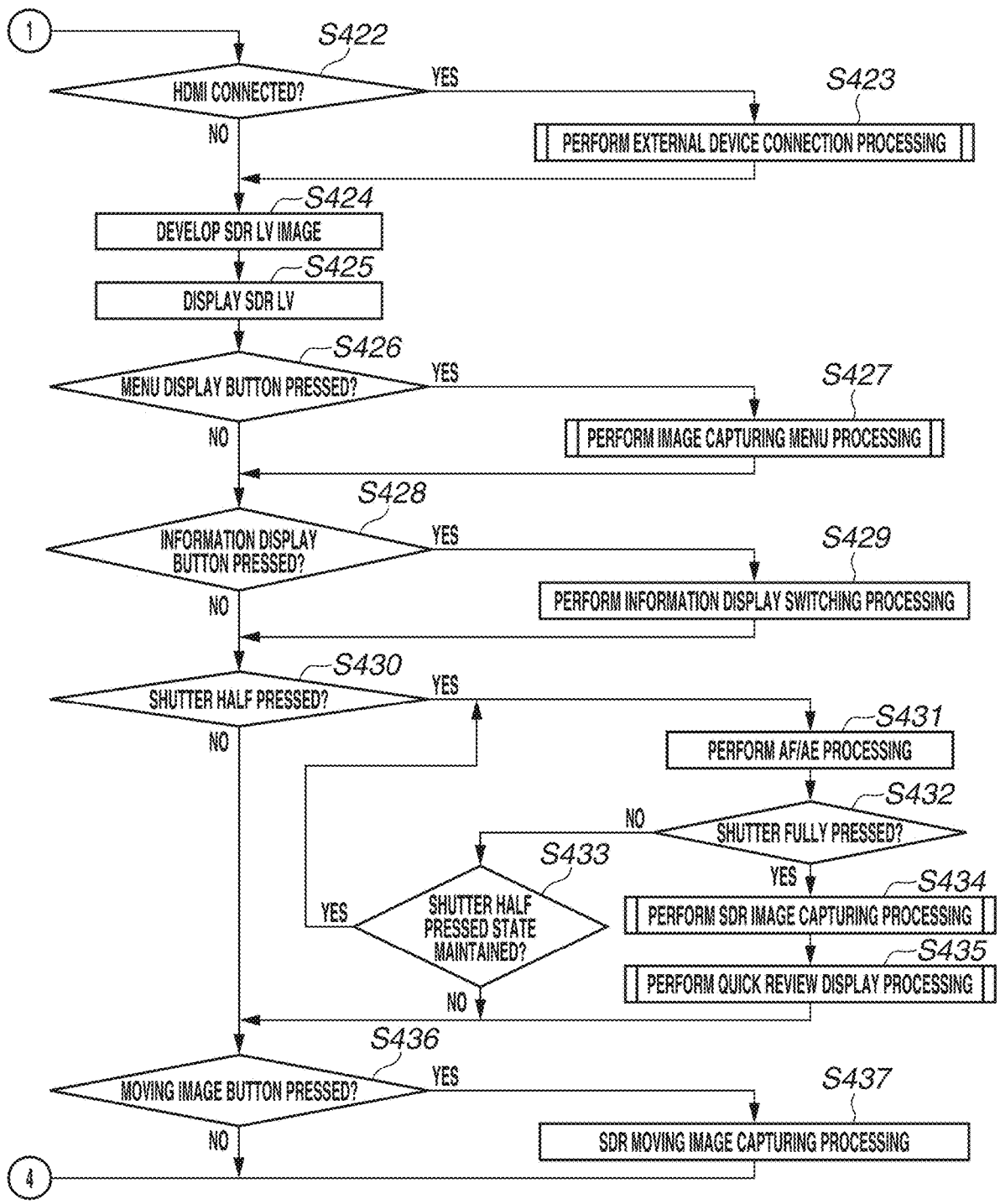

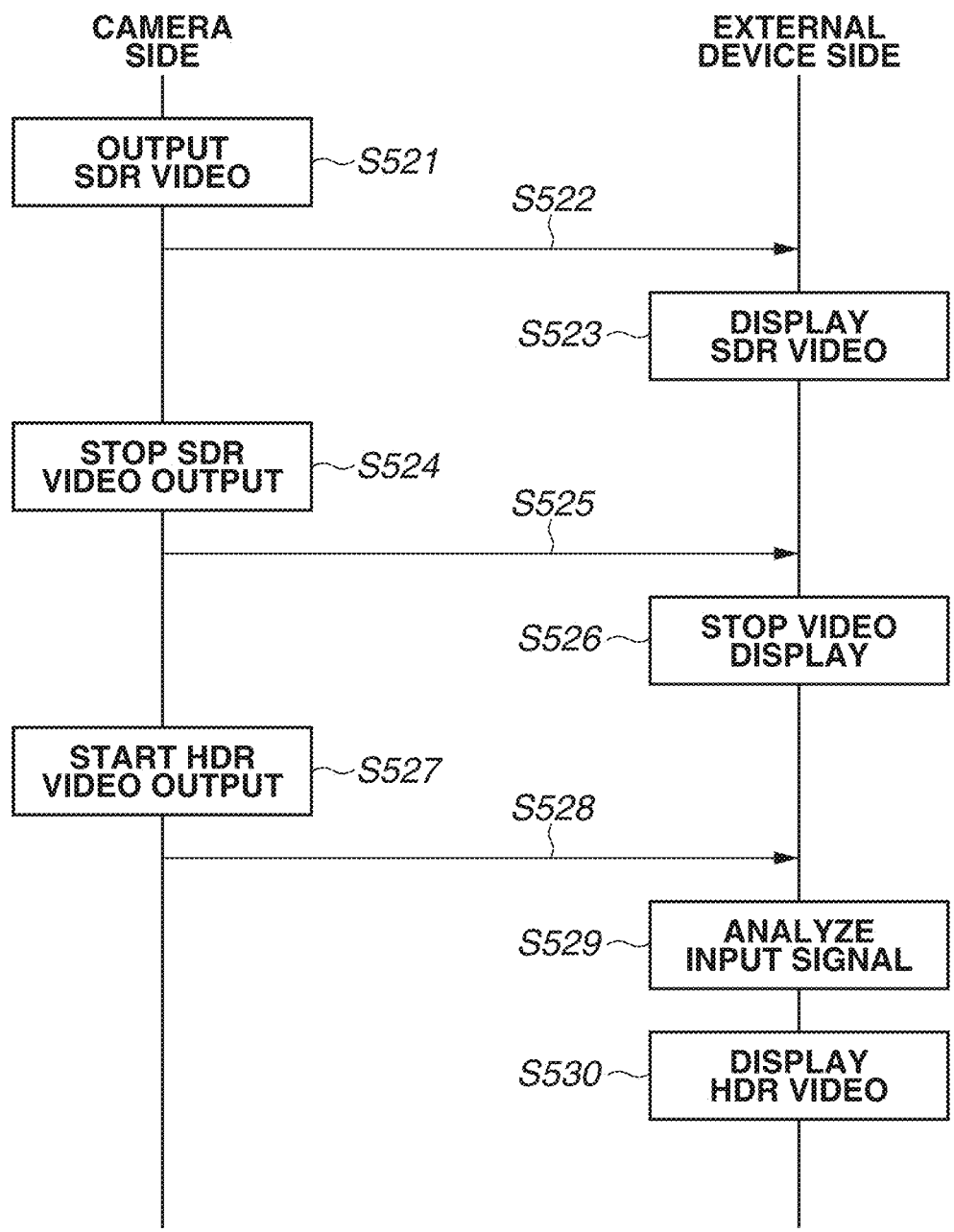

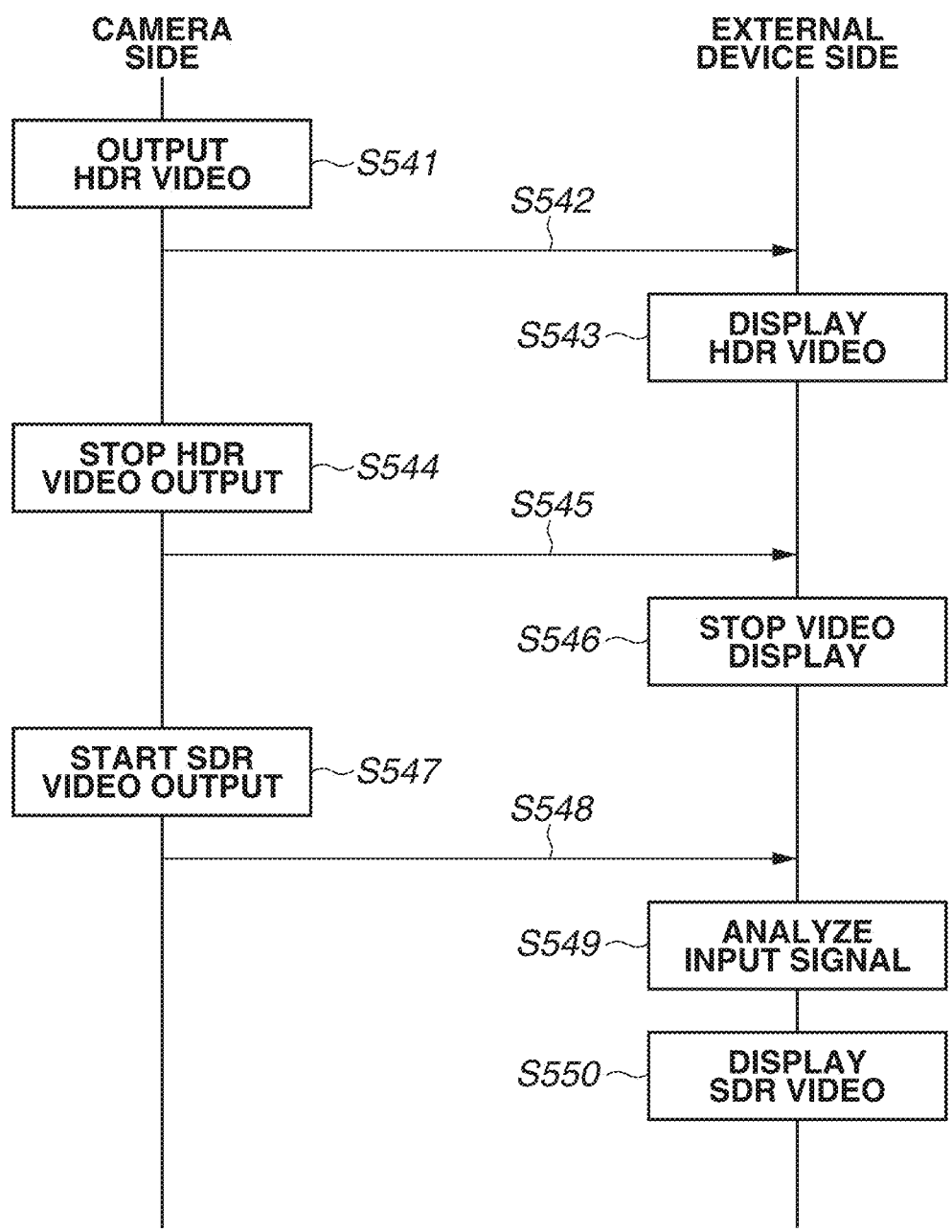

FIG.8C

| 809 | HDR THM IMAGE FOR DISPLAY (HEVC) | 826 |
| | HDR MPF IMAGE FOR DISPLAY (HEVC) | 827 |
| | HDR MAIN IMAGE FOR DISPLAY (HEVC) | 828 |
| | RAW IMAGE | 824 |
| | RAW DEVELOPMENT PARAMETER | 825 |

FIG.8D

| 809 | SDR THM IMAGE FOR DISPLAY (JPEG) | 821 |
| | HDR THM IMAGE FOR DISPLAY (HEVC) | 826 |
| | SDR MPF IMAGE FOR DISPLAY (JPEG) | 822 |
| | HDR MPF IMAGE FOR DISPLAY (HEVC) | 827 |
| | SDR MAIN IMAGE FOR DISPLAY (JPEG) | 823 |
| | HDR MAIN IMAGE FOR DISPLAY (HEVC) | 828 |
| | RAW IMAGE | 824 |
| | RAW DEVELOPMENT PARAMETER | 825 |

FIG.8E

| 809 | SDR THM IMAGE FOR DISPLAY (JPEG) | 821 |
| | HDR MPF IMAGE FOR DISPLAY (HEVC) | 827 |
| | HDR MAIN IMAGE FOR DISPLAY (HEVC) | 828 |
| | RAW IMAGE | 824 |
| | RAW DEVELOPMENT PARAMETER | 825 |

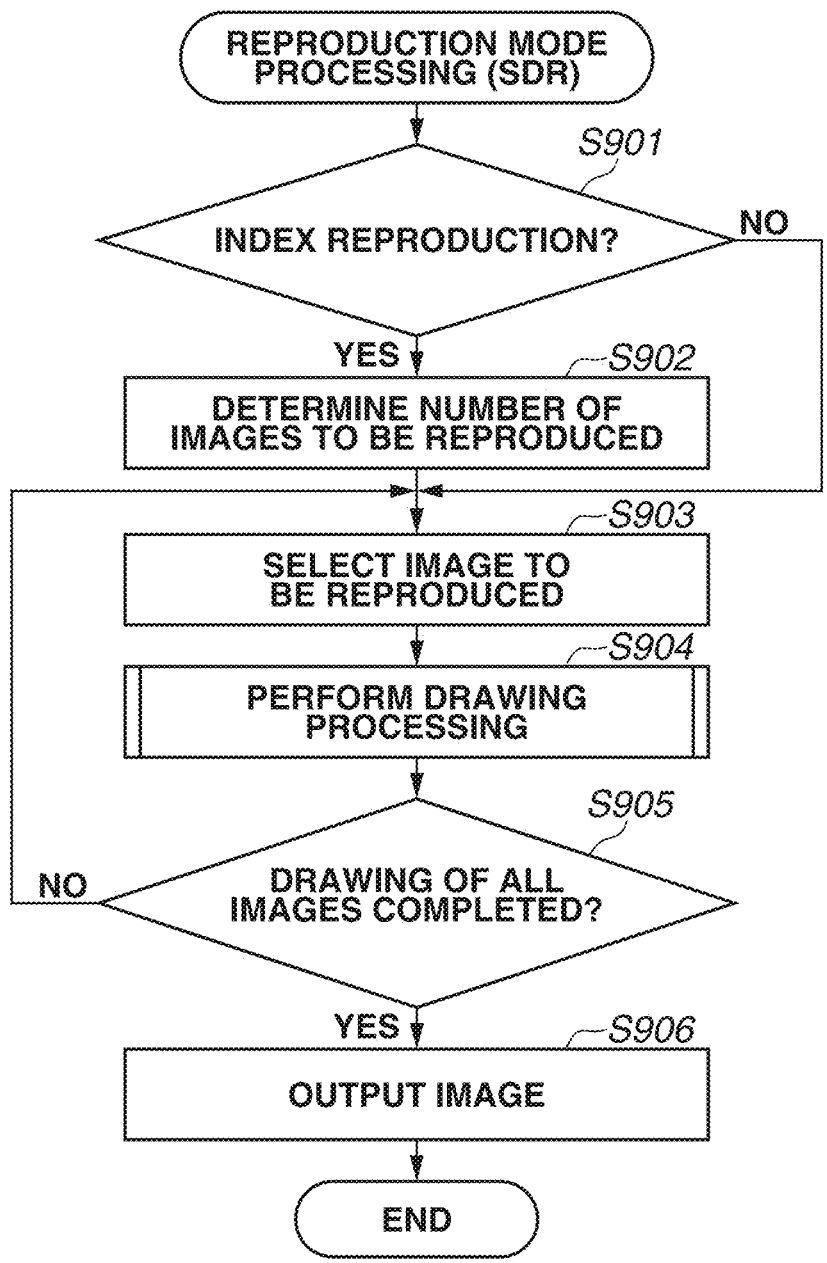

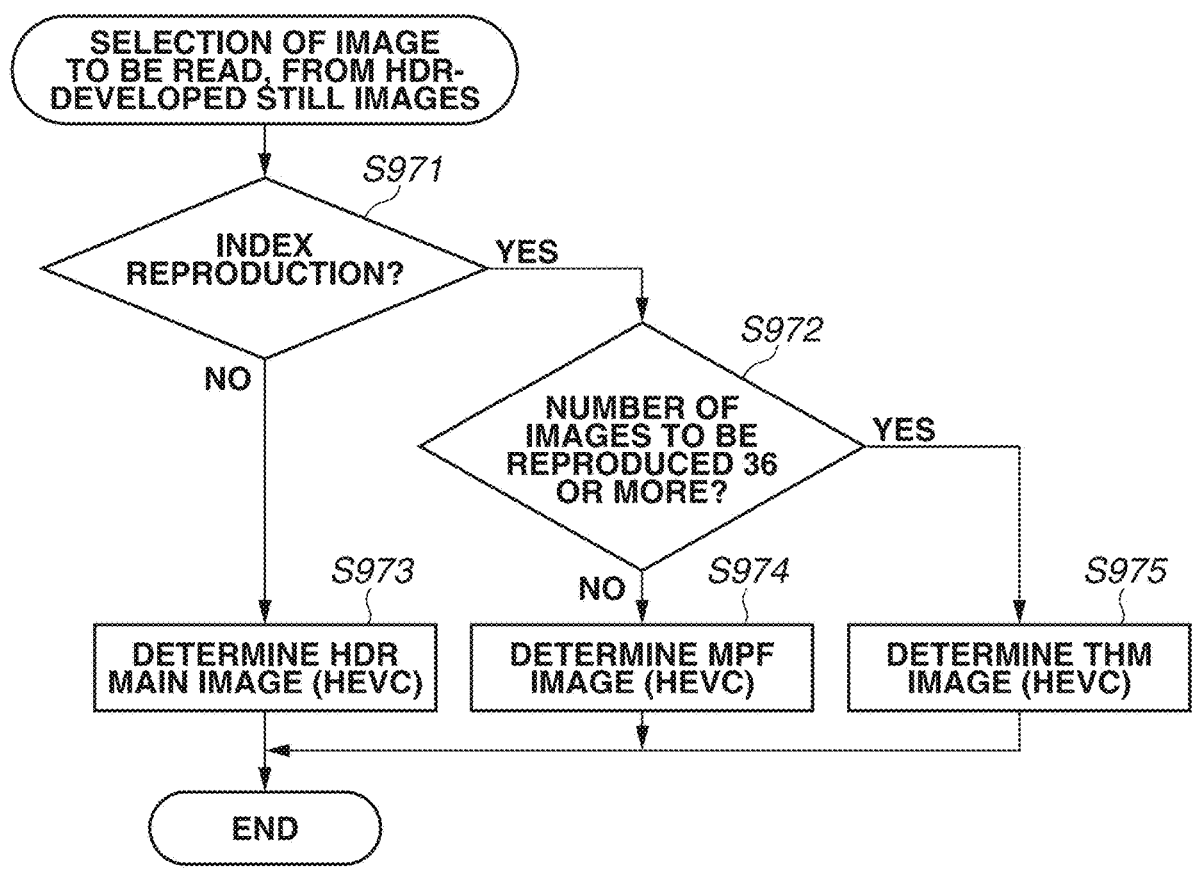

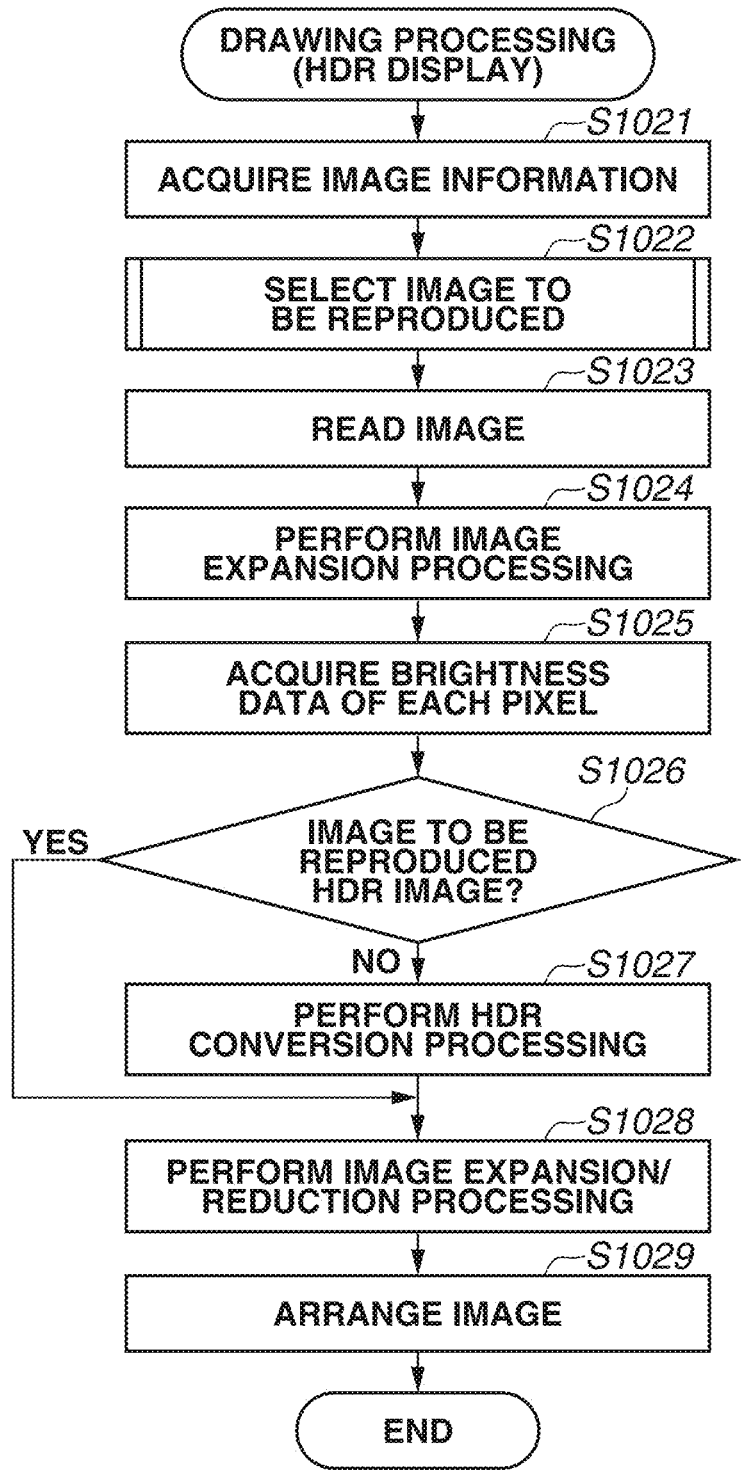

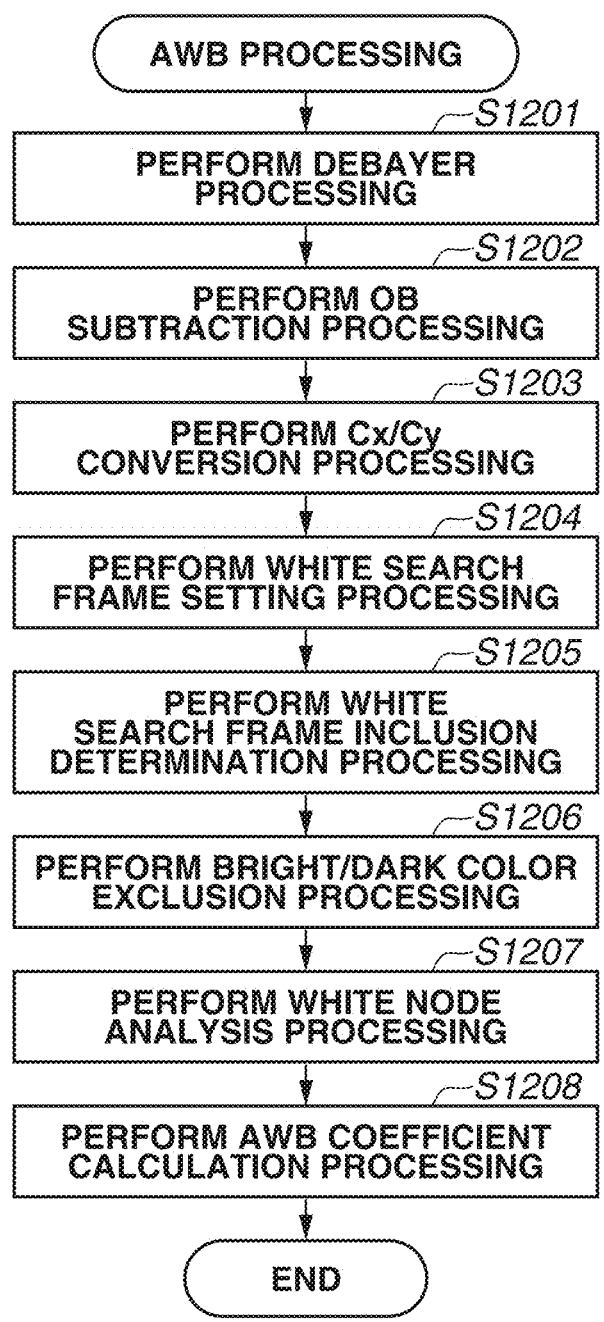

PROPER VALUE

PROPER VALUE

IMAGING APPARATUS, IMAGE PROCESSING APPARATUS, CONTROL METHOD OF THESE, AND STORAGE MEDIUM

CROSS-REFERENCE TO RELATED APPLICATIONS

This application is a Continuation of International Patent Application No. PCT/JP2020/006657, filed Feb. 20, 2020, which claims the benefit of Japanese Patent Application No. 2019-036856, filed Feb. 28, 2019, both of which are hereby incorporated by reference herein in their entirety.

BACKGROUND OF THE INVENTION

Field of the Invention

The present invention relates to an imaging apparatus, an image processing apparatus, a control method of these, and a storage medium.

Background Art

Recent imaging apparatuses represented by digital cameras can capture a high dynamic range (HDR) image and record the HDR image onto a recording medium. The HDR stands for a high dynamic range, and is a technique of generating an image having a wider dynamic range than a standard dynamic range (SDR).

In the case of recording content of an HDR video, the content is recorded together with identification information indicating whether the content is an HDR video (for example, Patent Literature (PTL) 1).

CITATION LIST

Patent Literature

PTL 1: Japanese Patent Application Laid-Open No. 2018-7194

Even if a user performs image capturing with intent to view a captured image as an HDR image, a so-called undeveloped RAW image is sometimes recorded as a recorded image. In this case, it is necessary to appropriately develop the RAW image as an HDR image.

It is also necessary to save a RAW image obtained with intent to be viewed as an HDR image, in an appropriate format.

SUMMARY OF THE INVENTION

The present invention is directed to appropriately developing a RAW image as an HDR image, to address the above described issues.

According to an aspect of the present invention, an imaging apparatus includes first setting means for performing a setting regarding a dynamic range before image capturing, second setting means for setting a recording format of a captured image before the image capturing, and first recording means for recording RAW image data that is based on an image signal obtained by the image capturing, in a case where recording of RAW image data is set by the second setting means, wherein, in a case where a setting indicating a high dynamic range (HDR) is performed by the first setting means, the first recording means records the RAW image data in association with development information corresponding to the HDR, and in a case where a setting indicating a standard dynamic range (SDR) is performed by the first setting means, the first recording means records the RAW image data in association with development information corresponding to the SDR.

Further features of the present invention will become apparent from the following description of exemplary embodiments with reference to the attached drawings.

BRIEF DESCRIPTION OF THE DRAWINGS

FIGS. 4A1 to 4A3 are flowcharts of live view (LV) image capturing mode processing according to the exemplary embodiment.

FIG. 5B is a sequence diagram of the HDMI connection processing according to the exemplary embodiment.

FIG. 5C is a sequence diagram of the HDMI connection processing according to the exemplary embodiment.

FIG. 8C is a diagram illustrating an example of region Image Data in a RAW file.

FIG. 8D is a diagram illustrating an example of region Image Data in a RAW file.

FIG. 8E is a diagram illustrating an example of region Image Data in a RAW file.

FIG. 9A is a flowchart of reproduction mode processing according to the exemplary embodiment.

FIG. 9F is a flowchart of the reproduction mode processing according to the exemplary embodiment.

FIG. 10B is a flowchart of the HDMI reproduction processing according to the exemplary embodiment.

FIG. 12 is a flowchart of development processing according to the exemplary embodiment.

DESCRIPTION OF THE EMBODIMENTS

Figure 1A:
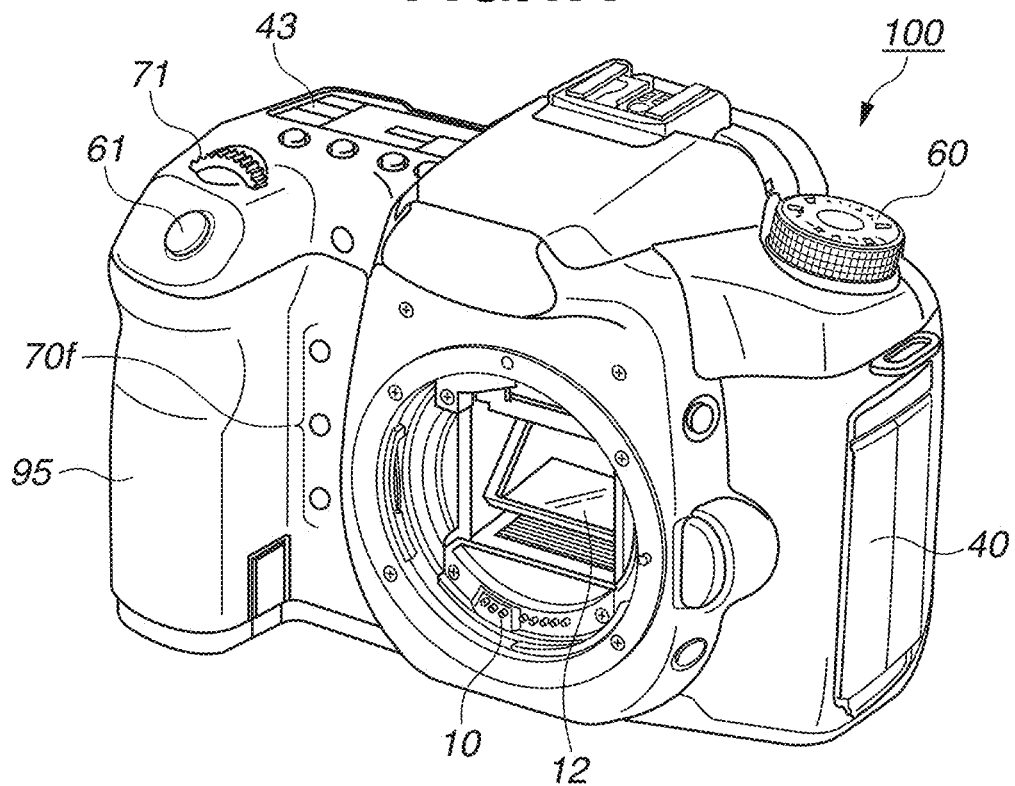
FIG. 1A is an external view of an imaging/display apparatus according to an exemplary embodiment.

Hereinafter, exemplary embodiments will be described in detail with reference to attached drawings. The following exemplary embodiments are not intended to limit the invention set forth in the appended claims. A plurality of features is described in the exemplary embodiments, but not all of the plurality of features is always essential to the invention, and the plurality of features may be arbitrarily combined. Furthermore, in the attached drawings, the same or similar configurations are assigned the same reference numerals, and redundant description will be omitted.

Figure 1B:
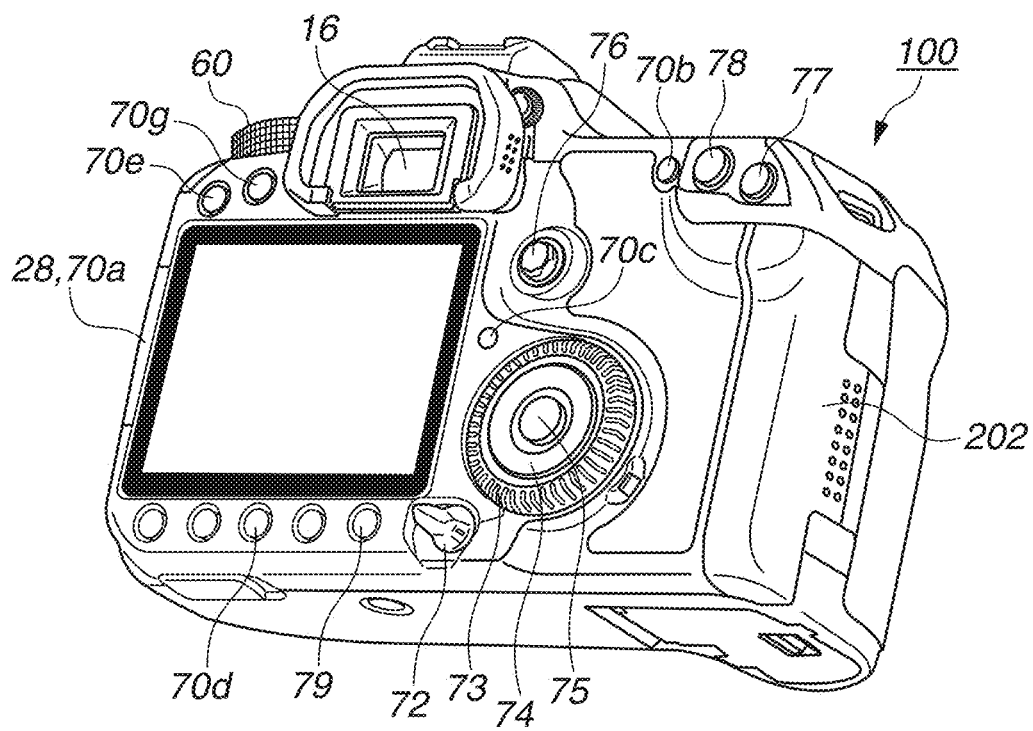
FIG. 1B is an external view of the imaging/display apparatus according to the exemplary embodiment.

FIGS. 1A and 1B illustrate external views of a digital camera 100 serving as an example of an apparatus to which the present exemplary embodiment is applied. FIG. 1A is a front perspective view of the digital camera 100 and FIG. 1B is a back perspective view of the digital camera 100. In FIGS. 1A and 1B, a display unit 28 is a display unit provided on a camera back surface that displays images and various types of information. A viewfinder external display unit 43 is a display unit provided on a camera top surface. Various setting values of a camera including a shutter speed and an aperture are displayed on the viewfinder external display unit 43. A shutter button 61 is an operation unit for issuing an image capturing instruction. A mode selection switch 60 is an operation unit for switching between various modes. A terminal cover 40 is a cover that protects a connector (not illustrated) for, for example, a connection cable that connects the digital camera 100 with an external device. A main electronic dial 71 is a rotary operation member included in an operation unit 70. By rotating the main electronic dial 71, the user can change setting values, such as a shutter speed and an aperture. A power switch 72 is an operation member for switching between ON and OFF of power of the digital camera 100. A sub electronic dial 73 is a rotary operation member included in the operation unit 70, and is used for moving a selected frame or feeding an image. A cross key 74 is a cross key (four-direction key) included in the operation unit 70. The upper, lower, left, and right parts of the cross key 74 can be individually pushed in. An operation corresponding to a pressed part of the cross key 74 can be performed. A SET button 75 is a push button included in the operation unit 70, and is used mainly for determining a selected item. A live view (LV) button 76 is included in the operation unit 70, and is a button for switching between ON and OFF of live view (hereinafter, LV) in a still image capturing mode. In a moving image capturing mode, the LV button 76 is used for issuing a start or stop instruction of moving image capturing (recording). An enlargement button 77 is included in the operation unit 70, and is an operation button for switching between ON and OFF of an enlarged mode in live view display of an image capturing mode, and for changing an enlargement ratio during the enlarged mode. In a reproduction mode, the enlargement button 77 functions as an enlargement button for enlarging a reproduced image and increasing an enlargement ratio. A reduction button 78 is included in the operation unit 70, and is a button for reducing an enlargement ratio of an enlarged reproduced image, or reducing a displayed image. A reproduction button 79 is included in the operation unit 70, and is an operation button for switching between the image capturing mode and the reproduction mode. By pressing the reproduction button 79 while the digital camera 100 is in the image capturing mode, the digital camera 100 shifts to the reproduction mode, and can display a latest image among images recorded on a recording medium 200, on the display unit 28 or an external device 300. A quick return mirror 12 is moved up and down by an actuator (not illustrated) in accordance with an instruction from a system control unit 50. A communication terminal 10 is a communication terminal for the digital camera 100 to perform communication with a lens (detachable). A viewfinder 16 is a look-in viewfinder for checking a focal point and a composition of an optical image of a subject that is obtained through a lens unit 150, by observing a focusing screen 13. A lid 202 is a lid of a slot storing the recording medium 200. A grip portion 95 is a holding portion having a shape that can be easily grasped by a right hand when the user holds the digital camera 100.

Figure 2:
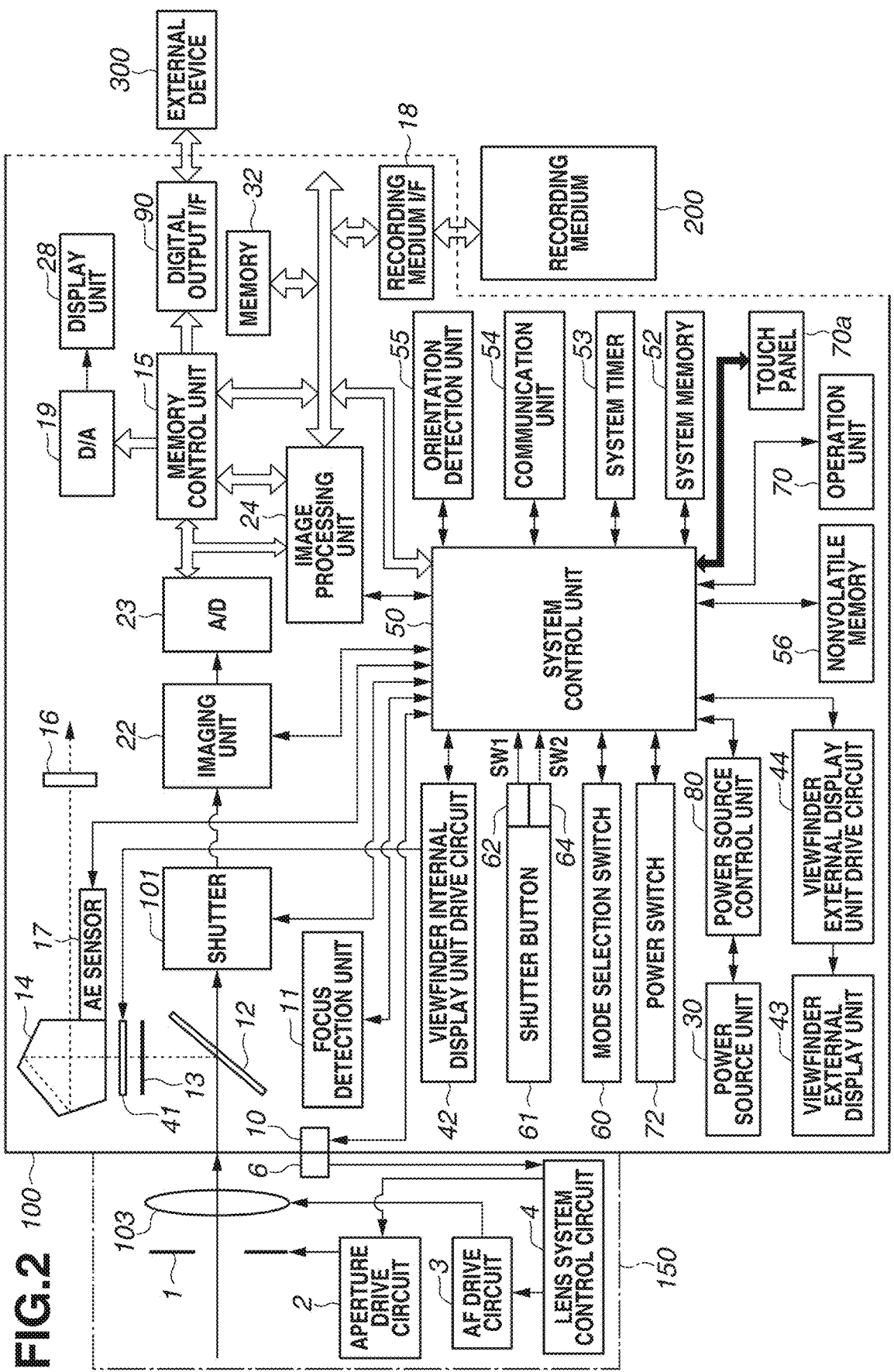
FIG. 2 is a block diagram illustrating a configuration of the imaging/display apparatus according to the exemplary embodiment.

FIG. 2 is a block diagram illustrating a configuration example of the digital camera 100 according to the present exemplary embodiment.

In FIG. 2, the lens unit 150 is a lens unit including an interchangeable imaging lens.

A lens 103 normally includes a plurality of lenses, but the plurality of lenses is simplified and only one lens is illustrated in FIG. 2. A communication terminal 6 is a communication terminal for the lens unit 150 to perform communication with the digital camera 100. The communication terminal 10 is a communication terminal for the digital camera 100 to perform communication with the lens unit 150. The lens unit 150 communicates with the system control unit 50 via the communication terminals 6 and 10, controls an aperture 1 via an aperture drive circuit 2 using an internal lens system control circuit 4, and performs focusing by displacing a position of the lens 103 via an autofocus (AF) drive circuit 3.

An autoexposure (AE) sensor 17 measures brightness of a subject that is obtained through the lens unit 150. A focus detection unit 11 outputs defocus amount information to the system control unit 50. The system control unit 50 controls the lens unit 150 based on the defocus amount information and performs phase difference AF.

The quick return mirror 12 (hereinafter, mirror 12) is moved up and down by the actuator (not illustrated) in accordance with an instruction issued from the system control unit 50 at the time of exposure, live view image capturing, and moving image capturing. The mirror 12 is a mirror for switching a light flux entering from the lens 103, to the viewfinder 16 and an imaging unit 22. The mirror 12 is normally arranged to reflect and guide a light flux to the viewfinder 16. When image capturing or live view display is to be performed, the mirror 12 moves upward and stays out of a light flux in such a manner as to guide the light flux to an imaging unit 22 (mirror up). In addition, the mirror 12 has a half-mirror configuration in which a center part thereof allows a part of light to pass through, whereby the mirror 12 allows a part of light to enter the focus detection unit 11 for performing focus detection.

A user (photographer) can check a focal point and a composition of an optical image of a subject that is obtained through the lens unit 150, by observing the focusing screen 13 via a pentaprism 14 and the viewfinder 16.

A shutter 101 is a focal plane shutter that can freely control an exposure time of the imaging unit 22 under the control of the system control unit 50.

The imaging unit 22 is an image sensor including a charge-coupled device (CCD) sensor or a complementary metal-oxide semiconductor (CMOS) sensor that converts an optical image into an electrical signal. On an imaging plane of the imaging unit 22, filters having color components of R, G, and B are arranged two-dimensionally and periodically. In 2×2 adjacent filters, G-component filters are arranged as two filters in a diagonal relationship, and a G-component filter and a B-component filter are arranged as the remaining filters. In addition, such 2×2 filters are arrayed on the imaging plane of the imaging unit 22. Such an array is generally called a Bayer array. Thus, an image represented by signals (analog signals) output from the imaging unit 22 corresponds to pixel signals having the Bayer array. An analog-to-digital (A/D) converter 23 converts a one-pixel analog signal output from the imaging unit 22, into a ten-bit digital signal, for example. Image data obtained in this phase is image data having a Bayer array in which one pixel includes one component, and one component has ten bits as described above, and is undeveloped image data. Thus, image data in this phased will be referred to as RAW image data. Image data having a Bayer array that is obtained after compensating for a defective pixel may be also regarded as RAW image data. In the exemplary embodiment, the A/D converter 23 converts an analog signal into ten-bit digital data, but the number of bits is only required to be the number of bits exceeding eight bits, and is not specifically limited. As the number of bits becomes larger, it becomes possible to perform higher gradation representation.

An image processing unit 24 performs resize processing, such as predetermined pixel interpolation or reduction, and color conversion processing, on data from the A/D converter 23 or data from a memory control unit 15. The image processing unit 24 also performs predetermined calculation processing using data of a captured image. The system control unit 50 performs exposure control and ranging control based on the obtained calculation result. Through-the-lens (TTL) system AF processing, AE processing, and electronic flash pre-emission (EF) processing are thereby performed. The image processing unit 24 further performs predetermined calculation processing using data of a captured image, and also performs TTL system automatic white balance (AWB) processing, based on the obtained calculation result. The image processing unit 24 further performs encoding/decoding processing of image data under the control of the system control unit 50. The encoding includes Joint Photographic Experts Group (JPEG) and High Efficiency Video Coding (HEVC). The JPEG is a technique for encoding image data in which one color component has eight bits, and the HEVC is a technique for encoding image data in which one color component has bits exceeding eight bits.

Output data from the A/D converter 23 is directly written into a memory 32 via the image processing unit 24 and the memory control unit 15, or via the memory control unit 15. The memory 32 stores image data obtained by the imaging unit 22 and converted by the A/D converter 23 into digital data, and image data to be displayed on the display unit 28 or the external device 300. The memory 32 has a storage capacity sufficient for storing a predetermined number of still images, and a predetermined time length of a moving image and voice.

In addition, the memory 32 also serves as a memory (video memory) for image display. A digital-to-analog (D/A) converter 19 converts data for image display that is stored in the memory 32, into an analog signal, and supplies the analog signal to the display unit 28. The image data for display that is written into the memory 32 in this manner is displayed by the display unit 28 via the D/A converter 19. The display unit 28 performs display according to the analog signal from the D/A converter 19, on a display device, such as a liquid crystal display (LCD). The digital signals having been once A/D-converted by the A/D converter 23 and stored in the memory 32 are D/A-converted by the D/A converter 19, and sequentially transferred to the display unit 28 and displayed thereon. This enables a function as an electronic viewfinder and live view display.

A frame (AF frame) indicating a ranging point at which autofocusing is currently performed, and an icon indicating a setting state of a camera are displayed on a viewfinder internal display unit 41 via a viewfinder internal display unit drive circuit 42. Various setting values of a camera including a shutter speed and an aperture are displayed on the viewfinder external display unit 43 via a viewfinder external display unit drive circuit 44.

A digital output interface (I/F) 90 supplies data for image display that is stored in the memory 32, to the external device 300 without converting from a digital signal. For example, the digital output I/F 90 outputs moving image data in a stream format in accordance with a communication protocol complying with a high-definition multimedia interface (HDMI) (registered trademark) standard. In this manner, image data for display that is written into the memory 32 is displayed on the external device 300.

A nonvolatile memory 56 is an electrically-erasable/recordable memory, and for example, an electrically erasable programmable read-only memory (EEPROM) is used. Constants for operating the system control unit 50 and programs are stored in the nonvolatile memory 56. The programs refer to programs for executing various flowcharts to be described below in the present exemplary embodiment.

The system control unit 50 is a control unit including at least one processor, and controls the entire digital camera 100. By executing the above-described program recorded in the nonvolatile memory 56, the system control unit 50 implements each piece of processing in the present exemplary embodiment, which will be described below. A random access memory (RAM) is used as a system memory 52. Constants for operating the system control unit 50, variables, and programs read out from the nonvolatile memory 56 are loaded onto the system memory 52. The system control unit 50 also performs display control by controlling the memory 32, the D/A converter 19, the digital output I/F 90, the display unit 28, and the like.

A system timer 53 is a time measuring unit for measuring a time to be used for various types of control or a time of a built-in clock.

The mode selection switch 60, a first shutter switch 62, a second shutter switch 64, and the operation unit 70 function as operating means for inputting various operation instructions to the system control unit 50.

The mode selection switch 60 switches an operation mode of the system control unit 50 to any of a still image recording mode, the moving image capturing mode, and the reproduction mode. The still image recording mode includes modes, such as an automatic image capturing mode, an automatic scene determination mode, a manual mode, an aperture priority mode (Av mode), and a shutter speed priority mode (Tv mode). The still image recording mode further includes modes, such as various scene modes having different image capturing settings for respective image capturing scenes, a program AE mode, and a custom mode. Via the mode selection switch 60, an operation mode is directly switched to any of these modes. Alternatively, an operation mode may be switched in the following manner. The mode selection switch 60 once switches a screen to a list screen of image capturing modes. Then, any of a plurality of displayed modes is selected using another operation member so that an operation mode is switched to the selected mode. The moving image capturing mode may similarly include a plurality of modes.

The shutter button 61 to be operated by the user includes the first shutter switch 62 and the second shutter switch 64. The first shutter switch 62 is turned ON in the middle of an operation of the shutter button 61 that is performed by the user. That is to say, the first shutter switch 62 is turned ON by so-called half press (image capturing preparation instruction), and generates a first shutter switch signal SW1. When the first shutter switch signal SW1 is input, the system control unit 50 starts an operation of AF processing, AE processing, AWB processing, and EF processing. The second shutter switch 64 is turned ON upon the completion of an operation of the shutter button 61. That is to say, the second shutter switch 64 is turned ON by so-called full press (image capturing instruction), and generates a second shutter switch signal SW2. According to the second shutter switch signal SW2, the system control unit 50 starts operations of a series of image capturing processes starting from the readout of a signal from the imaging unit 22 up to writing of image data onto the recording medium 200.

Operation members of the operation unit 70 function as various functional buttons by allocating appropriate functions to the operation members for each scene by selectively operating various functional icons displayed on the display unit 28 or the external device 300. Examples of the functional buttons include an end button, a return button, an image feeding button, a jump button, a narrowing-down button, and an attribute change button. For example, when a menu button 70e is pressed, a menu screen for enabling various settings to be performed is displayed on the display unit 28 or the external device 300. The user can intuitively perform various settings using the menu screen displayed on the display unit 28 or the external device 300, a four-direction (up, down, left, and right) button, and the SET button.

The display unit 28 according to the exemplary embodiment has an image representation function with standard dynamic range (SDR) image quality. That is, the display unit 28 can display an image in which color components of R, G, and B each have eight bits (256 gradations). When the external device 300 is connected to the digital camera 100, the external device 300 is set as an output destination device of a captured image or a live image in place of the display unit 28. When the user operates the operation unit 70 to explicitly select either the display unit 28 or the external device 300, a selected device serves as an output destination device.

The operation unit 70 includes various operation members serving as an input unit for receiving operations from the user. The operation unit 70 at least includes the following operation units: the shutter button 61, the main electronic dial 71, the power switch 72, the sub electronic dial 73, the cross key 74, the SET button 75, the LV button 76, the enlargement button 77, the reduction button 78, and the reproduction button 79. The cross key 74 is a directional button, and the upper, lower, left, and right parts of the cross key 74 can be individually pushed in. In the present exemplary embodiment, the cross key 74 is described as an integrally-formed operation unit, but an up button, a down button, a right button, and a left button may be independent buttons. Hereinafter, an upper part or a lower part will be referred to as an up-down key, and a left part or right part will be referred to as a left-right key. The operation unit 70 further includes the following operation units.

An AF-ON button 70b is a push button switch included in the operation unit 70, and can issue an AF execution instruction by being pressed. A press-down direction of the AF-ON button 70b is parallel to a direction (optical axis) of subject light entering the imaging unit 22 from the lens 103.

A quick setting button 70c (hereinafter, Q button 70c) is a push button switch included in the operation unit 70. By pressing the quick setting button 70c, a quick setting menu indicating a list of setting items settable in each operation mode is displayed. For example, if the quick setting button 70c is pressed during image capturing standby in live view image capturing, a list of setting items such as an electronic front curtain shutter, the brightness of a monitor, WB of a LV screen, two-point enlargement, and silent image capturing is displayed in a row with being superimposed on LV. By selecting an arbitrary option of the displayed quick setting menu using the up-down key and pressing a set button, the user can change a setting regarding the selected setting item or shift the digital camera 100 to an operation mode.

An active frame switching button 70d is a push button switch included in the operation unit 70. By being pressed in two-point enlargement processing to be described below, the active frame switching button 70d can switch an active enlarged position (frame) out of two points in an enlarged state. A function allocated to the active frame switching button 70d varies depending on the operation mode. If the active frame switching button 70d is pressed in the reproduction mode, a protect attribute can be added to an image being displayed.

The menu button 70e is a push button switch included in the operation unit 70. When the menu button 70e is pressed, a menu screen for enabling various settings to be performed is displayed on the display unit 28 or the external device 300.

Function buttons 70f are three push button switches included in the operation unit 70, and functions are allocated to the respective function buttons 70f Each of the function buttons 70f is arranged at a position operable by a finger (middle finger, medicinal finger, or little finger) of the right hand holding the grip portion 95. A press-down direction is parallel to a direction (optical axis) of subject light entering the imaging unit 22 from the lens 103.

An information button 70g is a push button switch included in the operation unit 70, and is used for switching of various types of information display.

A power source control unit 80 includes a battery detection circuit, a direct current (DC)-DC converter, and a switch circuit for switching a block to be supplied with power. The power source control unit 80 detects whether or not a battery is attached, the type of the battery, and remaining battery capacity. The power source control unit 80 controls the DC-DC converter based on the detection result and an instruction from the system control unit 50, and supplies necessary voltage to components including the recording medium 200 for a necessary time period.

A power source unit 30 includes a primary battery, such as an alkaline battery or a lithium battery, a secondary battery, such as a nickel-cadmium (NiCd) battery, a nickel-metal hydride (NiMH) battery, or a lithium (Li) battery, and an alternating current (AC) adapter. A recording medium I/F 18 is an interface to the recording medium 200 such as a memory card or a hard disc. The recording medium 200 is a recording medium such as a memory card for recording a captured image, and includes a semiconductor memory or a magnetic disc.

A communication unit 54 is connected wirelessly or via a wired cable, and transmits or receives a video signal and an audio signal. The communication unit 54 can also be connected with a wireless local area network (LAN) and the Internet. The communication unit 54 can transmit an image (including a live view) captured by the imaging unit 22 and an image recorded on the recording medium 200. The communication unit 54 can also receive image data and other various types of information from an external device.

An orientation detection unit 55 detects the orientation of the digital camera 100 with respect to a direction of gravitational force. Based on the orientation detected by the orientation detection unit 55, it can be determined whether an image captured by the imaging unit 22 is an image captured with the digital camera 100 being held in a traverse direction or an image captured with the digital camera 100 being held in a longitudinal direction. The system control unit 50 can add orientation information corresponding to the orientation detected by the orientation detection unit 55, to an image file of an image captured by the imaging unit 22, or record an image with being rotated. As the orientation detection unit 55, an acceleration sensor or a gyro sensor can be used.

A touch panel 70a that can detect a touch performed on the display unit 28 is included as one operation member of the operation unit 70. The touch panel 70a and the display unit 28 can be integrally formed. For example, the touch panel 70a is configured to have light transmittance that does not disturb display performed on the display unit 28, and attached to a top layer of a display surface of the display unit 28. Then, an input coordinate on the touch panel 70a and a display coordinate on the display unit 28 are associated with each other. With this configuration, a graphical user interface (GUI) can be formed as if the user could directly operate a screen displayed on the display unit 28. The system control unit 50 can detect the following operation performed on the touch panel 70a or the state thereof.

An operation of a finger or a stylus that has not been in touch with the touch panel 70a newly touching the touch panel 70a, i.e., the start of a touch on the touch panel 70a (hereinafter, referred to as "Touch-Down").

A state in which a finger or a stylus is in touch with the touch panel 70a (hereinafter, referred to as "Touch-On").

An operation of a finger or a stylus moving over the touch panel 70a while being in touch with the touch panel 70a (hereinafter, referred to as "Touch-Move").

An operation of a finger or a stylus that has been in touch with the touch panel 70a is detached, i.e., the end of a touch on the touch panel 70a (hereinafter, referred to as "Touch-Up").

A state in which nothing touches the touch panel 70a (hereinafter, referred to as "Touch-Off").

When the Touch-Down is detected, the Touch-On is simultaneously detected. After the Touch-Down, normally, the Touch-On continues to be detected until the Touch-Up is detected. The Touch-Move is detected in the state in which the Touch-On is detected. Even if the Touch-On is detected, the Touch-Move is not detected unless a touch position moves. After the Touch-Up of all the fingers or styluses that have been in touch is detected, the Touch-Off is detected.

These operations and states, and a position coordinate on the touch panel 70a at which a finger or a stylus is in touch are notified to the system control unit 50 via an internal bus. Based on the notified information, the system control unit 50 determines what type of operation (touch operation) has been performed on the touch panel 70a. As for the Touch-Move, a moving direction of a finger or a stylus moving on the touch panel 70a can also be determined for each perpendicular component/horizontal component on the touch panel 70a, based on a change in position coordinate. When it is detected that the Touch-Move is performed for a predetermined distance or more, it is determined that a slide operation has been performed. An operation of swiftly moving a finger by a certain amount of distance with the finger being in touch with a touch panel, and detaching the finger in this state will be referred to as a flick. In other words, the flick is an operation of swiftly moving the finger over the touch panel 70a like a flip. If it is detected that the Touch-Move has been performed at a predetermined speed or more for a predetermined distance or more, and then the Touch-Up is detected in this state, it can be determined that a flick has been performed (it can be determined that a flick has been performed subsequent to the slide operation). Furthermore, a touch operation of simultaneously touching a plurality of locations (e.g. two points), and bringing the touch positions closer to each other will be referred to as "pinch-in", and a touch operation of bringing the touch positions away from each other will be referred to as "pinch-out". The pinch-out and the pinch-in will be collectively referred to as a pinch operation (or simply "pinch"). As the touch panel 70a, a touch panel of any of the following various types may be used: a resistive touch panel, a capacitive touch panel, a surface acoustic wave touch panel, an infrared touch panel, an electromagnetic induction type touch panel, an image recognition type touch panel, and an optical sensor type touch panel. Depending on the types, some touch panels detect a touch upon detecting contact with the touch panels while the other touch panels detect a touch upon detecting the proximity of a finger or a stylus to the touch panels. A touch panel of any type of them may be used.

An application example is not limited to an imaging apparatus main body, and the present invention can also be applied to a control apparatus that communicates with an imaging apparatus (including a network camera) via wired or wireless communication, and remotely controls the imaging apparatus. Examples of the control apparatus that remotely controls the imaging apparatus include a smartphone, a table personal computer (PC), and a desktop PC. By notifying commands for causing the imaging apparatus to perform various operations and settings, from the control apparatus based on operations performed by the control apparatus or processing performed by the control apparatus, the imaging apparatus can be remotely controlled. In addition, the control apparatus may be enabled to receive a live view image captured by the imaging apparatus, via wired or wireless communication, and display the live view image.

The above description has been given of an example case where the present invention is applied to a digital camera, but the present invention is not limited to this. The present invention can be applied to any apparatus that includes a display unit, such as a personal digital assistance (PDA), a mobile phone terminal, a portable image viewer, a printing apparatus including a display, a digital photo frame, a music player, a game machine, and an electronic book reader, for example.

Figure 3:
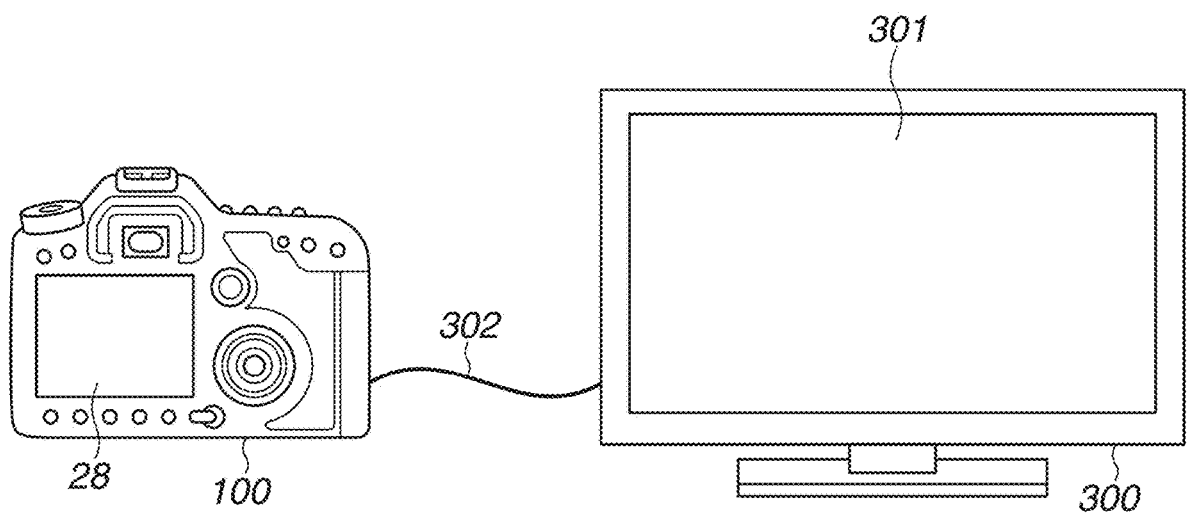
FIG. 3 is a configuration diagram of connection with an external device.

FIG. 3 is a diagram illustrating a connection example of the digital camera 100 and the external device 300. When the digital camera 100 and the external device 300 are connected by a connection cable 302, the display unit 28 of the digital camera 100 blacks out and the display of the digital camera 100 is switched to a display 301 of the external device 300.

FIGS. 4A1 to 4A3 are flowcharts of LV image capturing mode processing to be performed in the digital camera 100. The processing is implemented by the system control unit 50 loading a program recorded in the nonvolatile memory 56, onto the system memory 52 and executing the program.

First of all, a high dynamic range (HDR) image capturing mode and an SDR image capturing mode according to the present exemplary embodiment will be described. The digital camera 100 of the present exemplary embodiment can set the HDR image capturing mode or the SDR image capturing mode in accordance with a menu operation performed by the user. These modes are modes for setting, with a user's intention, whether final image data is to be obtained with HDR image quality or image data with SDR image quality. In the following processing, various types of control are performed in accordance with a set mode. Hereinafter, performing image capturing in the HDR image capturing mode or the SDR image capturing mode will be sometimes described as "HDR image capturing" or "SDR image capturing". Nevertheless, because recording only in a RAW format can also be set as described below, an HDR image is not always recorded in a case where an image is captured in the HDR image capturing mode.

In step S401, the system control unit 50 determines whether a setting made by user using the operation unit 70 indicates the HDR image capturing mode. In a case where the system control unit 50 determines that the HDR image capturing mode is set (YES in step S401), the processing proceeds to step S402. In a case where the system control unit 50 determines that the SDR image capturing mode is set (NO in step S401), the processing proceeds to step S422.

In step S402, the system control unit 50 determines whether the external device 300 is connected to the digital camera 100. In a case where the system control unit 50 determines that the external device 300 is connected (YES in step S402), the processing proceeds to step S403. In a case where the system control unit 50 determines that the external device 300 is not connected (NO in step S402), the processing proceeds to step S404.

In step S403, the system control unit 50 performs connection processing of the digital camera 100 and the external device 300. Then, the system control unit 50 advances the processing to step S404. The details of the connection processing will be described below with reference to FIGS. 5A to 5C. If an external device supports HDR connection, HDR connection is performed, and if the external device does not support HDR connection, SDR connection is performed.

In step S404, the system control unit 50 performs, using the image processing unit 24, development processing of HDR image quality on live RAW image data obtained by converting an image captured by the imaging unit 22, into a digital signal by the A/D converter 23. Hereinafter, an image obtained by development processing of HDR image quality will be referred to as an HDR image.

HDR image data in the exemplary embodiment is data in which one pixel includes three components (Luv or YCbCr, etc.), and each component is represented in ten bits (1024 gradations) in the exemplary embodiment. A gamma curve for an HDR image (for example, PQ or HLG of ITU-R Recommendation BT.2100) is applied to HDR image data.

In step S405, the system control unit 50 determines whether a device (the display unit 28 or the external device 300) that displays a LV image supports an HDR. In a case where it is determined that the device does not support the HDR (NO in step S405), the processing proceeds to step S406. In a case where it is determined that the device supports the HDR (YES in step S405), the processing proceeds to step S409.

In step S406, the system control unit 50 determines whether an HDR assist display setting is set to assist 1. In a case where the system control unit 50 determines that the assist 1 is set (YES in step S406), the processing proceeds to step S407. In a case where the system control unit 50 determines that assist 2 is set (NO in step S406), the processing proceeds to step S408. The assist 1 is a setting for checking a high brightness region of an HDR image, and processing of allocating a large number of gradations (code value) to a high brightness range of the HDR image is performed. The assist 2 is a setting for checking an intermediate brightness range of an HDR image, and processing of allocating a large number of gradations (code value) to an intermediate brightness region of the HDR image is performed.

In step S407, the system control unit 50 performs HDR-to-SDR conversion processing on HDR image data obtained by development processing in step S404, in accordance with the setting of assist 1, and displays LV image data with SDR image quality that is obtained by performing resize processing for converting an image size into a size suitable for an output destination device (the display unit 28 or the external device 300). Then, the processing proceeds to step S410.

In step S408, the system control unit 50 performs HDR-to-SDR conversion processing on HDR image data obtained by development processing in step S404, in accordance with the setting of assist 2, and displays LV image data with SDR image quality that is obtained by performing resize processing for converting an image size into a size suitable for an output destination device (the display unit 28 or the external device 300). Then, the processing proceeds to step S410.

The image data (SDR image data) with SDR image quality in steps S407 and S408 refers to image data in which one component has eight bits. A gamma curve for an SDR image (for example, gamma curve of sRGB specification) is applied to image data with SDR image quality. As a gamma curve of sRGB specification, a curve including a straight line portion corresponding to a dark section, and a curved portion with an exponent of 2.4 that corresponds to a bright section is generally used, but a curve with an exponent of 2.2 may be used as a simplified gamma curve.

In step S409, the system control unit 50 resizes HDR image data obtained by development processing in step S404, into a size suitable for an output destination device (the display unit 28 or the external device 300), and displays a live resized image with HDR image quality (hereinafter, HDL LV image). Then, the processing proceeds to step S410.

In step S410, the system control unit 50 determines whether the menu button 70e has been pressed. In a case where it is determined that the menu button 70e has been pressed (YES in step S410), the processing proceeds to step S411. In a case where it is determined that the menu button 70e has not been pressed (NO in step S410), the processing proceeds to step S412. In step S411, the system control unit 50 performs image capturing menu processing, and advances the processing to step S412. The details of the image capturing menu processing will be described below with reference to FIGS. 6A and 6B.

In step S412, the system control unit 50 determines whether the information button 70g has been pressed. In a case where it is determined that the information button 70g has been pressed (YES in step S412), the processing proceeds to step S413. In a case where it is determined that the information button 70g has not been pressed (NO in step S412), the processing proceeds to step S414. In step S413, the system control unit 50 switches the display of image capturing information, and the processing proceeds to step S414. The image capturing information includes a histogram and a highlight warning table.

In step S414, the system control unit 50 determines whether the shutter button 61 is in a half pressed state, based on whether the signal SW1 has been received. In a case where it is determined that the shutter button 61 is not half pressed (NO in step S414), the processing proceeds to step S420. In a case where it is determined that the shutter button 61 is in a half pressed state (YES in step S414), the processing proceeds to step S415.

In step S415, the system control unit 50 performs AF/AE processing described with reference to FIG. 2, and the processing proceeds to step S416. In step S416, the system control unit 50 determines whether the shutter button 61 is in a fully pressed state, based on whether the signal SW2 has been received. In a case where it is determined that the shutter button 61 is not in a fully pressed state (NO in step S416), the processing proceeds to step S417. In a case where it is determined that the shutter button 61 is in a fully pressed state (YES in step S416), the processing proceeds to step S418. In step S417, the system control unit 50 determines whether the half pressed state of the shutter button 61 is maintained. In a case where it is determined that the half pressed state is maintained (YES in step S417), the processing returns to step S415. In a case where it is determined that the half pressed state is not maintained (NO in step S417), the processing proceeds to step S420. In step S418, the system control unit 50 performs HDR image capturing processing, and records an image data file complying with a preset recording format, onto a recording medium. FIG. 8A illustrates a data structure of a file to be recorded. Then, the system control unit 50 advances the processing to step S419. The details of the HDR image capturing processing will be described below with reference to FIG. 7. Then, in step S419, the system control unit 50 performs quick review display processing, and advances the processing to step S420. The details of the quick review display processing will be described below with reference to FIG. 4B.

In step S420, the system control unit 50 determines whether the LV button 76 has been pressed. In a case where it is determined that the LV button 76 has been pressed (YES in step S420), the processing proceeds to step S421. In a case where it is determined that the LV button 76 has not been pressed (NO in step S420), the processing proceeds to step S422.

In step S421, the system control unit 50 compresses image data with HDR image quality obtained by development processing in step S404 (image data in which one pixel includes three components and one component has ten bits) in compliance with the HEVC (H.265), and records the compressed image data as an HDR moving image file. Then, the processing proceeds to step S438.

In step S422, the system control unit 50 determines whether the external device 300 is connected to the digital camera 100. In a case where the system control unit 50 determines that the external device 300 is connected (YES in step S422), the processing proceeds to step S423. In a case where the system control unit 50 determines that the external device 300 is not connected (NO in step S422), the processing proceeds to step S424. In step S423, the system control unit 50 performs connection processing of the digital camera 100 and the external device 300, and advances the processing to step S424. The details of the connection processing will be described below with reference to FIGS. 5A to 5C. Because the SDR image capturing mode is set, SDR connection is performed with an external device.

In step S424, the system control unit 50 develops, using the image processing unit 24, an image captured by the imaging unit 22 and converted into a digital signal by the A/D converter 23, into an image with SDR image quality (one pixel includes three components, and one component has eight bits (256 gradations)), and the processing proceeds to step S425. Hereinafter, an image obtained by development processing of SDR image quality will be referred to as an SDR image.

In step S425, the system control unit 50 resizes the SDR image obtained by development processing in step S424, into a size suitable for resolution of an output destination device (the display unit 28 or the external device 300), generates a live image with SDR image quality (SDR LV image), and displays the generated SDR LV image.

In step S426, the system control unit 50 determines whether the menu button 70e has been pressed. In a case where it is determined that the menu button 70e has been pressed (YES in step S426), the processing proceeds to step S427. In a case where it is determined that the menu button 70e has not been pressed (NO in step S426), the processing proceeds to step S428. In step S427, the system control unit 50 performs image capturing menu processing, and advances the processing to step S428. The details of the image capturing menu processing in S427 will be described below with reference to FIGS. 6A and 6B.

In step S428, the system control unit 50 determines whether the information button 70g has been pressed. In a case where it is determined that the information button 70g has been pressed (YES in step S428), the processing proceeds to step S429. In a case where it is determined that the information button 70g has not been pressed (NO in step S428), the processing proceeds to step S430. In step S429, the system control unit 50 switches the display of image capturing information, and the processing proceeds to step S430. The image capturing information includes a histogram and a highlight warning table.

In step S430, the system control unit 50 determines whether the shutter button 61 is in a half pressed state. In a case where it is determined that the shutter button 61 is not in a half pressed state (NO in step S430), the processing proceeds to step S436. In a case where it is determined that the shutter button 61 is in a half pressed state (YES in step S430), the processing proceeds to step S431.

In step S431, the system control unit 50 performs AF/AE processing described with reference to FIG. 2, and advances the processing to step S432. In step S432, the system control unit 50 determines whether the shutter button 61 is in a fully pressed state, based on whether the signal SW2 has been received. In a case where the system control unit 50 determines that the shutter button 61 is not in a fully pressed state (NO in step S432), the processing proceeds to step S433. In a case where the system control unit 50 determines that the shutter button 61 is in a fully pressed state (YES in step S432), the processing proceeds to step S434. In step S433, the system control unit 50 determines whether the half pressed state of the shutter button 61 is maintained, based on whether the signal SW1 has been received. In a case where the system control unit 50 determines that the half pressed state is maintained (YES in step S433), the processing returns to step S431. In a case where the system control unit 50 determines that the half pressed state is not maintained (NO in step S433), the processing proceeds to step S436.

In step S434, the system control unit 50 performs SDR image capturing processing and the processing proceeds to step S435. In the SDR image capturing processing, the system control unit 50 performs development processing of SDR image quality on RAW image data obtained by SDR image capturing, generates JPEG image data by JPEG-encoding the image with SDR image quality, and records the JPEG image data onto a recording medium as a JPEG file in a JPEG format. In a case where a setting of recording only an SDR image as a JPEG file is made as a recording setting, only a JPEG file is recorded. In a case where recording of a JPEG file and a RAW image file is set as a recording setting, a JPEG file is recorded, and data obtained by encoding RAW image data obtained by SDR image capturing, and JPEG image data are recorded onto a recording medium as RAW image files in a RAW image file format illustrated in FIG. 8A. In a RAW image file, Image Data 809 in the data structure illustrated in FIG. 8A has a format illustrated in FIG. 8B. More specifically, pieces of coded data obtained by JPEG-encoding images for display in the respective sizes with the accuracy of eight bits are integrated into one file and stored. Then, in step S435, the system control unit 50 performs quick review display processing, and the processing proceeds to step S436. The details of the quick review display processing will be described below with reference to FIG. 4B.

In step S436, the system control unit 50 determines whether the LV button 76 has been pressed. In a case where it is determined that the LV button 76 has been pressed (YES in step S436), the processing proceeds to step S437. In a case where it is determined that the LV button 76 has not been pressed (NO in step S436), the processing proceeds to step S438. In step S437, the system control unit 50 compresses an SDR image obtained by the development processing of SDR image quality in step S425, in compliance with H264, records the compressed SDR image as an SDR moving image file, and advances the processing to step S438.

In step S438, the system control unit 50 determines whether the reproduction button 79 has been pressed. In a case where the system control unit 50 determines that the reproduction button 79 has been pressed (YES in step S438), the processing proceeds to step S439. In a case where the system control unit 50 determines that the reproduction button 79 has not been pressed (NO in step S438), the processing proceeds to step S440. In step S439, the system control unit 50 performs the reproduction mode processing, and the processing proceeds to step S440. The details of the reproduction mode processing will be described below with reference to FIGS. 9A to 9H and FIGS. 10A and 10B.

In step S440, the system control unit 50 determines whether an end instruction of a LV mode has been issued. In a case where it is determined that an end instruction of a LV mode has not been issued (NO in step S440), the processing returns to step S401. In a case where it is determined that an end instruction has been issued (YES in step S440), the processing ends.

Figure 4B:
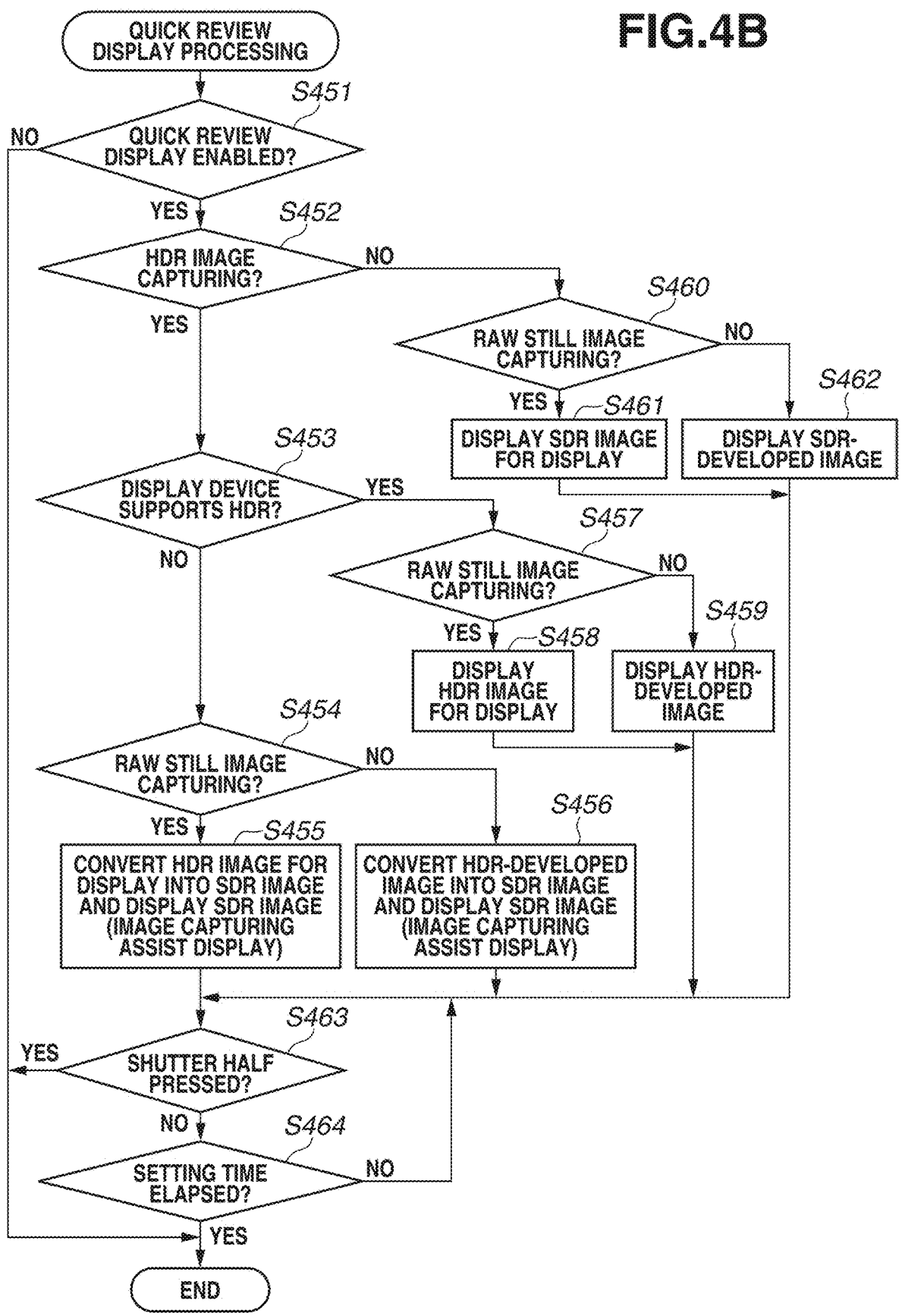
FIG. 4B is a flowchart of quick review.

FIG. 4B is a flowchart illustrating the quick review display processing performed by the system control unit 50. The processing is implemented by the system control unit 50 loading a program recorded in the nonvolatile memory 56, onto the system memory 52 and executing the program.

In step S451, the system control unit 50 determines whether a setting of quick review display is enabled. In a case where it is determined that a setting of quick review display is enabled (YES in step S451), the processing proceeds to step S452. In a case where it is determined that a setting of quick review display is disabled (NO in step S451), the processing ends.

In step S452, the system control unit 50 determines whether image capturing is to be performed in the HDR image capturing mode. In a case where it is determined that image capturing is to be performed in the HDR image capturing mode (YES in step S452), the processing proceeds to step S453. In a case where it is determined that image capturing is to be performed in the SDR image capturing mode (NO in step S452), the processing proceeds to step S460.

In step S453, the system control unit 50 determines whether a device (the display unit 28 or the external device 300) that performs quick review display supports the HDR. In a case where it is determined that the device does not support the HDR (NO in step S453), the processing proceeds to step S454. In a case where it is determined that the device supports the HDR (YES in step S453), the processing proceeds to step S457.

In step S454, the system control unit 50 determines whether RAW still image capturing has been performed. In a case where it is determined that RAW still image capturing has been performed (YES in step S454), the processing proceeds to step S455. In a case where it is determined that high efficiency image file format (HEIF) still image capturing has been performed (NO in step S454), the processing proceeds to step S456.

In step S455, the system control unit 50 performs HDR-to-SDR conversion of an HDR image for display 828 in an HDR RAW image by processing equivalent to steps S406 to S408, resizes the image into a size suitable for an output destination device (the display unit 28 or the external device 300), displays the image with SDR image quality, and advances the processing to step S463.

In step S456, the system control unit 50 performs HDR-to-SDR conversion of an HDR image for display in an HEIF image by processing equivalent to steps S406 to S408, resizes the image into a size suitable for an output destination device (the display unit 28 or the external device 300), displays the image with SDR image quality, and advances the processing to step S463.

In step S457, the system control unit 50 determines whether RAW still image capturing has been performed. In a case where it is determined that RAW still image capturing has been performed (YES in step S457), the processing proceeds to step S458. In a case where it is determined that HEIF still image capturing has been performed (NO in step S457), the processing proceeds to step S459. In step S458, the system control unit 50 resizes the HDR image for display 828 in the HDR RAW image into a size suitable for an output destination device (the display unit 28 or the external device 300), displays the image with HDR image quality, and advances the processing to step S463. In step S459, the system control unit 50 resizes an HDR image for display in an HEIF image into a size suitable for an output destination device (the display unit 28 or the external device 300), displays the image with HDR image quality, and advances the processing to step S463.

In step S460, the external device 300 determines whether RAW still image capturing has been performed. In a case where it is determined that RAW still image capturing has been performed (YES in step S460), the processing proceeds to step S461. In a case where it is determined that HEIF still image capturing has been performed (NO in step S460), the processing proceeds to step S462. In step S461, the system control unit 50 resizes an SDR image for display 823 in an SDR RAW image into a size suitable for an output destination device (the display unit 28 or the external device 300), displays the image with SDR image quality, and advances the processing to step S463. In step S462, the system control unit 50 resizes an SDR image for display in a JPEG image into a size suitable for an output destination device (the display unit 28 or the external device 300), displays the image with SDR image quality, and advances the processing to step S463.

In step S463, the system control unit 50 determines whether the shutter button 61 has been pressed. In a case where it is determined that the shutter button 61 has not been pressed (NO in step S463), the processing proceeds to step S464. In a case where it is determined that the shutter button 61 has been pressed (YES in step S463), the processing ends.

In step S464, the system control unit 50 determines whether a time set as a quick review display time has elapsed. In a case where it is determined that the set time has not elapsed (NO in step S464), the processing returns to step S463. In a case where it is determined that the set time has elapsed (YES in step S464), the processing ends.

Figure 5A:
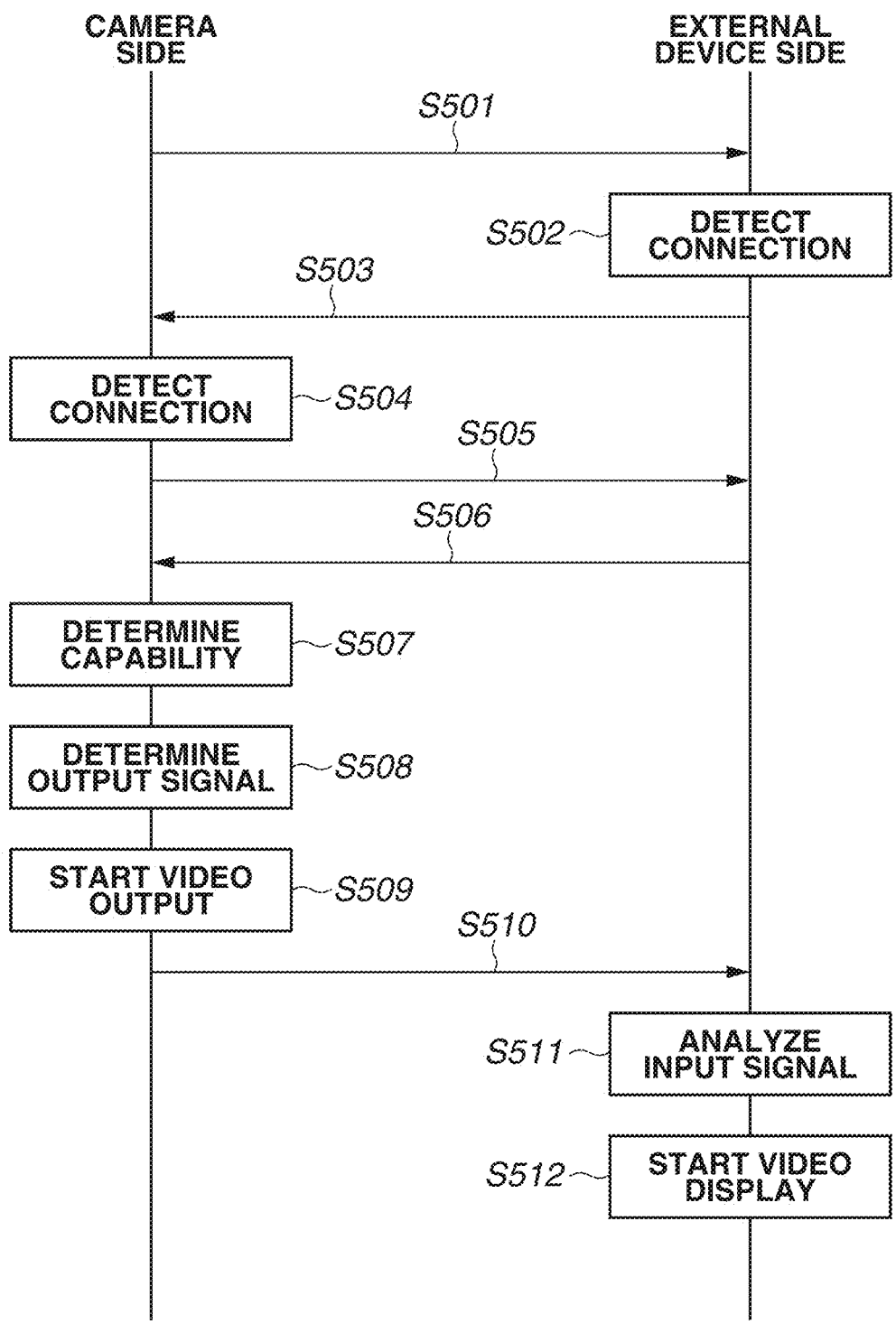
FIG. 5A is a sequence diagram of a high-definition multimedia interface (HDMI) (registered trademark) connection processing according to the exemplary embodiment.

FIG. 5A is a sequence diagram illustrating a control procedure of the digital camera 100 and the external device 300 in a case where the digital camera 100 and the external device 300 are connected. The description will be given assuming that the digital camera 100 and the external device 300 are connected via an HDMI.

In step S501, the system control unit 50 controls the digital output I/F 90 and issues a transmission start instruction of a +5V-signal. Consequently, the digital output I/F 90 starts the transmission of the +5V-signal. The transmitted +5V-signal is transmitted to the external device 300 through a +5V-signal line (not illustrated) of the connection cable 302. The external device 300 receives the +5V-signal of the connection cable 302, and the processing proceeds to step S502.

In step S502, the external device 300 determines that the digital camera 100 has confirmed the connection of the external device 300, and the processing proceeds to step S503.

In step S503, the external device 300 starts the transmission of a hot-plug-detect (HPD) signal from an HPD signal line (not illustrated) of the connection cable 302. The digital output I/F 90 of the digital camera 100 receives the transmitted HPD signal via the connection cable 302. If the digital output I/F 90 receives the HPD signal, the digital output I/F 90 notifies the system control unit 50 of HPD reception.

In step S504, the system control unit 50 detects a connection response from the external device 300 by the notification of HPD, and the processing proceeds to step S505.

In step S505, the system control unit 50 controls the digital output I/F 90 to transmit an extended display identification data (EDID) request signal from the connection cable 302. The transmitted EDID request signal is transmitted to the external device 300 through an EDID signal line (not illustrated) of the connection cable 302. The external device 300 receives the EDID request signal, and the processing proceeds to step S506.

In step S506, the external device 300 transmits an EDID from the EDID signal line (not illustrated) of the connection cable 302. The digital output I/F 90 of the digital camera 100 receives the EDID via the connection cable 302. Then, if the digital output I/F 90 receives the EDID, the digital output I/F 90 notifies the system control unit 50 of EDID reception.

In step S507, by receiving the notification of EDID reception, the system control unit 50 instructs the digital output I/F 90 to copy the EDID received in step S506, into the memory 32. After the copy is completed, the system control unit 50 analyzes the EDID loaded onto the memory 32, and performs capability determination processing for determining a video signal receivable by the external device 300, and the processing proceeds to step S508.

In step S508, in a case where a main body setting indicates that the HDR is enabled, and the capability regarding the video signal receivable by the external device 300 that has been determined in step S507 indicates that an HDR signal is supported, the system control unit 50 determines to output an HDR signal to the external device 300. In other cases, the system control unit 50 determines to output an SDR signal, and the processing proceeds to step S509.

In step S509, the system control unit 50 instructs the digital output I/F 90 to start the transmission of an HDR or SDR video signal determined in step S508. The digital output I/F 90 that has received a video signal transmission start instruction starts the transmission of a video signal through the connection cable 302, and the processing proceeds to step S510.

In step S510, the digital camera 100 outputs the video signal to a transition minimized differential signaling (TMDS) signal line (not illustrated) of the connection cable 302. The external device 300 receives the video signal via the TMDS signal line (not illustrated) of the connection cable 302, and the processing proceeds to step S511.

In step S511, the external device 300 analyzes the video signal received in step S508, and switches the driving of the display 301 to a setting that can display a video signal, and the processing proceeds to step S512. In step S512, the external device 300 displays the video signal received in step S508, on the display 301 of the external device 300.

FIG. 5B is a sequence diagram illustrating processing of switching video output of the digital camera 100 and the external device 300 from an SDR image to an HDR image.

In this sequence, connection between the digital camera 100 and the external device 300 has completed in the sequence described with reference to FIG. 5A.

In step S521, the system control unit 50 instructs the digital output I/F 90 to transmit an SDR video signal, and the processing proceeds to step S522.

In step S522, the digital camera 100 outputs the SDR video signal to the TMDS signal line (not illustrated) of the connection cable 302. The external device 300 receives the SDR video signal via the TMDS signal line (not illustrated) of the connection cable 302, and the processing proceeds to step S523.

In step S523, the external device 300 displays the SDR video received in step S522, on the display 301 of the external device 300.

While the digital camera 100 is outputting an SDR signal, by repeating steps S521 to S523, an SDR image is displayed on the display 301 of the external device 300.

In a case where the digital camera 100 switches video output to the external device 300 from an SDR image to an HDR image, the processing in step S524 and subsequent steps are executed.

In step S524, the system control unit 50 instructs the digital output I/F 90 to stop the transmission of an SDR video signal, and the processing proceeds to step S525.

In step S525, the system control unit 50 stops the transmission of a video signal to the TMDS signal line (not illustrated) of the connection cable 302. The external device 300 stops the reception of an SDR video signal via the TMDS signal line (not illustrated) of the connection cable 302, and the processing proceeds to step S526.

In step S526, because the reception of a video from the digital camera 100 is stopped, the external device 300 stops the display of a video on the display 301 of the external device 300.

In step S527, the system control unit 50 instructs the digital output I/F 90 to transmit an HDR video signal, and the processing proceeds to step S528.

In step S528, the system control unit 50 outputs an HDR video signal to the TMDS signal line (not illustrated) of the connection cable 302. The external device 300 receives the HDR video signal via the TMDS signal line (not illustrated) of the connection cable 302, and the processing proceeds to step S529.

In step S529, the external device 300 analyzes the video signal received in step S528, and switches the driving of the display 301 to a setting that can display an HDR video signal, and the processing proceeds to step S530.

In step S530, the external device 300 displays the HDR video signal received in step S528, on the display 301 of the external device 300.

At this time, a time taken for processing from steps S529 to S530 varies depending on the performance of the external device 300, and a time about one second to five seconds is taken until a video is displayed.

FIG. 5C is a sequence diagram illustrating processing of switching video output of the digital camera 100 and the external device 300 from an HDR image to an SDR image.

In this sequence, connection between the digital camera 100 and the external device 300 is has completed in the sequence described with reference to FIG. 5A.

In step S541, the system control unit 50 instructs the digital output I/F 90 to transmit an HDR video signal, and the processing proceeds to step S542. In step S542, the system control unit 50 outputs the HDR video signal to the TMDS signal line (not illustrated) of the connection cable 302. The external device 300 receives the HDR video signal via the TMDS signal line (not illustrated) of the connection cable 302, and the processing proceeds to step S523.

In step S543, the external device 300 displays the HDR video received in step S542, on the display 301 of the external device 300.

While the digital camera 100 is outputting an HDR signal, by repeating steps S541 to S543, an HDR image is displayed on the display 301 of the external device 300.

In a case where the digital camera 100 switches video output to the external device 300 from an HDR image to an SDR image, the processing in step S544 and subsequent steps are executed.

In step S544, the system control unit 50 instructs the digital output I/F 90 to stop the transmission of an HDR video signal, and the processing proceeds to step S545. In step S545, the system control unit 50 stops the transmission of a video signal to the TMDS signal line (not illustrated) of the connection cable 302. The external device 300 stops the reception of an HDR video signal via the TMDS signal line (not illustrated) of the connection cable 302, and the processing proceeds to step S546.

In step S546, because the reception of a video from the digital camera 100 is stopped, the external device 300 stops the display of a video on the display 301 of the external device 300.

In step S547, the system control unit 50 instructs the digital output I/F 90 to transmit an SDR video signal, and the processing proceeds to step S548.

In step S548, the system control unit 50 outputs an SDR video signal to the TMDS signal line (not illustrated) of the connection cable 302. The external device 300 receives the SDR video signal via the TMDS signal line (not illustrated) of the connection cable 302, and the processing proceeds to step S549.

In step S549, the external device 300 analyzes the video signal received in step S548, and switches the driving of the display 301 to a setting that can display an SDR video signal, and the processing proceeds to step S550. In step S550, the external device 300 displays the SDR video signal received in step S548, on the display 301 of the external device 300.

A time taken for processing from steps S549 to S550 varies depending on the performance of the external device 300, and a time about one second to five seconds is taken until a video is displayed.

Figure 6A:
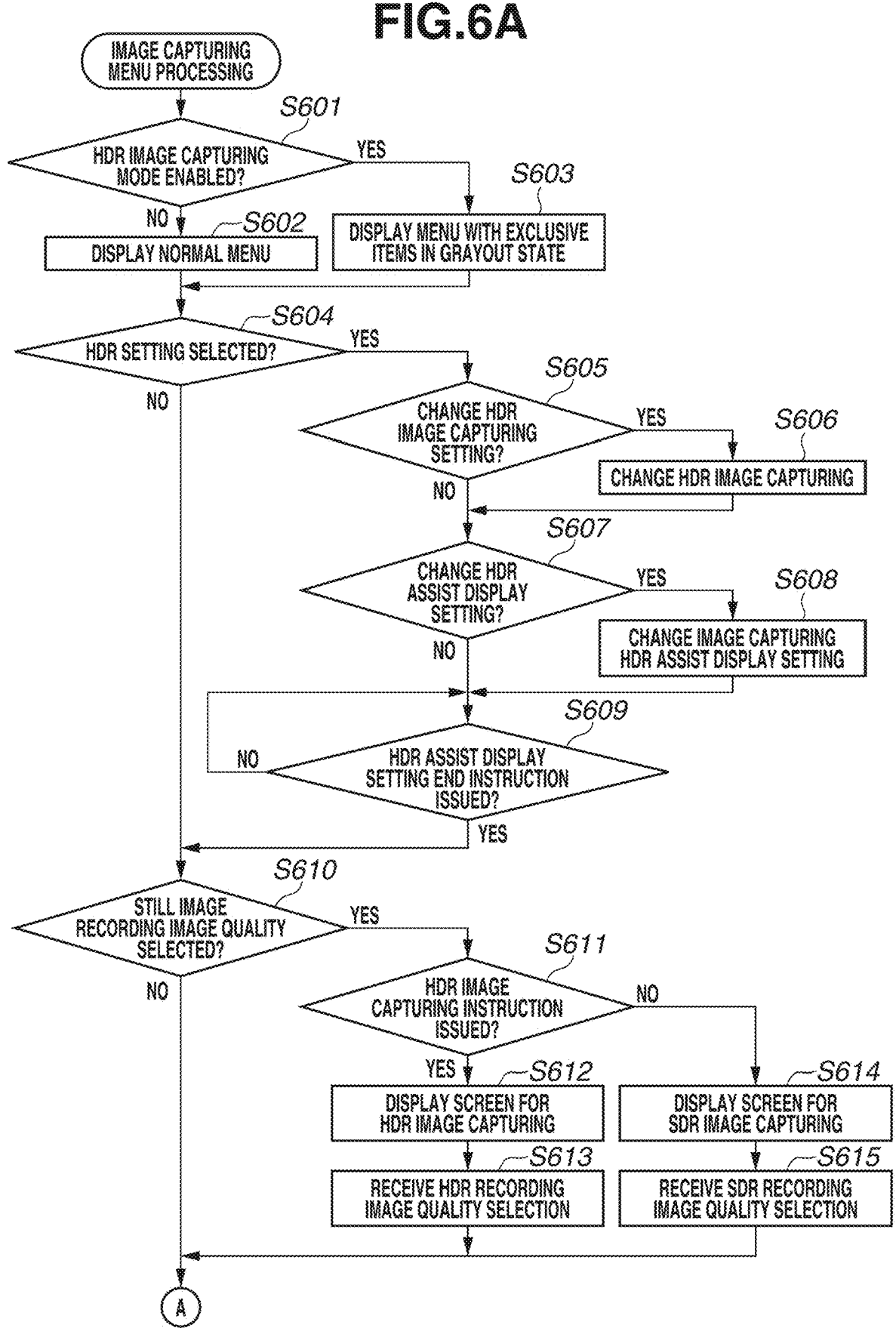
FIG. 6A is a flowchart of high dynamic range (HDR) image capturing menu processing according to the exemplary embodiment.
Figure 6B:
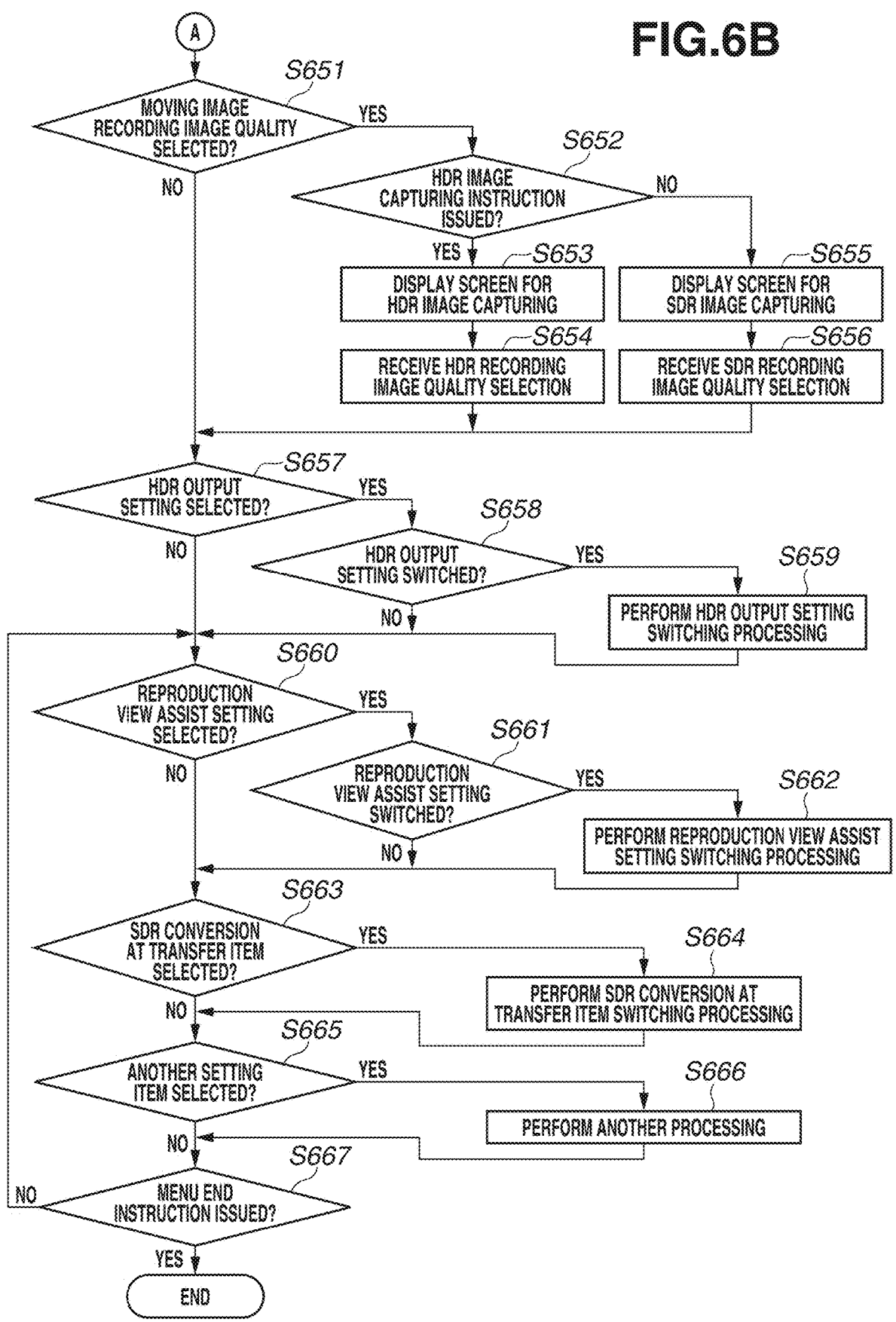
FIG. 6B is a flowchart of the HDR image capturing menu processing according to the exemplary embodiment.

FIGS. 6A and 6B are flowcharts illustrating the details of the image capturing menu processing in steps S411 and S427 of FIGS. 4A1 to 4A3. The processing is implemented by the system control unit 50 loading a program recorded in the nonvolatile memory 56, onto the system memory 52 and executing the program.

In step S601, the system control unit 50 determines whether to perform HDR image capturing, based on whether the HDR image capturing mode is enabled by the user. In a case where the system control unit 50 determines not to perform HDR image capturing (NO in step S601), the processing proceeds to step S602. In step S602, a menu for normal SDR image capturing is displayed. In a case where the system control unit 50 determines to perform HDR image capturing (YES in step S601), the processing proceeds to step S603. In S603, a menu for HDR image capturing is displayed. In this step S603, a function not to be used together with HDR image capturing is displayed on the menu in a disable state, such as a grayout state.

In step S604, the system control unit 50 determines whether a setting item indicating whether to perform HDR image capturing has been selected by the user. In a case where it is determined that the setting item has been selected (YES in step S604), the system control unit 50 advances the processing to step S605. In a case where it is determined that the setting item has not been selected (NO in step S604), the system control unit 50 advances the processing to step S610. In step S605, the system control unit 50 determines whether a setting indicating whether to perform HDR image capturing has been switched by the user to an enabled state. In a case where it is determined that the setting has been switched to an enabled state (YES in step S605), the system control unit 50 advances the processing to step S606. In a case where it is determined that the setting has not been switched to an enabled state (NO in step S605), the system control unit 50 advances the processing to step S607. In step S606, the system control unit 50 changes the setting indicating whether to perform HDR image capturing, to an enabled state, and stores a setting value into the system memory 52.

When the setting indicating whether to perform HDR image capturing is set to the enabled state, in step S607, the system control unit 50 determines whether an HDR assist display setting has been switched by the user to change. In a case where it is determined that the HDR assist display setting has been switched to change (YES in step S607), the processing proceeds to step S608. In a case where it is determined that the HDR assist display setting has not been switched to change (NO in step S607), the processing proceeds to step S609. When the setting indicating whether to perform HDR image capturing is disabled, it is desirable that the HDR assist display setting is unchangeable.

In step S608, the system control unit 50 changes a setting to a setting indicating whether to perform an HDR assist display setting in image capturing, and stores a setting value into the system memory 52. Two or more variations of "perform" an HDR assist display setting may exist.

In this manner, in a case where an HDR image capturing setting or an HDR assist display setting is changed on the menu screen, a change result of a display setting may be reflected in the display at a timing at which a screen transitions to a live view screen. In a case where these settings are changed using a specific button of the operation unit 70 on the live view screen instead of the menu screen, a change result may be reflected in the display at the change timing (timing at which the button is pressed).

In step S609, the system control unit 50 determines whether an end instruction of HDR setting menu display processing has been issued by the user. In a case where it is determined that an end instruction has been issued (YES in step S609), the system control unit 50 advances the processing to step S610.

In step S610, the system control unit 50 determines whether a setting item of still image recording image quality has been selected by the user. In a case where the system control unit 50 determines that the setting item has been selected (YES in step S610), the processing proceeds to step S611. In a case where the system control unit 50 determines that the setting item has not been selected (NO in step S610), the processing proceeds to step S651.

In step S611, the system control unit 50 determines a setting indicating whether an instruction of HDR image capturing has been input by the user. In a case where the system control unit 50 determines that an instruction of HDR image capturing has been input (YES in step S611), the processing proceeds to step S612. In a case where the system control unit 50 determines that an instruction of HDR image capturing has not been input (NO in step S611), the processing proceeds to step S614.

In step S612, the system control unit 50 performs screen display for HDR image capturing. In step S613, the system control unit 50 receives user selection of recording image quality for HDR image capturing. As recording image quality to be set for HDR image capturing, a RAW image file, an HDR still image file, and simultaneous output of two images including RAW image file+HDR still image file are prepared as file formats. Image sizes include Large, which is close to the number of pixels at the time of sensor readout, Middle, which is a bit smaller, and Small, which is further smaller. Furthermore, compression rates for compressing an image for decreasing a file size capacity include high image quality (low compression rate), standard (high compression rate), and low image quality (high compression rate).

In step S614, the system control unit 50 performs screen display for SDR image capturing. In step S615, the system control unit 50 receives user selection of recording image quality for SDR image capturing. As recording image quality to be set for SDR image capturing, options similar to those of HDR image capturing are prepared.

In step S651, the system control unit 50 determines whether a setting item of moving image recording image quality has been selected by the user. In a case where the system control unit 50 determines that a setting item of moving image recording image quality has been selected (YES in step S651), the processing proceeds to step S652. In a case where the system control unit 50 determines that a setting item of moving image recording image quality has not been selected (NO in step S651), the processing proceeds to step S657.

In step S652, the system control unit 50 determines whether a setting indicating whether to perform HDR image capturing is made by the user. In a case where the setting indicates that HDR image capturing is to be performed (YES in step S652), the system control unit 50 advances the processing to step S653. In a case where the setting does not indicate that HDR image capturing is to be performed (NO in step S652), the system control unit 50 advances the processing to step S655.

In step S653, the system control unit 50 performs screen display for HDR image capturing. In step S654, the system control unit 50 receives user selection of recording image quality for HDR image capturing. As recording image quality to be set for HDR image capturing, a RAW moving image, a RAW moving image+proxy moving image, an HDR moving image file, and simultaneous output of three images including RAW moving image+proxy moving image+HDR moving image file are prepared as file formats. Image sizes include 8K, 4K, Full HD, HD, and VGA. Furthermore, compression rates for decreasing a file size include high image quality (low compression rate), such as ALL-I, and standard to low image quality (high compression rate), such as IPB. Aside from these, selection of a frame rate, and the selection of a broadcast system such as NTSC/PAL are also performed.

In step S655, the system control unit 50 performs screen display for SDR image capturing similarly to step S653. In step S656, the system control unit 50 receives user selection of recording image quality for SDR image capturing. As recording image quality to be set for SDR image capturing, options similar to those of HDR image capturing are prepared.

In step S657, the system control unit 50 determines whether a setting item of HDR output has been selected by the user. In a case where it is determined that the setting item of HDR output has been selected by the user (YES in step S657), the system control unit 50 advances the processing to step S658. In a case where it is determined that the setting item has not been selected by the user (NO in step S657), the system control unit 50 advances the processing to step S660. In step S658, the system control unit 50 determines whether an HDR output setting has been switched by the user to an enabled state. In a case where it is determined that the setting has been switched to an enabled state (YES in step S658), the processing proceeds to step S659. In a case where it is determined that the setting has not been switched to an enabled state (NO in step S658), the processing proceeds to step S660. In step S659, the system control unit 50 changes the HDR output setting to the enabled state, and stores a setting value into the system memory 52.

In step S660, the system control unit 50 determines whether a setting item of reproduction view assist has been selected by the user. In a case where it is determined that the setting item of reproduction view assist has been selected (YES in step S660), the system control unit 50 advances the processing to step S661. In a case where it is determined that the setting item has not been selected (NO in step S660), the system control unit 50 advances the processing to step S663. In step S661, the system control unit 50 determines whether a reproduction view assist setting has been switched by the user to an enabled state. In a case where it is determined that the setting has been switched to an enabled state (YES in step S661), the processing proceeds to step S662. In a case where it is determined that the setting has not been switched to an enabled state (NO in step S661), the processing proceeds to step S663. In step S662, the system control unit 50 changes the reproduction view assist setting to the enabled state, and stores a setting value into the system memory 52.

In step S663, the system control unit 50 determines whether a setting item of SDR conversion at transfer has been selected by the user. In a case where it is determined that the setting item has been selected (YES in step S663), the system control unit 50 advances the processing to step S664. In a case where it is determined that the setting item has not been selected (NO in step S663), the system control unit 50 advances the processing to step S665. In step S664, the system control unit 50 determines whether an SDR conversion at transfer setting has been switched by the user to an enabled state. In a case where it is determined that the setting has been switched to an enabled state, in step S664, the system control unit 50 changes the SDR conversion at transfer setting to the enabled state, and advances the processing to step S665.

In step S665, the system control unit 50 determines whether another setting item related to HDR image capturing has been selected by the user. In a case where it is determined that another setting item has been selected (YES in step S665), the processing proceeds to step S666. In a case where it is determined that another setting item has not been selected (NO in step S665), the processing proceeds to step S667. In step S666, the system control unit 50 changes another processing to an enabled state, and advances the processing to step S667.

In step S667, the system control unit 50 determines whether an end instruction of image capturing menu processing has been issued by the user. In a case where it is determined that an end instruction has not been issued (NO in step S667), the processing returns to step S660. In a case where it is determined that an end instruction has been issued (YES in step S667), the processing ends.

Figure 7:
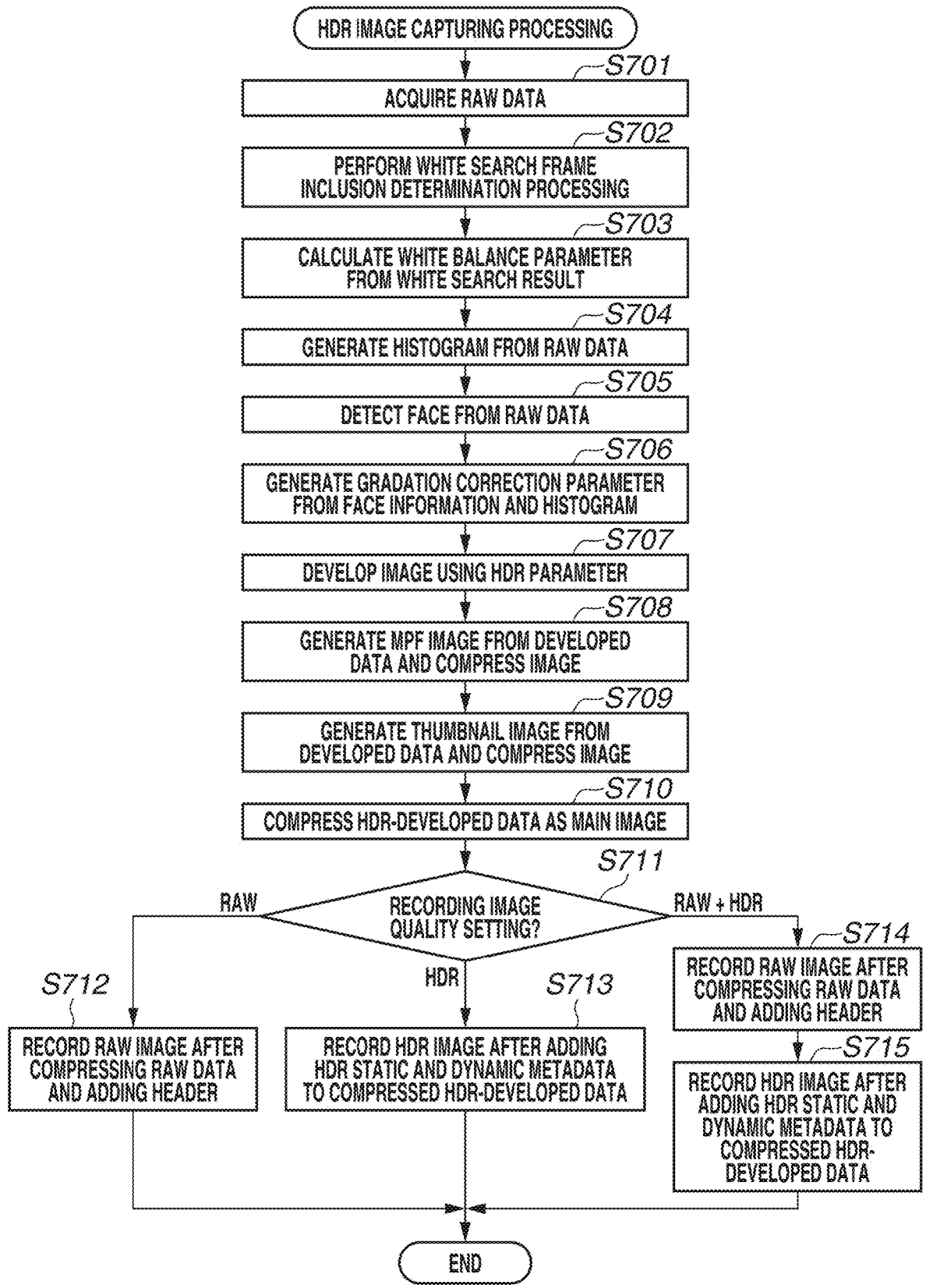
FIG. 7 is a flowchart of HDR image capturing processing according to exemplary embodiment.
Figure 8A:
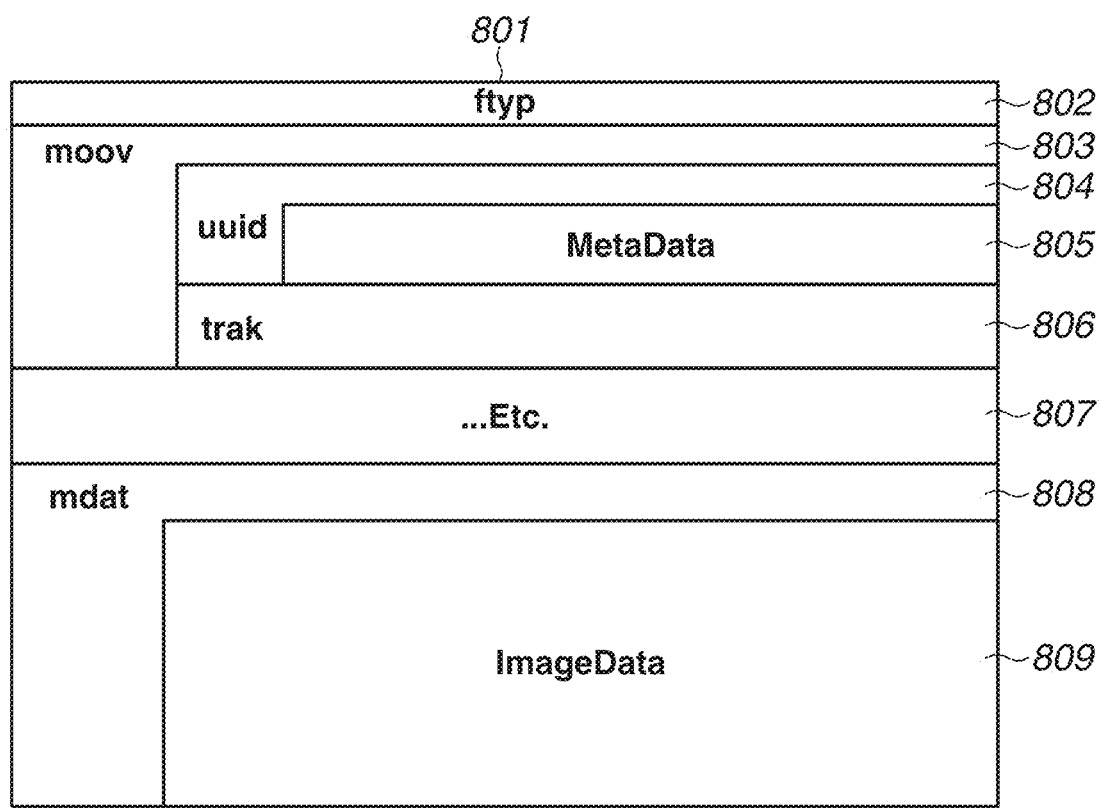
FIG. 8A is a configuration diagram of a RAW file according to the exemplary embodiment.

FIG. 7 is a flowchart illustrating the details of HDR image capturing processing performed by the system control unit 50. FIG. 7 illustrates a procedure of HDR-developing RAW data written into the memory 32, using the image processing unit 24.

An imaging apparatus, such as a digital camera or a digital video camera, includes a white balance function of correcting color tone of a captured image in accordance with a light source used in image capturing. The white balance function is a function of correcting a difference in color tone varying depending on a light source (natural light source such as clear weather or cloudy weather, or artificial light source such as fluorescent lamp or incandescent lamp), and uniformizing whiteness irrespective of a light source. In steps S701 to S703, white balance coefficients necessary for white balance processing are calculated. In the present exemplary embodiment, for avoiding whiteout of gradation of a high brightness region, such as sky, as far as possible, image capturing is performed in exposure lower than correct exposure in which the brightness of a person becomes appropriate.

First of all, in step S701, the system control unit 50 acquires RAW image data via the memory control unit 15.

In step S702, the system control unit 50 performs white search frame inclusion determination processing of determining a whitish pixel, on the RAW image data acquired for calculating a white balance coefficient.

In step S703, the system control unit 50 calculates a white balance coefficient based on a white search frame inclusion determination result.

The details of the processing in steps S702 and S703 will be described with reference to a flowchart in FIG. 12.

As described above, in RAW image data, one pixel only includes a signal of one component of R, G, and B. For performing white search, the system control unit 50 needs to convert a signal into a color signal. Thus, in step S1201, the system control unit 50 performs DeBayer processing, and generates signals of all channels of R, G, and B for one pixel. There are several methods of DeBayer. For example, signals can be generated by linear interpolation that uses a low-pass filter. Because RAW image data is generally affected by noise, optical black (OB) is not zero and has a value. Thus, in step S1202, the system control unit 50 performs processing of subtracting a value corresponding to OB, from signals having been subjected to DeBayer. Then, in step S1203, the system control unit 50 calculates color signals Cx and Cy from the acquired RGB signals using the following formula.

$$C_x = \frac{(R + G_2) - (B + G_1)}{Y_i}$$ [Math. 1]

$$C_Y = \frac{(R + B) - (G_1 + G_2)}{Y_i}$$

$$Y_i = \frac{R + G_1 + G_2 + B}{4}$$

In the formula, $G_1$ and $G_2$ denote two G component values in 2×2 pixels in a Bayer array. In addition, $C_x$ denotes a color temperature, and $C_y$ denotes a green direction correction amount. In addition, $Y_i$ denotes a brightness value.

Figure 13:
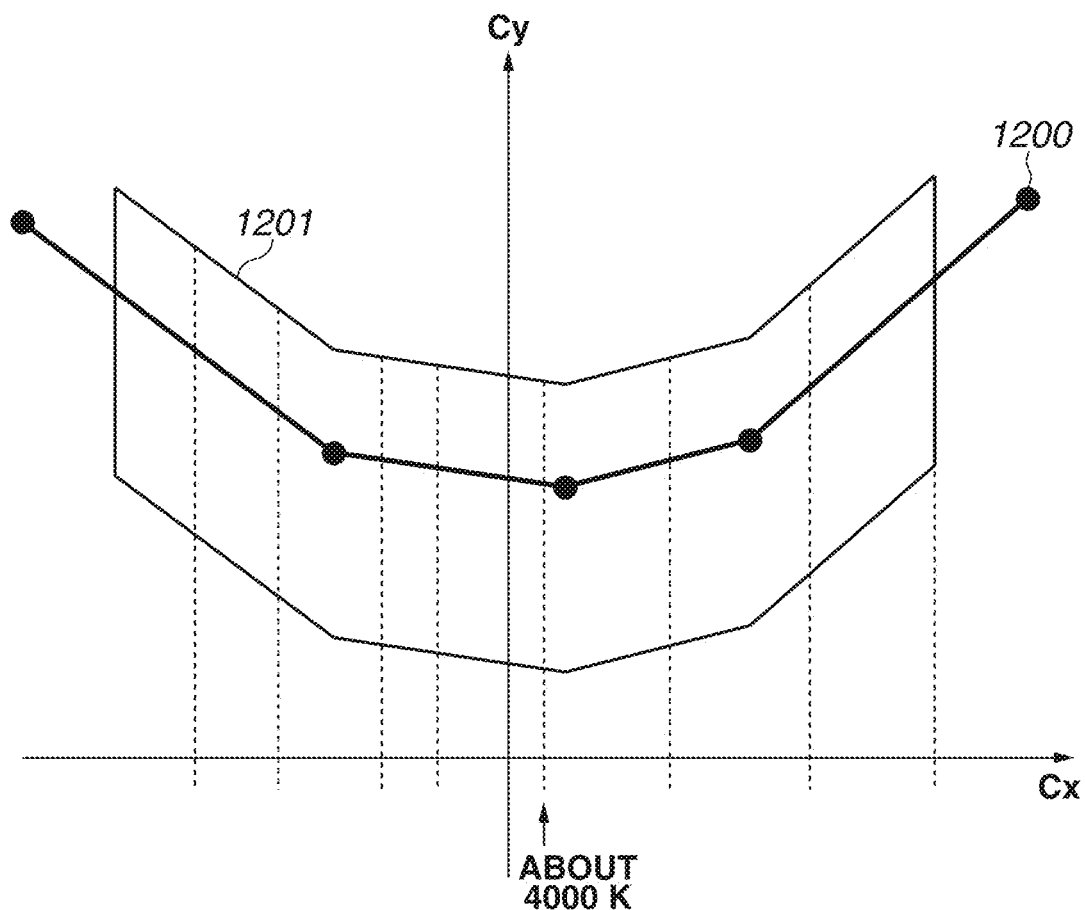
FIG. 13 is a diagram illustrating a Cx-Cy plane.

FIG. 13 illustrates a $C_x$-$C_y$ plane. As illustrated in FIG. 13, by preliminarily capturing images of white color using an imaging apparatus under various color temperatures from high color temperature (for example, daytime, etc.) to low color temperature (for example, nightfall, etc.), and plotting color evaluation values Cx, Cy on a coordinate, a white axis 1200 serving as a reference for detecting white color can be defined. In an actual light source, white color includes slight variations. Thus, in step S1204, the system control unit 50 provides a certain level of ranges on both side of the white axis 1200. A frame including the ranges provided on the both sides of the white axis will be referred to as a white search frame 1201.

In step S1205, the system control unit 50 plots color evaluation values on a $C_x$-$C_y$ coordinate system for each pixel having been subjected to DeBayer, and determines whether a value falls within the white search frame. In step S1206, the system control unit 50 performs bright/dark section exclusion processing of restricting pixels to be integrated, in a brightness direction, among pixels falling within the white search frame. The processing is performed for preventing a decline in calculation accuracy of a white balance coefficient because too dark color is susceptible to noise. Similarly, the processing is performed for preventing a decline in calculation accuracy of a white balance coefficient because too bright color gets away from correct color as balance of an R/G ratio or a B/G ratio is lost due to sensor saturation of any channel. At this time, brightness of pixels to be excluded by the bright/dark section exclusion processing is varied between an SDR and an HDR. In other words, pixels to be used for calculation of a white balance coefficient, which will be described below, are varied between an SDR and an HDR. This is because the HDR has higher reproducibility of a high brightness region as compared with the SDR. In the present exemplary embodiment, by targeting brightness up to +2 EV in the HDR while brightness up to +1 EV is targeted on the brightness side in the SDR, for example, it becomes possible to calculate a white balance coefficient optimized for the HDR.

In step S1207, the system control unit 50 calculates integrated values SumR, SumG, and SumB of color evaluation values from $C_x$, $C_y$ falling within the white search frame and having been subjected to bright/dark section exclusion processing. Then, in step S1208, the system control unit 50 calculates white balance coefficients $WBC_{OR}$, $WBC_{OG}$, and $WBC_{OB}$ from the calculated integrated values using the following formulae.

$$WBCo_R = \frac{SumY \times 1024}{SumR} \qquad [\text{Math. 2}]$$

$$WBCo_G = \frac{SumY \times 1024}{SumG}$$

$$WBCo_B = \frac{SumY \times 1024}{SumB}$$

$$SumY = \frac{(SumR + 2 \times SumG + SumB)}{4}$$

In the upper formulae, "1024" is provided on the right side because one color component has ten-bit accuracy.

As a white balance coefficient, a value for an image capturing mode (SDR image capturing or HDR image capturing) set by the user may be calculated, or values for both of SDR and HDR may be calculated.

Figure 14:
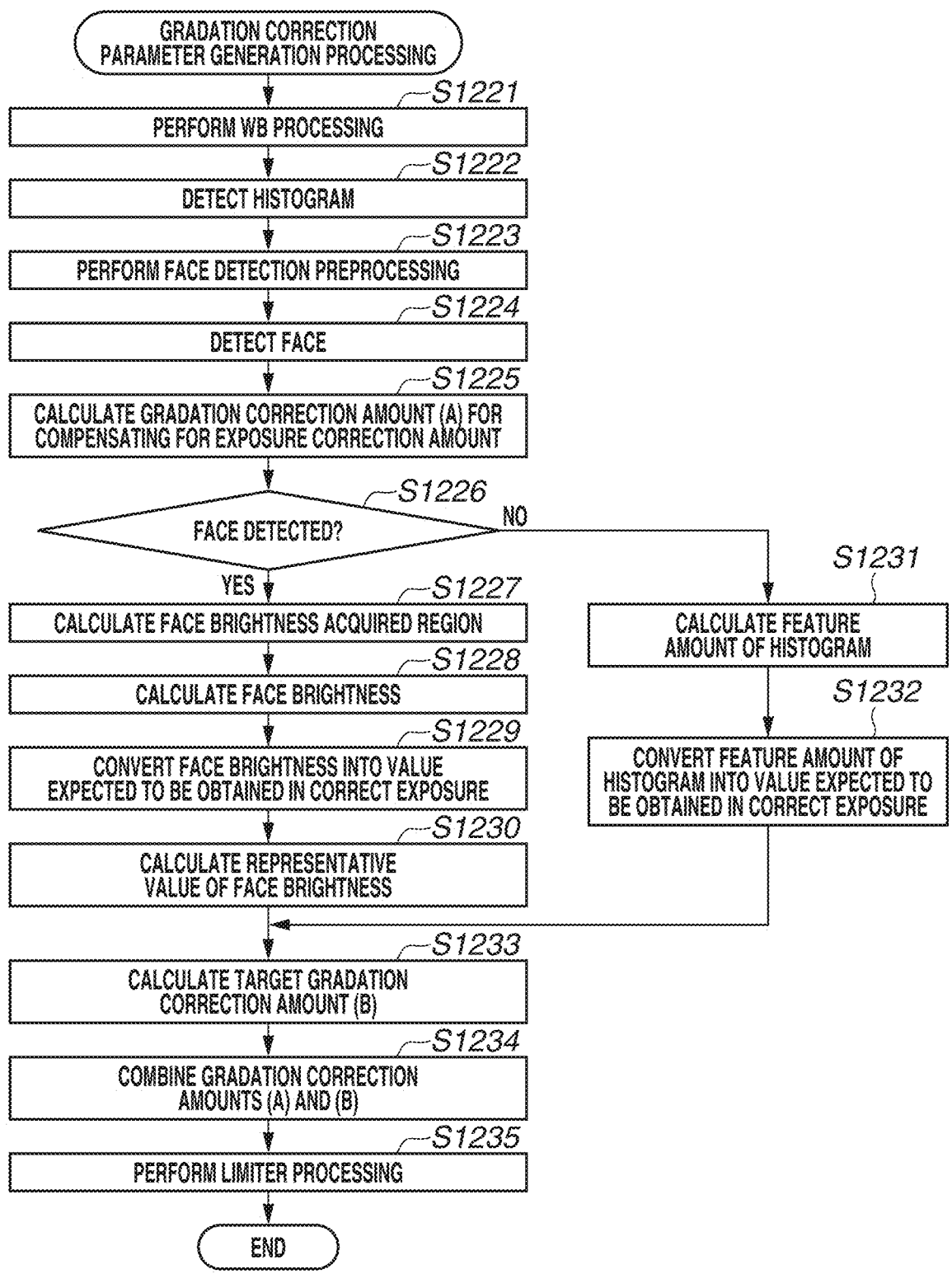
FIG. 14 is a flowchart of gradation correction parameter generation processing.

The description will return to FIG. 7. In steps S704 to S706, the system control unit 50 calculates a gradation correction table necessary for gradation correction processing. The details of the gradation correction will be described with reference to a flowchart in FIG. 14.

In step S1221, the system control unit 50 performs WB processing using WB coefficients generated in the processing in steps S701 to S703 of FIG. 7. In step S1222, the system control unit 50 performs histogram detection. Specifically, the system control unit 50 creates a histogram as brightness information using pixel values obtained by applying a gain value of white balance that has been obtained in step S1221, to the entire image data, and further performing gamma correction processing. A known method that uses a look-up table may be used for gamma correction processing. It is desirable to use the same gamma characteristics as gamma characteristics used in development. Nevertheless, for saving a processing time or a memory capacity, simplified gamma characteristics such as gamma characteristics approximated using a line graph may be used. An edge portion of an image is generally not important in many cases, and is a portion to be affected by light falloff at edges depending on an imaging lens. Thus, a histogram may be created excluding pixels in a peripheral portion.

In step S1223, the system control unit 50 performs face detection preprocessing. The processing is processing of performing reduction processing or gamma processing on image data in such a manner that a face can be easily detected. In step S1224, the system control unit 50 executes face detection processing on the preprocessed image data using a known method. By the face detection processing, the position and the size of a region (face region) considered to be a face, and the reliability of detection are obtained.

In step S1225, the system control unit 50 calculates a gradation correction amount (gradation correction amount (A)) for compensating for an exposure correction amount (decline amount), as a first gradation correction amount. At this time, while a dark section of the image is corrected to obtain correct exposure, a high brightness pixel at a level equal to or higher than a predefined brightness level is not corrected (at least, an exposure correction amount is not fully compensated for), and a gradation correction amount of input-output characteristics is calculated. This can further prevent whiteout of a bright section having been subjected to gradation correction. The gradation correction amount can be prepared in advance as a plurality of correction tables corresponding to exposure correction amounts.

In step S1226, the system control unit 50 determines that a face has been detected, in a case where face regions detected by the face detection processing in step S1224 include a face region having a reliability higher than a preset evaluation threshold. In a case where the system control unit 50 determines that a face has been detected (YES in step S1226), the processing proceeds to step S1227. In a case where the system control unit 50 determines that a face has not been detected (NO in step S1226), the processing proceeds to step S1231.

In step S1227, the system control unit 50 calculates a partial region of the detected face region as a face brightness acquisition region. The face brightness acquisition region is a region for acquiring the brightness of a bright portion of the face. The number and positions of brightness acquisition regions are not specifically limited. In step S1228, the system control unit 50 obtains an average value of R pixels, an average value of G pixels, and an average value of B pixels that are included in each of the face brightness acquisition regions. Furthermore, the system control unit 50 applies a gain value of white balance to each average value of RGB pixels similarly to histogram detection, performs gamma correction, and then converts a resultant value into a brightness value Y using the following formula.

$$Y = 0.299 \times R + 0.587 \times G + 0.114 \times B$$

As a gain value of white balance that is to be applied in histogram detection and face detection, a gain value used in WB processing performed on the same image data is desirably used. It is ideally desirable to use the same brightness gamma as that used in development, but simplified gamma characteristics such as gamma characteristics approximated using a line graph may be used for saving a processing time or a memory capacity.

In step S1229, the system control unit 50 converts a brightness value obtained for each of the face brightness acquisition regions in step S1228, into a value expected to be obtained in correct exposure. The processing is processing of correcting a face brightness detected to be lower than a face brightness obtained in a case where image capturing is performed in correct exposure, because image data is obtained in exposure lower than correct exposure. The conversion of a brightness value may be performed in such a manner that exposure control compensates for a determined exposure correction amount (decline amount), or may be performed using the gradation correction amount calculated in step S1225.

In step S1230, the system control unit 50 calculates a representative value of the detected face brightness. As an example of a method of calculating the representative value, a method of obtaining a largest value of the respective brightness values of the face brightness acquisition regions of the detected face region, and setting the largest value as a representative value can be considered.

The processing in step S1231 is processing to be performed in a case where the system control unit 50 determines in step S1226 that a face region has not been detected (NO in step S1226). In step S1231, the system control unit 50 detects a histogram feature amount. The histogram feature amount may be, for example, a level (SD) to which pixels having a cumulative frequency of 1% from the dark section side in a histogram belong, or a level (HL) to which pixels having a cumulative frequency of 1% from the bright section side in a histogram belong. Subsequently, in step S1232, the system control unit 50 converts the histogram feature amount calculated in step S1231, into a value expected to be obtained in image capturing in correct exposure. The processing is processing of correcting a histogram feature amount detected to be lower than a histogram feature amount obtained in a case where image capturing is performed in correct exposure, because image data is obtained in exposure lower than correct exposure. The conversion of a brightness value may be performed in such a manner that exposure control compensates for a determined exposure correction amount (decline amount), or may be performed using the gradation correction amount calculated in step S1225.

In step S1233, the system control unit 50 calculates a target correction amount. The system control unit 50 obtains a target brightness level for a representative brightness value of a face or a histogram feature amount. Then, the system control unit 50 creates, by spline interpolation, a look-up table (input-output characteristics) defining an output brightness level corresponding to an input brightness level, as a gradation correction amount (B) from the target brightness level, and the smallest value and the largest value of brightness in image data. The gradation correction amount (B) is a second gradation correction amount.

Figure 15A:
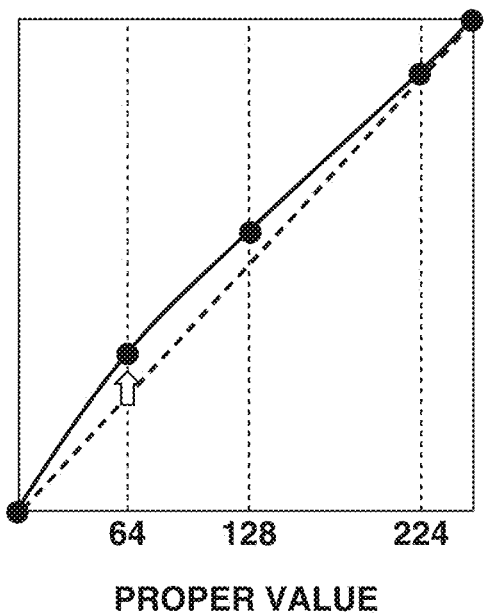
FIG. 15A is a diagram illustrating a gradation correction amount.
Figure 15B:
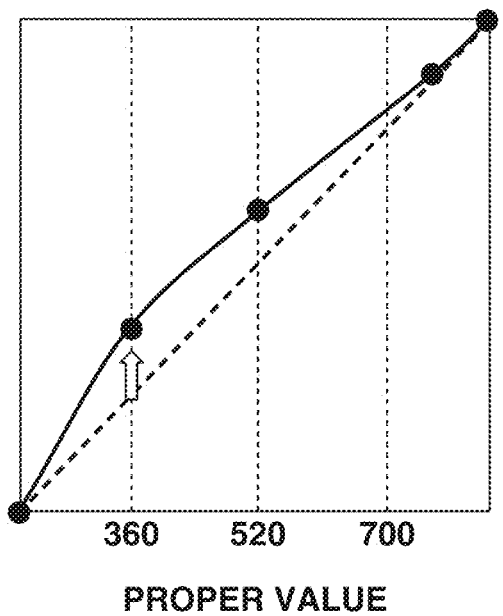
FIG. 15B is a diagram illustrating a gradation correction amount.
Figure 16A:
FIG. 16A is a diagram illustrating an example of appearance in a standard dynamic range (SDR).
Figure 16B:
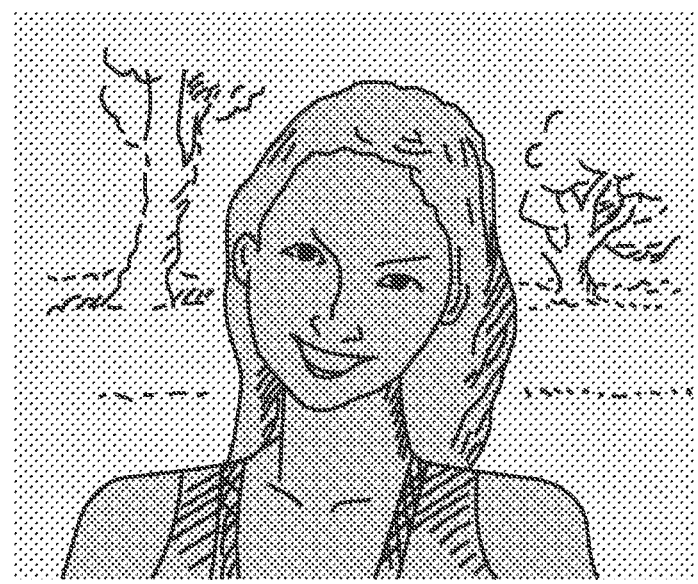
FIG. 16B is a diagram illustrating an example of appearance in an HDR.

The target gradation correction amount in the HDR may be varied from that in the SDR. For example, FIG. 16A illustrates an example of appearance in the SDR, and FIG. 16B illustrates an example of appearance in the HDR. Brightness values of a subject (person) are the same value in both examples. Nevertheless, while a brightness value of a background hits the ceiling at 100 cd/m$^2$ at highest in the SDR, a brightness value becomes a value exceeding 100 cd/m$^2$ in the HDR. Consequently, even if the brightness values of the subject are the same, an HDR image sometimes looks darker. This is called brightness contrast, and is a phenomenon attributed to visual characteristics of human. For example, the brightness of the subject is the same in FIGS. 16A and 16B, but a difference between the brightness of the subject and the brightness of the background is larger in FIG. 16B than that in FIG. 16A. In such a case, the user feels the subject in FIG. 16B darker than the subject in FIG. 16A. In other words, because it is possible to represent a high brightness region such as sky brighter in the HDR, the subject in the HDR is highly likely to look darker as compared with the subject in the SDR. Thus, in the present exemplary embodiment, while gradation characteristics as illustrated in FIG. 15A are used in the case of SDR, by applying a gradation correction amount that scoops up a dark section more than that in FIG. 15A, using gradation characteristics as illustrated in FIG. 15B in the case of HDR, a desirable appearance result can be obtained. As an example of gradation correction, correction for compensating for underexposure has been described in the present exemplary embodiment, but similar gradation correction can be performed also in brightness correction for picture creation.

A target brightness level for a representative brightness value of a face or a histogram feature amount of image data can be set to a fixed value empirically considered to be desirable, but a different target brightness level may be set in accordance with a representative brightness value or a value of a histogram feature amount. In this case, it is sufficient that a look-up table defining a relationship of a target brightness level with respect to an input level is prepared for each parameter (representative brightness value or histogram feature amount) for which the target brightness level is to be set.

Correction characteristics for converting a parameter into a target brightness level defined in this manner are obtained using a method such as spline interpolation, and as necessary, stored as a look-up table (or relational expression) to which the gradation correction amount (B) is to be applied.

In step S1234, the system control unit 50 combines the gradation correction amount (A) calculated in step S1225, and the gradation correction amount (B) calculated in step S1233. The system control unit 50 creates a look-up table of an output brightness level corresponding to each input brightness level by obtaining a resultant brightness value by initially applying the gradation correction amount (A) to each input brightness level, and then applying the gradation correction amount (B) to the corrected brightness level, for example.

In step S1235, the system control unit 50 performs processing (limiter processing) of imposing a limitation on an upper limit value of a combined correction amount (combined gradation correction amount) obtained in step S1234. By combining the gradation correction amount (A) and the gradation correction amount (B), the correction amount becomes larger, and a noise amount becomes more likely to stand out in the corrected image. Thus, a limitation is imposed on the entire correction amount. The limiter processing can be implemented by preparing the largest correction amount allowed in each brightness value, as a table, and substituting an output level exceeding the largest correction amount among values in the look-up table created in step S1234, with an output level corresponding to the largest correction amount. As a gradation correction amount, a value for an image capturing mode (SDR image capturing or HDR image capturing) set by the user may be calculated, or values for both of SDR and HDR may be calculated.

The description will return to FIG. 7. In step S707, the system control unit 50 develops an image using the calculated white balance coefficient, gradation correction parameters, and various HDR parameters. An HDR-developed image is generated using a color matrix, a camera OETF curve data, a color adjustment parameter, a noise reduction parameter, and a sharpness parameter as other development parameters. As the camera OETF (gamma curve), for example, inverse characteristics of an electro-optical transfer function (EOTF) of perceptual quantization (PQ) of ITU-R Recommendation BT.2100 are assumed, but a camera setting may be combined as an opto-optical transfer function (OOTF). Alternatively, OETF of Hybrid Log-Gamma (HLG) of ITU-R Recommendation BT.2100 may be similarly used.

In step S708, the system control unit 50 generates a multi picture format (MPF) image as an image for simplified display such as a two-screen comparison image by resizing the image developed in step S707, and performs compression coding in an HEVC format.

In step S709, the system control unit 50 generates a thumbnail image to be used for index display, by further resizing the MPF image generated in step S708, and compresses the thumbnail image.

In step S710, the system control unit 50 compresses the HDR image developed in step S707, as a main image. Various compression methods can be considered. For example, ten-bit YUV422 data can be compressed in compliance with H.265 (ISO/IEC 23008-2 HEVC).

In step S711, the system control unit 50 determines a recording image quality setting set by the user. In a case where the system control unit 50 determines the setting to be a setting of recording only a RAW image ("RAW" in step S711), the processing proceeds to step S712. In a case where the system control unit 50 determines the setting to be a setting of recording only an HDR image ("HDR" in step S711), the processing proceeds to step S713. In a case where the system control unit 50 determines the setting to be a setting of recording a RAW image and an HDR image ("RAW+HDR" in step S711), the processing proceeds to step S714.

In step S712, the system control unit 50 records a RAW image onto the recording medium 200 via the recording medium I/F 18 as a RAW image file having a structure as illustrated in FIG. 8A, after compressing the RAW image and adding a header. Several compression methods can be considered. It is sufficient that lossless compression being reversible compression without deterioration, or lossy compression that is irreversible compression but can reduce a file size is used. In addition, the white search frame inclusion determination result of white balance obtained in step S1205, the histogram obtained in step S704, and the face detection result obtained in step S705 are recorded in the header as detected metadata. The white search frame inclusion determination result detected at this time is a determination result obtained before bright/dark section exclusion processing in step S1206 is performed. Thus, the same determination result is recorded both in HDR image capturing and SDR image capturing. In a case where the HDR image capturing mode is set by the user, HDR development parameters such as the white balance coefficients obtained in FIG. 12, and the gradation correction amount obtained in FIG. 14, and the MPF image for display that has been generated from the HDR-developed image data and converted in the HEVC format in step S708 are also recorded together as metadata as illustrated in FIG. 8C. As described above, these pieces of data vary in content between HDR image capturing and SDR image capturing. In the case of SDR image capturing, SDR development parameters set in a case where the above-described white search frame inclusion determination and gradation characteristics are used are recorded. Even in the case of HDR image capturing, SDR development parameters may also be generated by performing processing in steps S702 to S706 for SDR, and both of the HDR development parameters and the SDR development parameters may be recorded. Because generating both of the HDR development parameters and the SDR development parameters involves a large processing load, such generation may be performed when a processing load has a relatively-wide leeway such as the time of single image capturing, and may be avoided at the time of continuous image capturing.

When a processing load has a leeway such as the time of single image capturing, a main image with SDR image quality, an MPF image, and a thumbnail image may be created using SDR development parameters aside from an HDR image for display, and an HDR image for display and an SDR image for display may be recorded in the same file (FIG. 8D).

When a thumbnail is to be displayed, it is sufficient that an overview of an image can be identified because the image is small. Thus, only a thumbnail image to be created in step S709 may be created using an SDR-developed image and stored (FIG. 8E). By employing such a configuration, a display apparatus or a PC that does not support decoding of H.265, which is a compression methods for HDR, can display only a thumbnail image.

In step S713, the system control unit 50 performs compression coding of the developed HDR image in the HEVC format, adds static metadata or dynamic metadata, and records the resultant image onto the recording medium 200 via the recording medium I/F 18 as an HEIF file in an HEIF format. The static metadata includes three primary colors of display complying with CEA-861.3, and x and y coordinates of white points, and a largest brightness value, a smallest brightness value, a content largest brightness value (Maximum Content Light Level), and a frame average brightness level (Maximum Frame-average Light Level) of mastering display. The dynamic metadata includes metadata of dynamic tone mapping of color volume conversion defined in SMPTE ST 2094. It is desirable that a depth is equal to or larger than ten bits for representing HDR characteristics using a PQ signal, but because the depth in the conventional JPEG format is eight bits, it is necessary to newly employ a container for a still image HDR. The container of HEIF being an image file format developed by the Moving Picture Experts Group (MPEG) and defined in the MPEG-H Part 12(ISO/IEC 23008-12) is used. The HEIF has such a feature that not only a main image but also thumbnails, a plurality of temporally related images, and metadata such as an exchangeable image file format (EXIF) image or an extensible metadata platform (XMP) can also be stored in one file. Thus, a ten-bit image sequence encoded by HEVC can also be stored. The HEIF is accordingly useful for many occasions.

In steps S714 and S715, both of a RAW image and an HDR image are recorded by sequentially performing the processing in step S712 and the processing in step S713. The above-described processing may be performed as a serial sequence at the time of image capturing, or an HDR image or an SDR image may be generated by preliminarily recording a RAW image and performing development processing afterward based on a user operation. Alternatively, an external apparatus such as a PC may take in the above-described RAW image, perform development processing, and similarly generate an HDR image or an SDR image.

Subsequently, FIG. 8A illustrates a file structure of still image RAW image data to be recorded onto the recording medium 200 in the above-described recording processing. A file format exemplified below is an ISO base media file format defined in ISO/IEC14496-12. Thus, this file format has a tree structure, and includes each node called a box. Each box can include a plurality of boxes as subelements.

Image data 801 includes, at the beginning, box ftyp 802 for describing a file type, and box moov 803 including all metadata, box mdat 808 of media data main body of a track, and other boxes 807. The above-described box moov 803 includes, as subelements, box uuid 804 storing MetaData 805, and trak box 806 storing information for referring to Image Data. In the MetaData 805, metadata of an image is described. For example, the MetaData 805 includes image created date and time, an image capturing condition, information indicating which image capturing of HDR or SDR image capturing has been performed, the above-described detected metadata, and other pieces of image capturing information. The above-described box mdat 808 includes, as a subelement, Image Data 809 being still image data obtained by image capturing.

Image data recorded in the Image Data 809 varies between a RAW image captured in the SDR, and RAW image captured in the HDR.

Figure 8B:
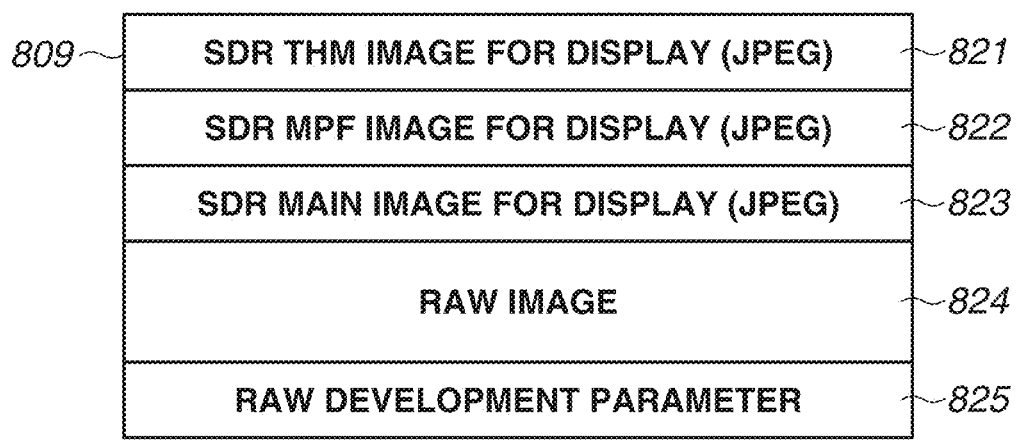
FIG. 8B is a diagram illustrating an example of region Image Data in a RAW file.

FIG. 8B illustrates the Image Data 809 recorded in a RAW image captured in the SDR. The Image Data 809 in this case includes a THM image 821 developed with SDR image quality and compressed by the JPEG, an MPF image 822, a main image 823, a RAW image 824, and a RAW development parameter 825. Each SDR image quality image is an image in which one color component has eight bits (256 gradations). The RAW development parameter 825 in FIG. 8B at least includes a development parameter for SDR development.

FIG. 8C illustrates Image Data 809 recorded in a RAW image including only an HDR image as an image for display, when image capturing is performed in the HDR. The Image Data 809 in this case includes a THM image 826 developed with HDR image quality and compressed by the HEVC, an MPF image 827, a main image 828, a RAW image 824, and a RAW development parameter 825. Each HDR image quality image is an image in which one color component has ten bits (1024 gradations). The RAW development parameters 825 in FIGS. 8C, 8D, and 8E at least include development parameters for HDR development.

FIG. 8D illustrates Image Data 809 recorded in a RAW image including both an HDR image and an SDR image as images for display, when image capturing is performed in the HDR. The Image Data 809 in this case includes a THM image 821 developed with SDR image quality and compressed by the JPEG, an MPF image 822, a main image 823, a THM image 826 developed with HDR image quality and compressed by the HEVC, an MPF image 827, a main image 828, a RAW image 824 and a RAW development parameter 825.

FIG. 8E illustrates Image Data 809 recorded in a RAW image including only a THM image as an SDR image, and including an MPF image and a main image as HDR images for display, when image capturing is performed in the HDR. The Image Data 809 in this case includes a THM image 821 developed with SDR image quality and compressed by the JPEG, an MPF image 827 developed with HDR image quality and compressed by the HEVC, a main image 828 and a RAW image 824), and a RAW development parameter 825.

The file format exemplified in this example is one of exemplary embodiments, and may include another box as necessary. In addition, an image for display may be included in a box in the moov 803 or another box 807.

By having the above-described file format, a development parameter for an SDR image is recorded in a RAW image file of a RAW image captured as an SDR image, and a development parameter for an HDR image is recorded in a RAW image file of a RAW image captured as an HDR image. With this configuration, even in a case where a RAW image is developed afterward, development can be performed using a development parameter reflecting the setting made at the time of image capturing. For example, an apparatus (may be the digital camera 100 or another apparatus such as a PC) that performs RAW development determines whether a RAW image has been captured as an HDR image or an SDR image, by referring to the MetaData 805 in the RAW image. Then, in a case where it is determined that the RAW image has been captured as an HDR image, the RAW image is developed as an HDR image using a development parameter for an HDR image that is included in the file. In addition, in a case where it is determined that the RAW image has been captured as an SDR image, the RAW image is developed as an SDR image using a development parameter for an SDR image that is included in the file. For enabling such processing to be performed, the digital camera 100 according to the present exemplary embodiment records a development parameter for an SDR image in a RAW image file of a RAW image captured as an SDR image, and records a development parameter for an HDR image in a RAW image file of a RAW image captured as an HDR image. An apparatus that performs RAW development in only required to record a still image HDR image developed using the above-described container of HEIF.

Furthermore, because the same determination result is recorded as detected metadata both in HDR image capturing and SDR image capturing, even a RAW image file of a RAW image captured in the HDR image capturing mode can be developed as an SDR image using the recorded detected data. Thus, even an apparatus that only supports an SDR image can appropriately display a RAW image file of a RAW image captured in the HDR image capturing mode.

FIG. 9A is a flowchart illustrating the details of the reproduction mode processing to be performed by the system control unit 50 using the display unit 28. The processing is implemented by the system control unit 50 loading a program recorded in the nonvolatile memory 56, onto the system memory 52 and executing the program.

In step S901, the system control unit 50 determines whether index reproduction is to be performed or normal reproduction is to be performed. In a case where the system control unit 50 determines in step S901 that index reproduction is to be performed (YES in step S901), the processing proceeds to step S902. In this step S902, the system control unit 50 determines the number of images to be reproduced.

In step S903, the system control unit 50 determines an image to be reproduced. Then, in step S904, the system control unit 50 performs drawing processing of the image to be reproduced.

In step S905, the system control unit 50 determines whether drawing of all images to be displayed has been completed. In a case where it is determined that the drawing has not been completed (NO in step S905), the processing returns to step S903, and drawing processing is continued. In a case where the system control unit 50 determines that the drawing has been completed (YES in step S905), the processing proceeds to step S906. In this step S906, the system control unit 50 performs processing of outputting an image to the display unit 28, and ends the display processing. After that, the system control unit 50 performs operation reception processing.

Figure 9B:
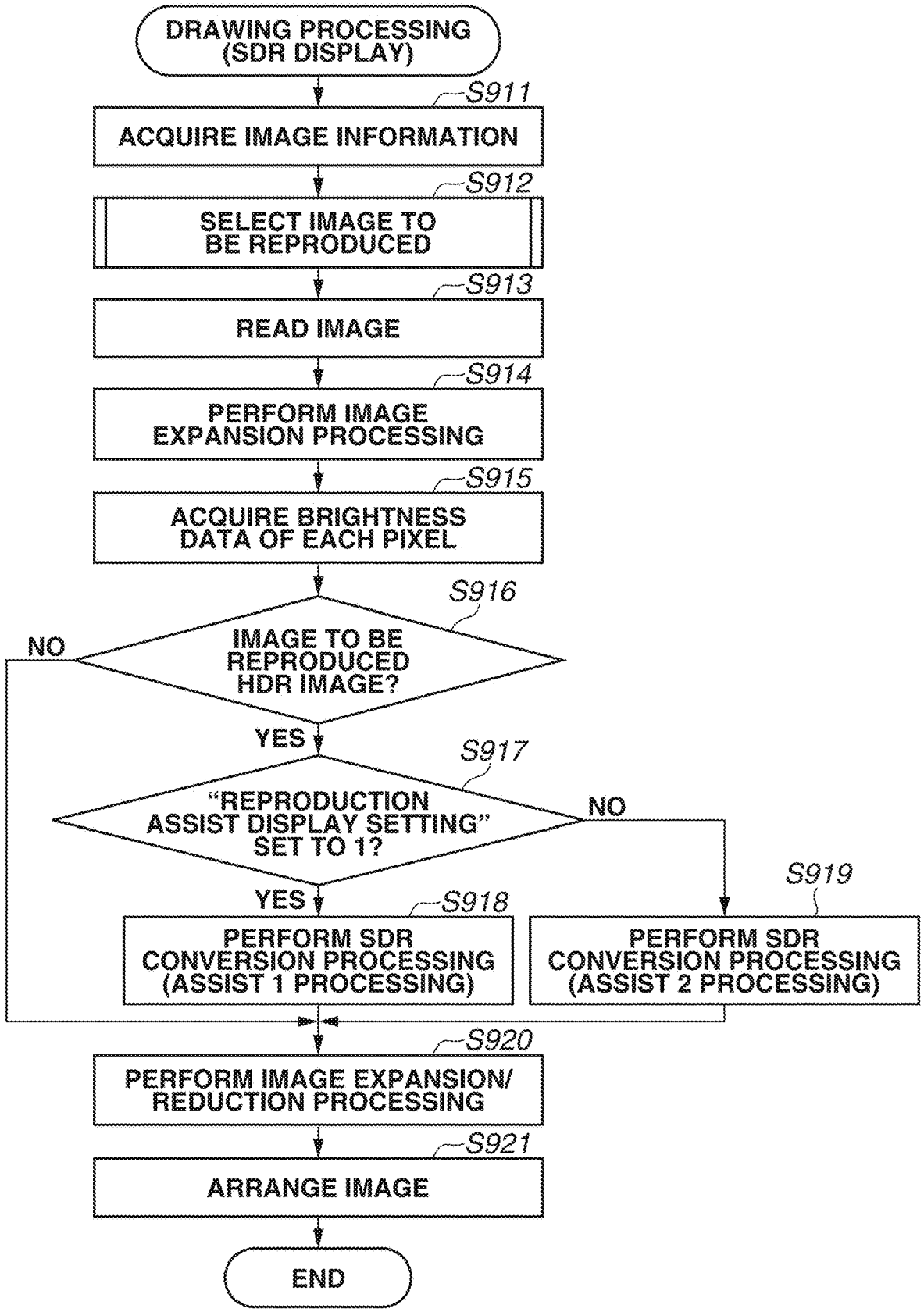
FIG. 9B is a flowchart of the reproduction mode processing according to the exemplary embodiment.
Figure 9C:
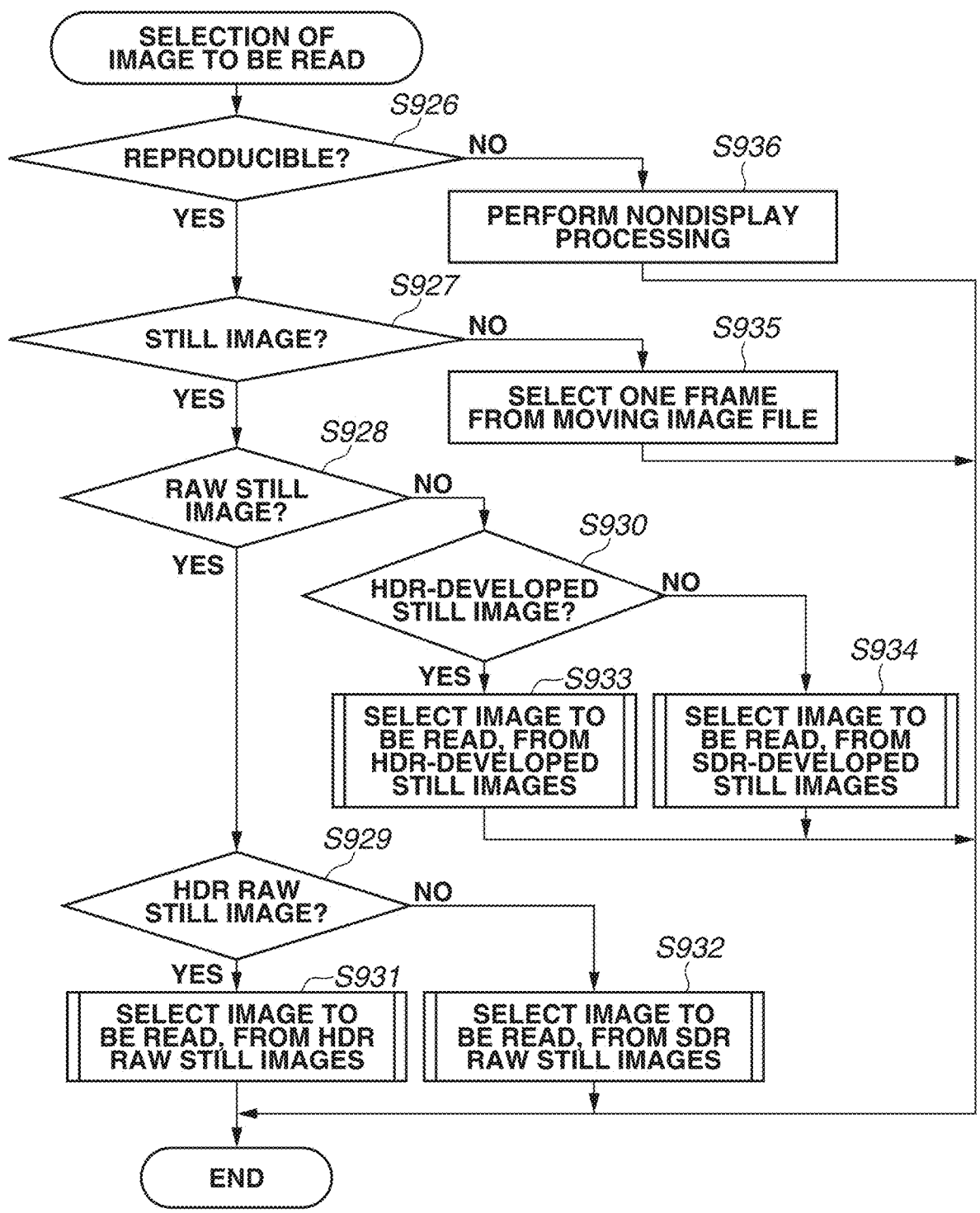
FIG. 9C is a flowchart of the reproduction mode processing according to the exemplary embodiment.

FIG. 9B is a flowchart illustrating the details of drawing processing in the reproduction mode processing that is to be performed by the system control unit 50 using the display unit 28.

In step S911, the system control unit 50 acquires information regarding an image to be reproduced. In step S912, the system control unit 50 determines an image to be reproduced. In step S913, the system control unit 50 reads out the image to be reproduced, from the recording medium 200. In step S914, the system control unit 50 performs expansion processing of the image to be reproduced. In step S915, the system control unit 50 collects data of each pixel from image data having been subjected to expansion processing in step S914. The image data corresponds to brightness information, for example, and is used for histogram processing or highlight warning processing.

In step S916, the system control unit 50 determines whether the image to be reproduced is an HDR image or an SDR image. In a case where the system control unit 50 determines that the image to be reproduced is an HDR image (YES in step S916), the processing proceeds to step S917. In a case where the system control unit 50 determines that the image to be reproduced is an SDR image (NO in step S916), the processing proceeds to step S920. In step S917, the system control unit 50 determines whether a reproduction HDR assist display setting is set to assist 1. In a case where a reproduction HDR assist display setting is set to assist 1 (YES in step S917), the processing proceeds to step S918. In a case where a reproduction HDR assist display setting is set to assist 2 (NO in step S917), the processing proceeds to step S919. In step S918, the system control unit 50 performs HDR-to-SDR conversion processing on the image expanded in step S914, in accordance with the setting of assist 1. In step S919, the system control unit 50 performs HDR-to-SDR conversion processing on the image expanded in step S914, in accordance with the setting of assist 2.

In step S920, the system control unit 50 performs expansion/reduction processing of the image expanded in step S914, or the image on which SDR conversion processing has been performed in step S918 or S919, into a size suitable for the display unit 28. Then, in step S921, the system control unit 50 determines the arrangement of the generated image, and ends the drawing processing.

FIGS. 9C to 9H are flowcharts illustrating the details of selection processing of an image to be read that is to be performed by the system control unit 50.

In step S926, the system control unit 50 determines information regarding the acquired image, and determines whether the acquired image is reproducible. In a case where it is determined that the acquired image is reproducible (YES in step S926), the processing proceeds to step S927. In a case where it is determined that the acquired image is nonreproducible (NO in step S926), the processing proceeds to step S936.

In step S927, the system control unit 50 determines whether the image to be reproduced is a still image. In a case where the system control unit 50 determines that the image to be reproduced is a still image (YES in step S927), the processing proceeds to step S928. In a case where the system control unit 50 determines that the image to be reproduced is not a still image (NO in step S927), the processing proceeds to step S935.

In step S928, the system control unit 50 determines whether the image to be reproduced is a RAW image. In a case where the system control unit 50 determines that the image to be reproduced is a RAW image (YES in step S928), the processing proceeds to step S929. In a case where the system control unit 50 determines that the image to be reproduced is not a RAW image (NO in step S928), the processing proceeds to step S930.

In step S929, the system control unit 50 determines whether the RAW image is a RAW image captured in the HDR or a RAW image captured in the SDR. The system control unit 50 performs the determination using metadata in a RAW file, which has been described with reference to FIG. 8A. In a case where the system control unit 50 determines that the RAW image is a RAW image captured in the HDR (YES in step S929), the processing proceeds to step S931. In a case where the system control unit 50 determines that the RAW image is a RAW image captured in the SDR (NO in step S929), the processing proceeds to step S932.

In step S930, the system control unit 50 determines whether a still image determined to be not a RAW image is an image captured in the HDR or an image captured in the SDR. In the present exemplary embodiment, because an image captured in the HDR is recorded as an HEIF image, and an image captured in the SDR is recorded as a JPEG image, whether a still image is an HDR image or an SDR image is determined by determining whether the still image is an HEIF image or a JPEG image, but whether a still image is an HDR image or an SDR image may be determined using metadata in HEIF.

In step S931, the system control unit 50 selects image data to be used in reproduction, from RAW images captured in the HDR. In step S932, the system control unit 50 selects image data to be used in reproduction, from RAW images captured in the SDR. In step S933, the system control unit 50 selects image data to be used in reproduction, from HDR-developed still images. In step S934, the system control unit 50 selects image data to be used in reproduction, from SDR-developed still images. In step S935, the system control unit 50 selects image data to be displayed, from a moving image file. In step S936, the system control unit 50 performs nondisplay processing of an image to be reproduced. In this case, the system control unit 50 displays information indicating nonreproducible, for notifying the user that an image is a nonreproducible image.

Figure 9D:
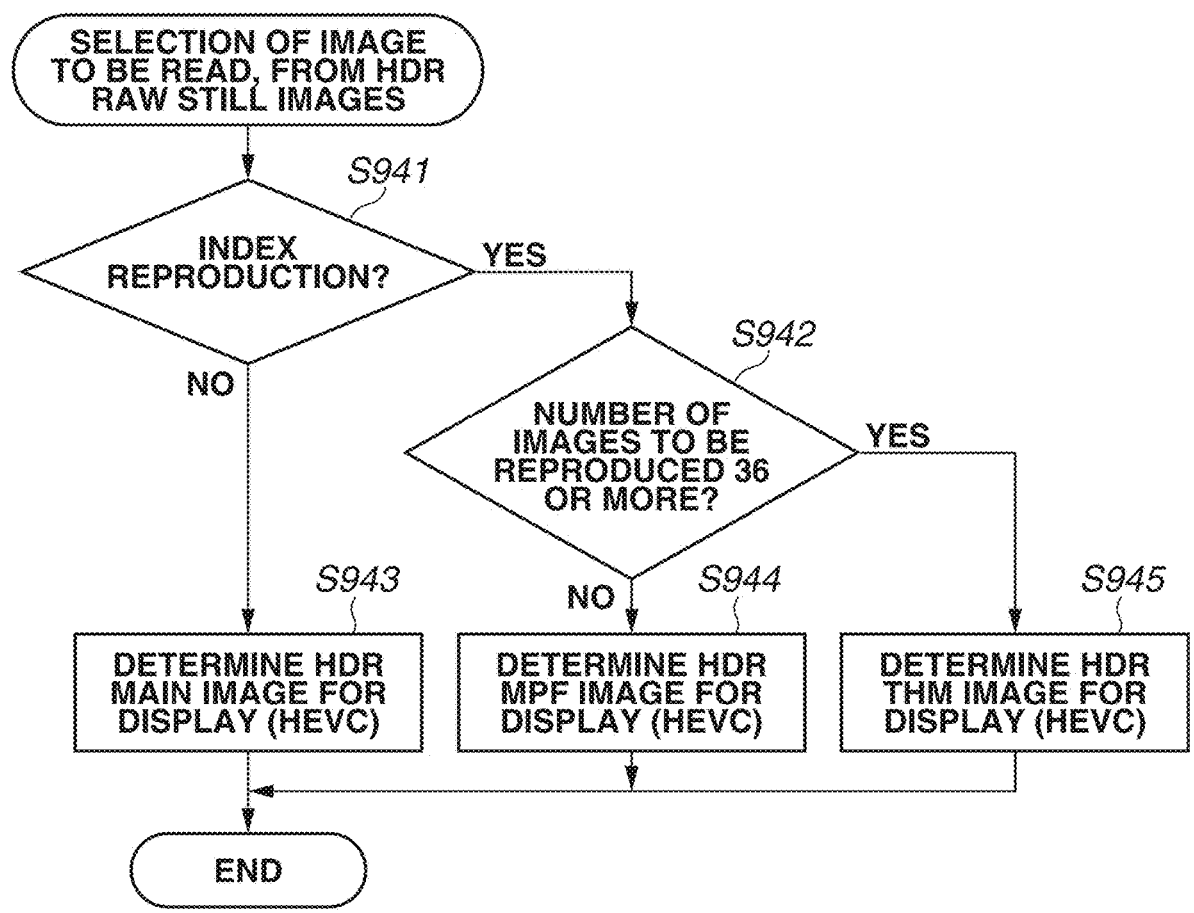
FIG. 9D is a flowchart of the reproduction mode processing according to the exemplary embodiment.

FIG. 9D illustrates a procedure of the system control unit 50 selecting image data to be used in reproduction, from RAW images captured in the HDR.

In step S941, the system control unit 50 determines whether index reproduction is to be performed or normal reproduction is to be performed. In a case where the system control unit 50 determines that index reproduction is to be performed (YES in step S941), the processing proceeds to step S942. In a case where the system control unit 50 determines that normal reproduction is to be performed (NO in step S941), the processing proceeds to step S943.

In step S942, the system control unit 50 determines image data to be used, based on the number of images to be reproduced in index reproduction. In the present exemplary embodiment, 36 is set as a threshold, but this number of images is an example, and the number of images to be reproduced may be arbitrarily set by the user, or may be determined depending on the size of the display unit 28. In a case where the system control unit 50 determines that the number of images to be displayed is equal to or larger than 36 (YES in step S942), the processing proceeds to step S945. In a case where the system control unit 50 determines that the number of images to be displayed is smaller than 36 (NO in step S942), the processing proceeds to step S944.

In step S943, the system control unit 50 determines an "HDR main image for display (HEVC)" (828) as image data to be used in reproduction. In step S944, the system control unit 50 determines an "HDR MPF image for display (HEVC)" (827) as image data to be used in reproduction. In step S945, the system control unit 50 determines an "HDR THM image for display (HEVC)" (826) as image data to be used in reproduction.

Figure 9E:
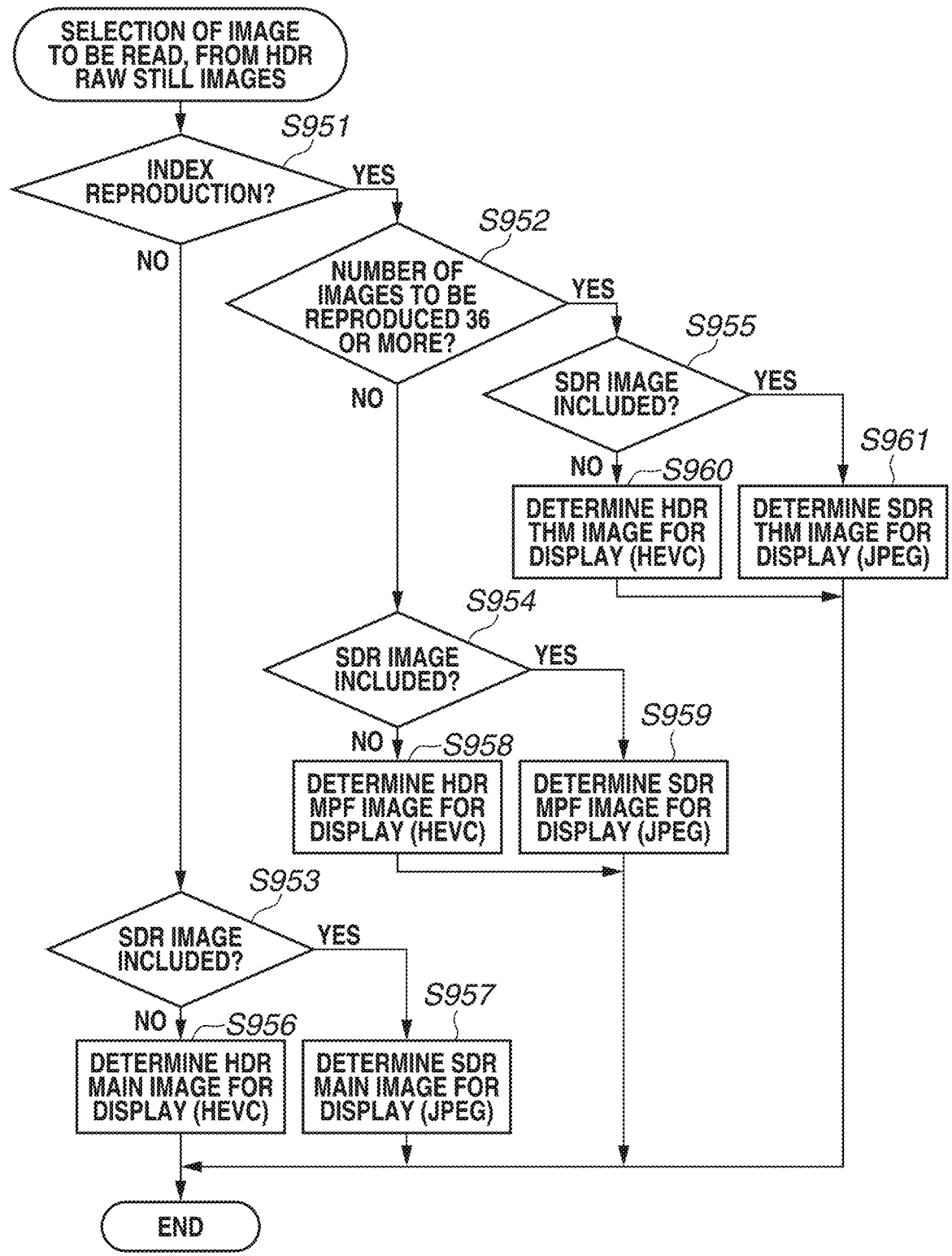
FIG. 9E is a flowchart of the reproduction mode processing according to the exemplary embodiment.

FIG. 9E illustrates a procedure illustrating selection processing of image data to be used in reproduction, from RAW images in a case where RAW images captured in the HDR include an SDR image for display.

In step S951, the system control unit 50 determines whether index reproduction is to be performed or normal reproduction is to be performed. In a case where the system control unit 50 determines that index reproduction is to be performed (YES in step S951), the processing proceeds to step S952. In a case where the system control unit 50 determines that normal reproduction is to be performed (NO in step S951), the processing proceeds to step S953.

In step S952, the system control unit 50 determines image data to be used, based on the number of images to be reproduced in index reproduction. In the present exemplary embodiment, 36 is set as a threshold used in the determination. In a case where the system control unit 50 determines that the number of images to be reproduced is equal to or larger than 36 (YES in step S952), the processing proceeds to step S955. In a case where the system control unit 50 determines that the number of images to be reproduced is smaller than 36 (NO in step S952), the processing proceeds to step S954.

In steps S953, S954, and S955, the system control unit 50 checks whether RAW images to be reproduced include an SDR image. The system control unit 50 performs the determination using metadata in a RAW file, which has been described with reference to FIG. 8A.

In step S956, the system control unit 50 determines an "HDR main image for display (HEVC)" (828) as image data to be used in reproduction. In step S957, the system control unit 50 determines an "SDR main image for display (JPEG)" (823) as image data to be used in reproduction. In step S958, the system control unit 50 determines an "HDR MPF image for display (HEVC)" (827) as image data to be used in reproduction. In step S959, the system control unit 50 determines an "SDR MPF image for display (JPEG)" (822) as image data to be used in reproduction. In step S960, the system control unit 50 determines an "HDR THM image for display (HEVC)" (826) as image data to be used in reproduction. In step S961, the system control unit 50 determines an "SDR THM image for display (JPEG)" (821) as image data to be used in reproduction.

FIG. 9F illustrates a procedure of the system control unit 50 selecting image data to be used in reproduction, from HDR-developed still images.

In step S971, the system control unit 50 determines whether index reproduction is to be performed or normal reproduction is to be performed. In a case where the system control unit 50 determines that index reproduction is to be performed (YES in step S971), the processing proceeds to step S972. In a case where the system control unit 50 determines that normal reproduction is to be performed (NO in step S971), the processing proceeds to step S973.

In step S972, the system control unit 50 determines image data to be used, based on the number of images to be reproduced in index reproduction. In the exemplary embodiment, 36 is set as a threshold of the number of images. In a case where the system control unit 50 determines that the number of images to be reproduced is equal to or larger than 36 (YES in step S972), the processing proceeds to step S975. In a case where the system control unit 50 determines that the number of images to be reproduced is smaller than 36 (NO in step S972), the processing proceeds to step S974.

In step S973, the system control unit 50 determines an "HDR main image (HEVC)" (not illustrated) as image data to be used in reproduction. In step S974, the system control unit 50 determines an "HDR MPF image (HEVC)" (not illustrated) as image data to be used in reproduction. In step S975, the system control unit 50 determines an "HDR THM image (HEVC)" (not illustrated) as image data to be used in reproduction.

Figure 9G:
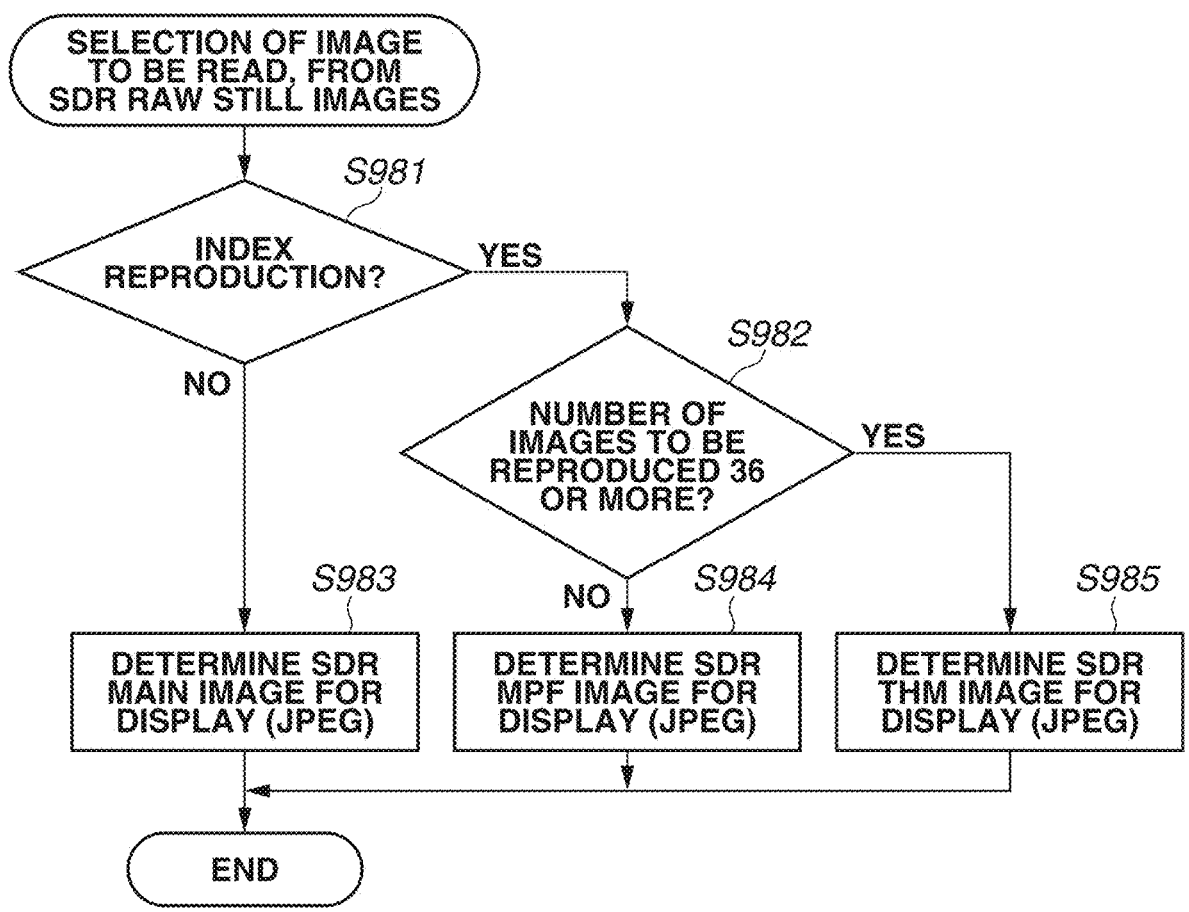
FIG. 9G is a flowchart of the reproduction mode processing according to the exemplary embodiment.

FIG. 9G illustrates a procedure of selecting image data to be used in reproduction, from RAW images captured in the SDR.

In step S981, the system control unit 50 determines whether index reproduction is to be performed or normal reproduction is to be performed. In a case where the system control unit 50 determines that index reproduction is to be performed (YES in step S981), the processing proceeds to step S982. In a case where the system control unit 50 determines that normal reproduction is to be performed (NO in step S981), the processing proceeds to step S983.

In step S982, the system control unit 50 determines image data to be used, based on the number of images to be reproduced in index reproduction. In the exemplary embodiment, 36 is set as a threshold of the number of images. In a case where the system control unit 50 determines that the number of images to be displayed is equal to or larger than 36 (YES in step S982), the processing proceeds to step S985. In a case where the system control unit 50 determines that the number of images to be displayed is smaller than 36 (NO in step S982), the processing proceeds to step S984.

In step S983, the system control unit 50 determines an "SDR main image for display (JPEG)" (823) as image data to be used in reproduction. In step S984, the system control unit 50 determines an "SDR MPF image for display (JPEG)" (822) as image data to be used in reproduction. In step S985, the system control unit 50 determines an "SDR THM image for display (JPEG)" (821) as image data to be used in reproduction.

Figure 9H:
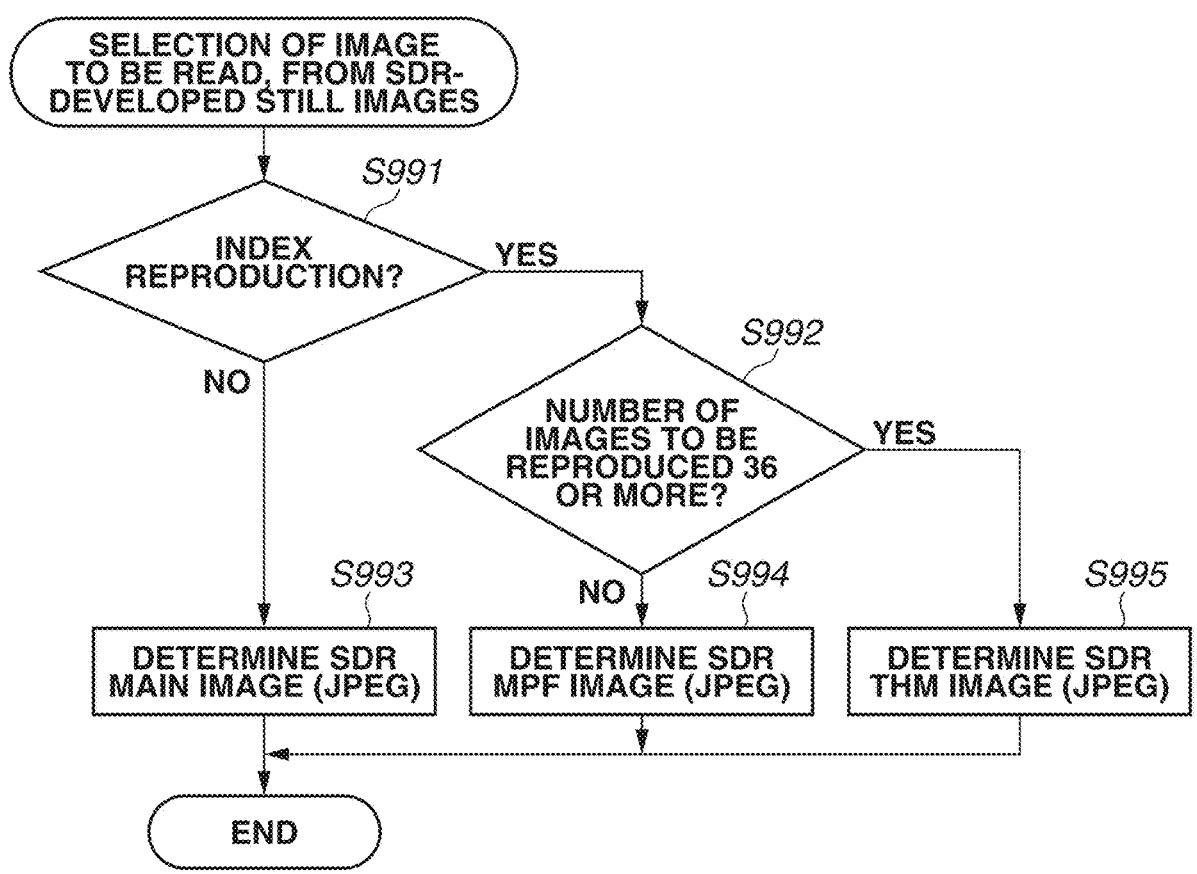
FIG. 9H is a flowchart of the reproduction mode processing according to the exemplary embodiment.

FIG. 9H illustrates a procedure of selecting image data to be used in reproduction, from SDR-developed still images.

In step S991, the system control unit 50 determines whether index reproduction is to be performed or normal reproduction is to be performed. In a case where the system control unit 50 determines that index reproduction is to be performed (YES in step S991), the processing proceeds to step S992. In a case where the system control unit 50 determines that normal reproduction is to be performed (NO in step S991), the processing proceeds to step S993.

In step S992, the system control unit 50 determines image data to be used, based on the number of images to be reproduced in index reproduction. In the exemplary embodiment, 36 is set as a threshold of the number of images. In a case where the system control unit 50 determines that the number of images to be reproduced is equal to or larger than 36 (YES in step S992), the processing proceeds to step S995. In a case where the system control unit 50 determines that the number of images to be reproduced is smaller than 36 (NO in step S992), the processing proceeds to step S994.

In step S993, the system control unit 50 determines an "SDR main image (JPEG)" (not illustrated) as image data to be used in reproduction. In step S994, the system control unit 50 determines an "SDR MPF image (JPEG)" (not illustrated) as image data to be used in reproduction. In step S995, the system control unit 50 determines an "SDR THM image (JPEG)" (not illustrated) as image data to be used in reproduction.

Figure 10A:
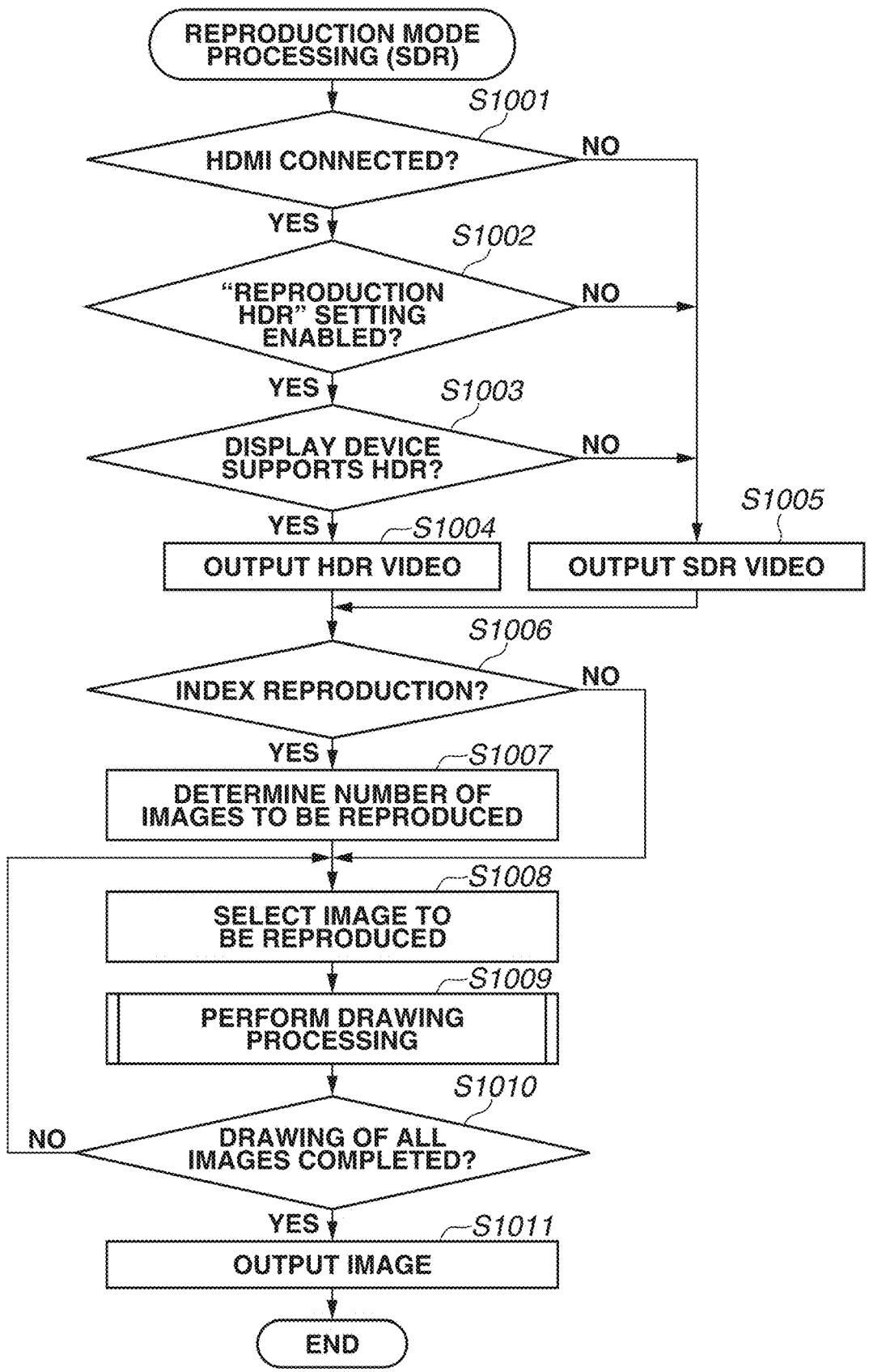
FIG. 10A is a flowchart of HDMI reproduction processing according to the exemplary embodiment.

FIG. 10A is a flowchart illustrating the details of reproduction mode processing that uses the external device 300. The processing is implemented by the system control unit 50 loading a program recorded in the nonvolatile memory 56, onto the system memory 52 and executing the program.

In step S1001, the system control unit 50 determines whether the external device 300 is connected to the digital camera 100. In a case where the system control unit 50 determines that the external device 300 is connected (YES in step S1001), the processing proceeds to step S1002. In a case where the system control unit 50 determines that the external device 300 is not connected (NO in step S1001), the processing proceeds to step S1005.

In step S1002, the system control unit 50 determines whether a reproduction HDR setting is enabled. As a reproduction setting, "perform HDR reproduction", "not perform HDR reproduction", and "image capturing mode synchronization" are selectable. In a case where "perform HDR reproduction" is set, if the external device 300 supports the HDR, a mode of performing HDR output is set irrespective of whether an image to be reproduced is an HDR image or an SDR image, and "not perform HDR reproduction" becomes a mode for performing SDR output. The "image capturing mode synchronization" is a mode for synchronizing output in reproduction with an image capturing mode. More specifically, in the case of the HDR image capturing mode in which "HDR image capturing" is set to "perform", HDR output is performed also at the time of reproduction. In the case of the SDR image capturing mode in which "HDR image capturing" is set to "not perform", a mode for performing SDR output is set also at the time of reproduction. The "image capturing mode synchronization" is set by default, and even if the user changes an image capturing mode, a reproduction setting is maintained in the "image capturing mode synchronization". Only when the user changes a reproduction setting from "image capturing mode synchronization" to "perform HDR reproduction" or "not perform HDR reproduction", the synchronization is interrupted. In addition, file formats such as "HEIF (reproduction)" and "JPEG (reproduction)" may be used as options in place of "perform HDR reproduction" and "not perform HDR reproduction". In a similar manner, file formats such as "HEIF (image capturing)" and "JPEG (image capturing)" may be used as options in place of "perform HDR image capturing" and "not perform HDR image capturing".

In step S1002, in the case of "perform HDR reproduction" (YES in step S1002), the system control unit 50 advances the processing to step S1003. In the case of "not perform HDR reproduction" (NO in step S1002), the system control unit 50 advances the processing to step S1005. In a case where "image capturing mode synchronization" is set and "HDR image capturing" set in step S606 is "perform", the system control unit 50 advances the processing to step S1003. In a case where "HDR image capturing" is "not perform", the system control unit 50 advances the processing to step S1005.

In step S1003, the system control unit 50 determines whether the external device 300 is a display supporting the HDR. In a case where the system control unit 50 determines that the external device 300 is a display supporting the HDR (YES in step S1003), the processing proceeds to step S1004. In a case where the system control unit 50 determines that the external device 300 is not a display that supports the HDR (NO in step S1003), the processing proceeds to step S1005.

In step S1004, the system control unit 50 outputs an HDR signal to the external device 300. In step S1005, the system control unit 50 outputs an SDR signal to the external device 300.

Because steps S1006 to S1011 are the same as steps S901 to S906 of FIG. 9A, the description will be omitted.

FIG. 10B is a flowchart illustrating the details of drawing processing (step S1009) to be performed in a case where an HDR signal is output to the external device 300.

Because steps S1021 to S1025, S1028, and S1029 are the same as steps S911 to S915, S920 and S921 described with reference to FIG. 9B, the description will be omitted.

In step S1026, the system control unit 50 determines whether the image to be reproduced is an HDR image or an SDR image. In a case where the system control unit 50 determines that the image to be reproduced is an HDR image (YES in step S1026), the processing proceeds to step S1028. In a case where the system control unit 50 determines that the image to be reproduced is an SDR image (NO in step S1026), the processing proceeds to step S1027.

In step S1027, the system control unit 50 performs SDR-to-HDR conversion processing. Subsequent steps S1028 and S1029 are the same as steps S920 and S921 of FIG. 9B. Because the details of drawing processing (step S1009) to be performed in a case where an SDR signal is output to the external device 300 is the same as FIG. 9B, the description will be omitted.

Figure 11A:
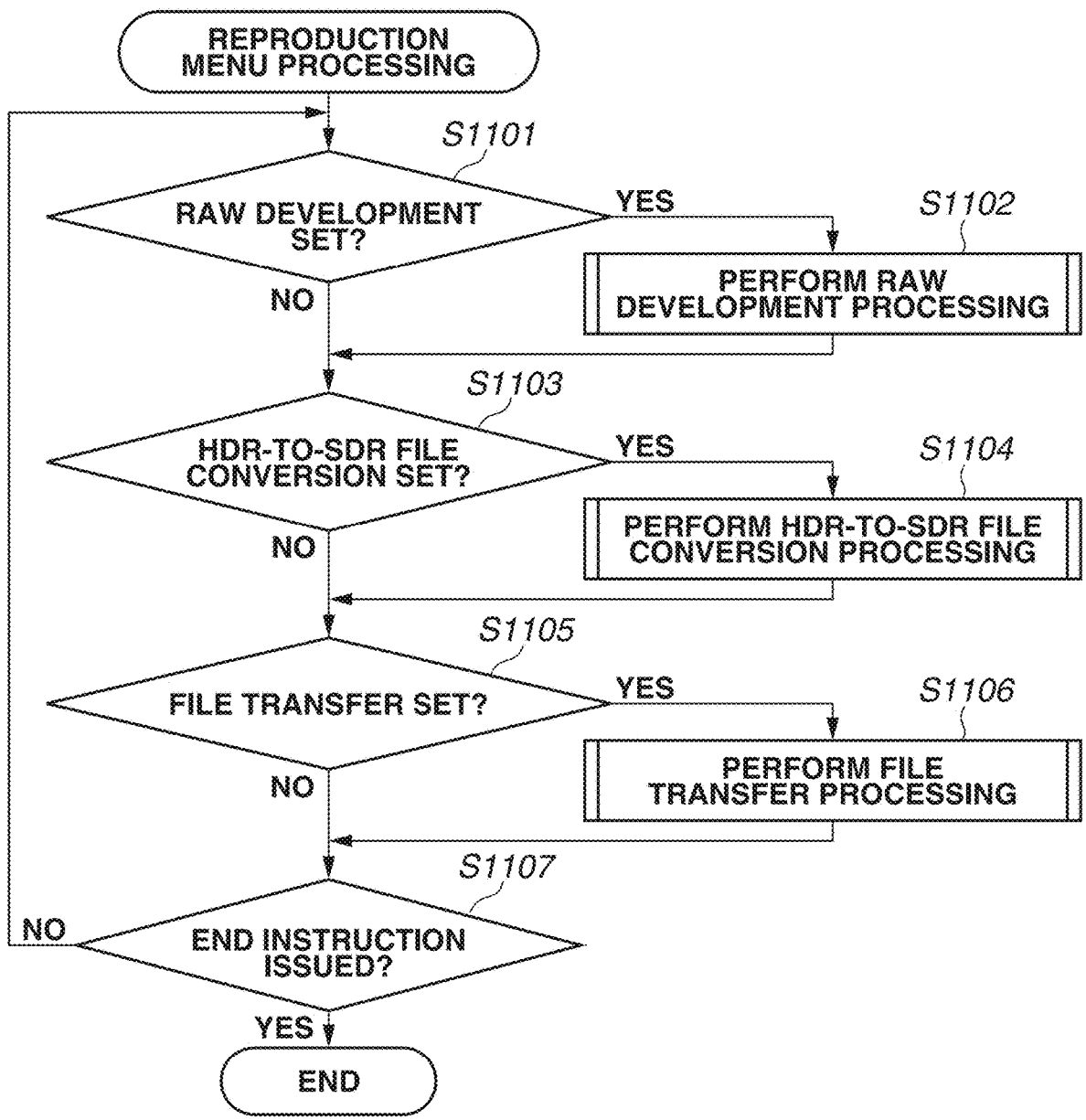
FIG. 11A is a flowchart of reproduction menu processing according to the exemplary embodiment.

FIG. 11A is a flowchart illustrating the details of reproduction menu processing. The processing is implemented by the system control unit 50 loading a program recorded in the nonvolatile memory 56, onto the system memory 52 and executing the program.

In step S1101, the system control unit 50 determines whether the execution of RAW development is set by the user using a setting item (not illustrated) of RAW development. In a case where the system control unit 50 determines not to execute RAW development (NO in step S1101), the processing proceeds to step S1103. In a case where the system control unit 50 determines to execute RAW development (YES in step S1101), the processing proceeds to step S1102.

In step S1103, the system control unit 50 determines whether the execution of HDR-to-SDR conversion is set using a setting item (not illustrated) of SDR conversion of an HDR file. In a case where the system control unit 50 determines not to execute HDR-to-SDR conversion (NO in step S1103), the processing proceeds to step S1105. In a case where the system control unit 50 determines to execute HDR-to-SDR conversion (YES in step S1103), the processing proceeds to step S1104.

In step S1105, the system control unit 50 determines whether the execution of file transfer is set using a setting item (not illustrated) of file transfer. In a case where the system control unit 50 determines not to execute file transfer (NO in step S1105), the processing proceeds to step S1107. In a case where the system control unit 50 determines to execute file transfer (YES in step S1105), the processing proceeds to step S1106.

In step S1107, the system control unit 50 determines whether to end reproduction menu processing. In a case where the system control unit 50 determines not to end reproduction menu processing (NO in step S1107), the processing returns to step S1101. In a case where the system control unit 50 determines to end reproduction menu processing (YES in step S1107), the system control unit 50 ends the reproduction menu processing.

In step S1106, the system control unit 50 performs transfer processing of an image file designated by the user. When an HDR image file is to be transferred, in a case where a destination apparatus can display only an SDR image file, HDR-to-SDR conversion in step S1104 may be executed in a camera, and the HDR image file may be transferred as an SDR image file.

Figure 11B:
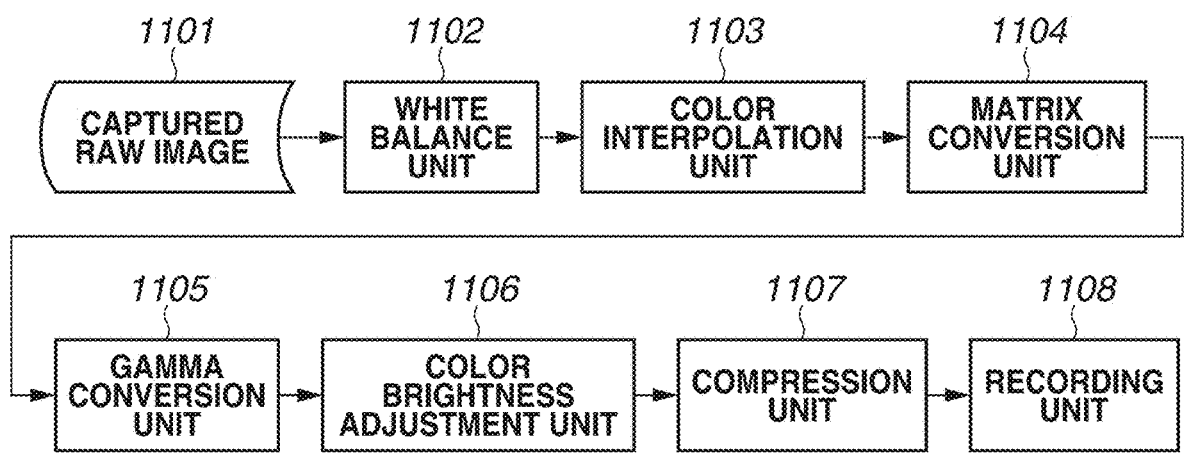
FIG. 11B is a diagram illustrating a flow of data.

In step S1102, the system control unit 50 performs RAW development of a RAW image file designated by the user. The details of the RAW development processing will be described below with reference to a block diagram in FIG. 11B. Each processing unit illustrated in FIG. 11B is included in the image processing unit 24, but may be implemented by a program to be executed by the system control unit 50.

The system control unit 50 reads out a captured RAW image 1101 recorded on the recording medium 200, and causes the image processing unit 24 to perform RAW development processing. Because a RAW image is an aggregate of pixels in a Bayer array, one pixel includes intensity data of only a single color component. As RAW images, a RAW (SDR) image captured as an SDR image and a RAW (HDR) captured as an HDR image exist. At the time of development, a case where a RAW (SDR) image is SDR-developed as-is, and a case where a RAW (SDR) image is HDR-developed can be considered. In contrast, a case where a RAW (HDR) image is HDR-developed, and a case where a RAW (HDR) image is SDR-developed can be considered. A white balance unit 1102 performs processing of whitening a white portion. In the case of HDR-developing a RAW (HDR) image, white balance processing is executed using a white balance coefficient for HDR being HDR development metadata recorded in a file. In contrast, in the case of SDR-developing a RAW (HDR) image, white balance processing is executed by generating a white balance coefficient for SDR from a white search frame inclusion determination result being detected metadata stored in a file. As a matter of course, in a case where both of a white balance coefficient for HDR and a white balance coefficient for SDR are recorded in a RAW file, it is sufficient that a necessary white balance coefficient is appropriately used.

A color interpolation unit 1103 generates a color image in which each pixel of all pixels includes three components (for example, color information of R, G, and B), by performing noise reduction or interpolating color mosaic image. The generated color image passes through a matrix conversion unit 1104 and a gamma conversion unit 1105, and a basic color image is generated. After that, a color brightness adjustment unit 1106 performs processing for improving the appearance of the image, on the color image. For example, an evening scene is detected and image correction such as saturation enhancement is performed in accordance with the scene. Gradation correction is similarly executed, but in the case of HDR-developing a RAW (HDR) image, gradation correction is executed using a gradation correction amount for HDR being HDR development metadata stored in a file. In contrast, in the case of SDR-developing a RAW (HDR) image, gradation correction is executed by calculating a gradation correction amount for SDR using a face detection result and a histogram, which correspond to detected metadata recorded in a file. As a matter of course, in a case where both of a gradation correction amount for HDR and a gradation correction amount for SDR are recorded in a RAW file, it is sufficient that a necessary gradation correction amount is appropriately used.

A compression unit 1107 compresses a high resolution image having been subjected to desired color adjustment, using a method such as JPEG or HEVC, and in a recording unit 1108, a developed image to be recorded onto a recording medium such as a flash memory is generated. Because the above-described HEIF container can store a plurality of images, an SDR-developed image may also be stored in addition to an HDR-developed image.

In step S1104, the system control unit 50 performs SDR conversion of an HDR image file designated by the user. An HDR image is an image in which an OETF is PQ, and a color gamut is generated in a color space such as BT.2020. It is therefore necessary to perform tone mapping and gamut mapping processing on a color space such as γ2.2 of SDR or sRGB. A known technique can be used as a specific method. For example, if tone mapping is performed in such a manner as to make correct exposure consistent with that in the SDR, a result with uniformed brightness can be obtained as compared with SDR.

Heretofore, desirable exemplary embodiments of the present invention have been described, but the present invention is not limited to these exemplary embodiments, and various modifications and changes can be made without departing from the scope of the gist thereof. For example, in the above-described exemplary embodiment, HEVC is employed as an encoding method of image data in which one color component has bits exceeding eight bits, but the type of encoding is not specifically limited as long as an image in which one color component has bits exceeding eight bits can be encoded. In the above-described exemplary embodiment, the description has been given of a case where the present invention is applied to a digital camera, but the present invention may be applied to a computer (smartphone or a camera-equipped laptop PC) having an image capturing function, and an application is not limited to the above-described exemplary embodiment.

The present invention is not limited to the above-described exemplary embodiment, and various changes and modifications can be made without departing from the spirit and scope of the invention. The following claims are therefore appended for setting forth the scope of the present invention.

According to an exemplary embodiment of the present invention, it becomes possible to appropriately develop a RAW image as an HDR image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging apparatus comprising:
one or more non-transitory computer-readable media; and
at least one processor in communication with the one or more non-transitory computer-readable media, wherein the at least one processor and the one or more non-transitory computer-readable media are configured to:
perform a setting regarding a dynamic range before image capturing;
set a recording format of a captured image before the image capturing; and
record RAW image data that is based on an image signal obtained by the image capturing, in a case where recording of RAW image data is set as the recording format,
wherein, in a case where a setting indicating a high dynamic range (HDR) is set as the setting regarding the dynamic range, the at least one processor and the one or more non-transitory computer-readable media are configured to record the RAW image data in association with development information corresponding to the HDR, and in a case where a setting indicating a standard dynamic range (SDR) is set as the setting regarding the dynamic range, the at least one processor and the one or more non-transitory computer-readable media are configured to record the RAW image data in association with development information corresponding to the SDR.

2. The imaging apparatus according to claim 1, wherein the at least one processor and the one or more non-transitory computer-readable media are further configured to develop the RAW image data using development information that is based on the setting regarding the dynamic range.

3. The imaging apparatus according to claim 2, wherein, in a case of developing RAW image data associated with development information corresponding to the HDR, the at least one processor and the one or more non-transitory computer-readable media are further configured to generate HDR image data by developing the RAW image data.

4. The imaging apparatus according to claim 3, wherein, in a case of developing RAW image data associated with development information corresponding to the SDR, the at least one processor and the one or more non-transitory computer-readable media are further configured to generate SDR image data by developing the RAW image data.

5. The imaging apparatus according to claim 3, wherein the at least one processor and the one or more non-transitory computer-readable media are further configured to record SDR image data in a file format different from the HDR image data.

6. The imaging apparatus according to claim 3, wherein the at least one processor and the one or more non-transitory computer-readable media are further configured to record HDR image data as a file in a high efficiency image file format (HEIF) format.

7. The imaging apparatus according to claim 2, wherein the at least one processor and the one or more non-transitory computer-readable media are further configured to determine a white balance coefficient to be used in development of the RAW image data,
wherein development information corresponding to the HDR includes a white balance coefficient determined for the HDR, and development information corresponding to the SDR includes a white balance coefficient determined for the SDR.

8. The imaging apparatus according to claim 2, wherein the at least one processor and the one or more non-transitory computer-readable media are further configured to determine a gradation correction amount to be used in development of the RAW image data,
wherein development information corresponding to the HDR includes a gradation correction amount determined for the HDR, and development information corresponding to the SDR includes a gradation correction amount determined for the SDR.

9. The imaging apparatus according to claim 1, wherein the at least one processor and the one or more non-transitory computer-readable media are further configured to record the RAW image data and common metadata independent of the setting regarding the dynamic range, in association.

10. The imaging apparatus according to claim 9, wherein the common metadata is a determination result of a whitish pixel in the RAW image data.

11. A control method of an imaging apparatus, the control method comprising:
performing a setting regarding a dynamic range before image capturing;
recording RAW image data that is based on an image signal obtained by the image capturing;
in the recording process, in a case where a setting indicating the high dynamic range (HDR) is performed, recording the RAW image data in association with development information corresponding to the HDR, and in a case where a setting indicating the standard dynamic range (SDR) is performed, recording the RAW image data in association with development information corresponding to the SDR.

12. An image processing apparatus comprising:
one or more non-transitory computer-readable media; and
at least one processor in communication with the one or more non-transitory computer-readable media, wherein the at least one processor and the one or more non-transitory computer-readable media are configured to:
develop RAW image data;
record image data obtained by the development; and
acquire a setting regarding a dynamic range set when the RAW image data is captured,
wherein, in a case where the setting regarding the dynamic range indicates a high dynamic range (HDR), the at least one processor and the one or more non-transitory computer-readable media are configured to generate HDR image data by developing the RAW image data, and to record the generated HDR image data as a file in a high efficiency image file format (HEIF) format, and
wherein, in a case where the setting regarding the dynamic range indicates a standard dynamic range (SDR), the at least one processor and the one or more non-transitory computer-readable media are configured to record SDR image data as a file in a format different from the HEIF.

13. The image processing apparatus according to claim 12, wherein the at least one processor and the one or more non-transitory computer-readable media are further configured to develop the RAW image data using development information recorded in association with the RAW image data.

14. A non-transitory computer-readable storage medium storing a program for causing a computer to perform the method of claim 11.

15. A control method of an image processing apparatus, the control method comprising:
- developing RAW image data;
- recording image data obtained in the development process; and
- acquiring a setting regarding a dynamic range set when the RAW image data is captured;
- wherein in a case where the acquired setting indicates a high dynamic range (HDR), the developing generates HDR image data by developing the RAW image data, and the recording records the generated HDR image data as a file in a high efficiency image file format (HEIF) format, and
- in a case where the acquired setting indicates a standard dynamic range (SDR), the recording records generated SDR image data as a file in a format different from the HEIF.

* * * * *